(12) United States Patent
Townsend et al.

(10) Patent No.: US 11,810,597 B2
(45) Date of Patent: *Nov. 7, 2023

(54) VIDEO INGESTION AND CLIP CREATION

(71) Applicant: Amazon Technologies, Inc., Seattle, WA (US)

(72) Inventors: Matthew Alan Townsend, Redwood City, CA (US); Rohith Mysore Vijaya Kumar, Sunnyvale, CA (US); Yadunandana Nagaraja Rao, Sunnyvale, CA (US); Ambrish Tyagi, Palo Alto, CA (US); Eduard Oks, Holon (IL); Apoorv Chaudhri, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,781

(22) Filed: Oct. 4, 2021

(65) Prior Publication Data
US 2022/0122639 A1 Apr. 21, 2022

Related U.S. Application Data

(63) Continuation of application No. 14/870,227, filed on Sep. 30, 2015, now Pat. No. 11,158,344.

(51) Int. Cl.
*G11B 27/031* (2006.01)
*H04N 9/79* (2006.01)

(52) U.S. Cl.
CPC .............. *G11B 27/031* (2013.01); *H04N 9/79* (2013.01)

(58) Field of Classification Search
CPC ........... G11B 27/031; H04N 9/79; H04N 5/91
USPC ......................................................... 386/278
See application file for complete search history.

(56) References Cited

U.S. PATENT DOCUMENTS

| | | | | |
|---|---|---|---|---|
| 8,737,817 | B1 * | 5/2014 | Izo | G06F 16/632 386/287 |
| 2004/0208365 | A1 * | 10/2004 | Loui | G06F 16/58 382/224 |
| 2010/0061587 | A1 * | 3/2010 | Gupta | G06V 20/46 382/100 |
| 2011/0072011 | A1 * | 3/2011 | Qiao | G06F 16/3346 707/723 |
| 2013/0117677 | A1 * | 5/2013 | St. Jacques, Jr. | G06F 3/00 715/738 |
| 2016/0029105 | A1 * | 1/2016 | Newman | G11B 27/002 386/281 |

(Continued)

*Primary Examiner* — Loi H Tran
(74) *Attorney, Agent, or Firm* — PIERCE ATWOOD LLP

(57) ABSTRACT

Devices, systems and methods are disclosed for improving story assembly and video summarization. For example, video clips may be received and a theme may be determined from the received video clips based on annotation data or other characteristics of the received video data. Individual moments may be extracted from the video clips, based on the selected theme and the annotation data. The moments may be ranked based on a priority metric corresponding to content determined to be desirable for purposes of video summarization. Select moments may be chosen based on the priority metric and a structure may be determined based on the selected theme. Finally, a video summarization may be generated using the selected theme and the structure, the video summarization including the select moments.

20 Claims, 44 Drawing Sheets

(56) References Cited

U.S. PATENT DOCUMENTS

2016/0070962 A1\* 3/2016 Shetty .................... G06V 20/46
 382/225
2016/0092561 A1\* 3/2016 Liu ..................... G06F 16/7837
 386/230

\* cited by examiner

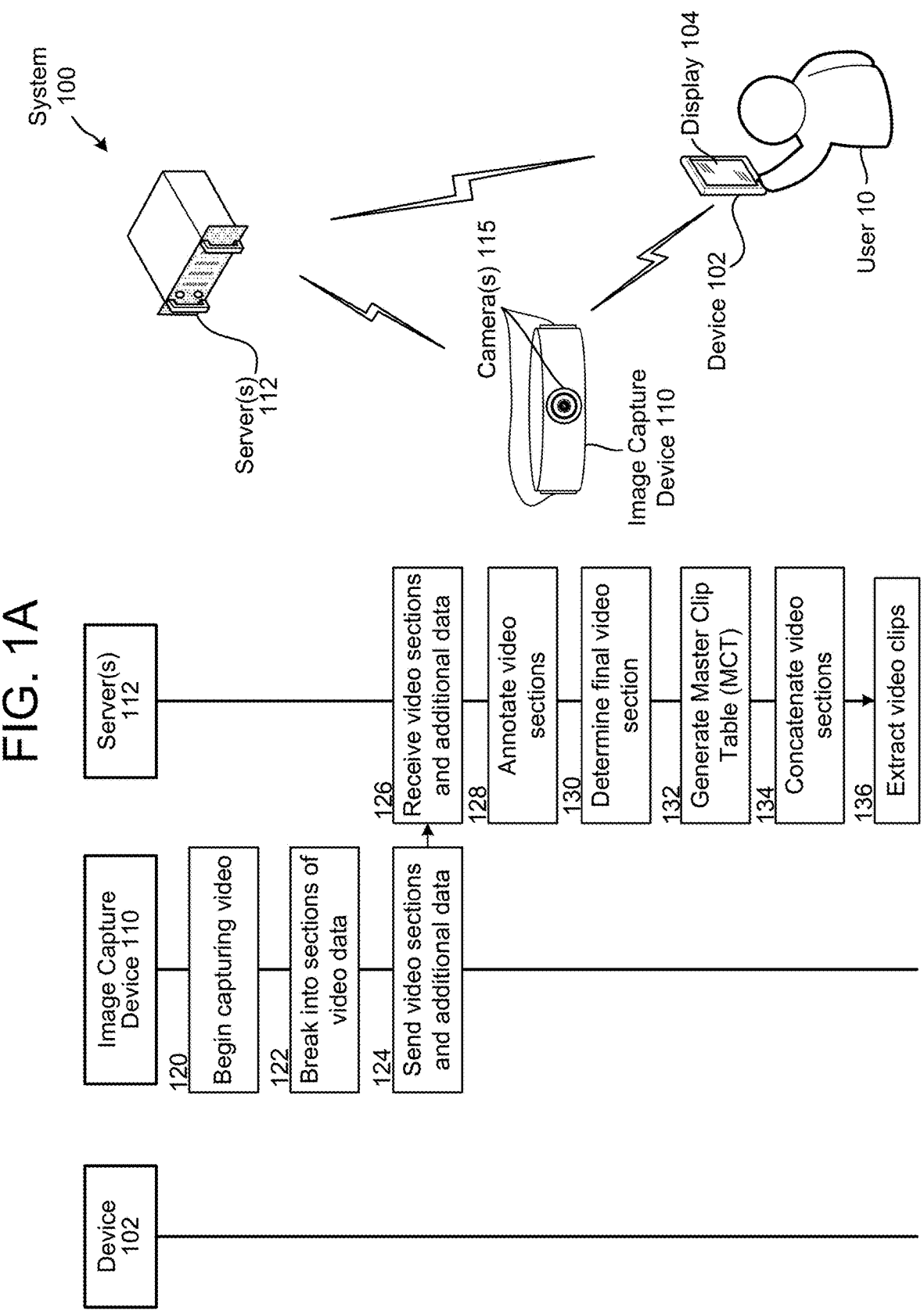

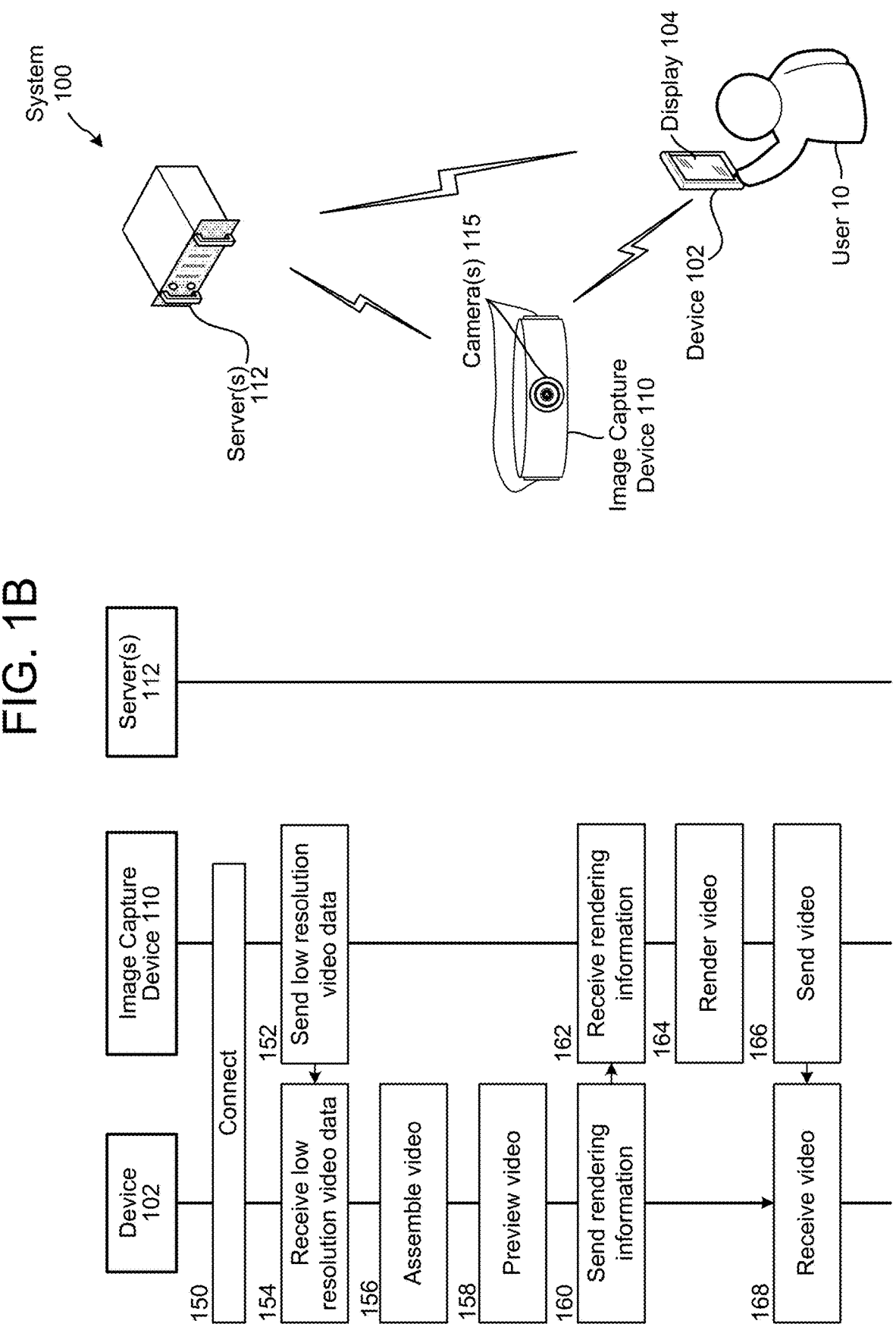

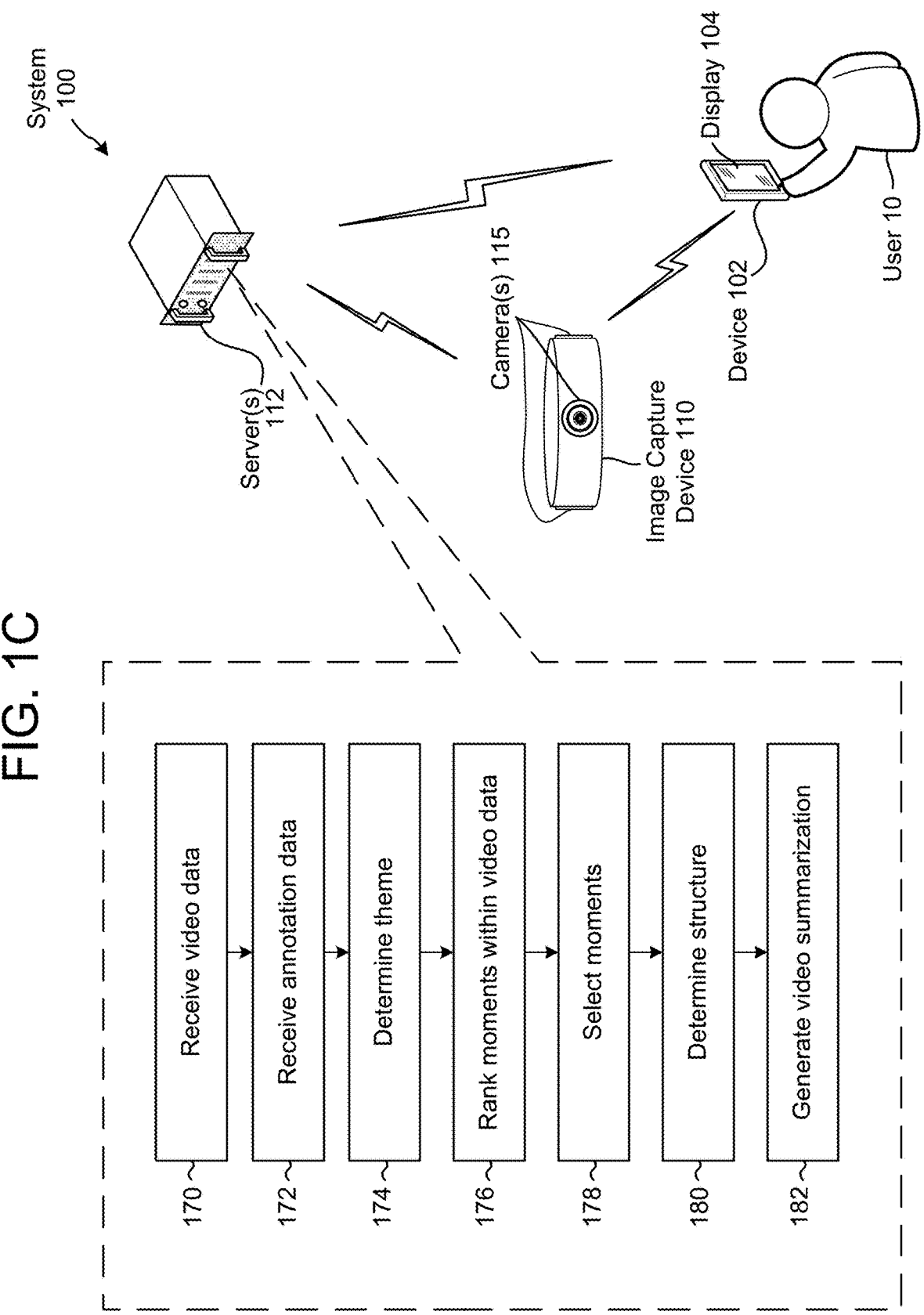

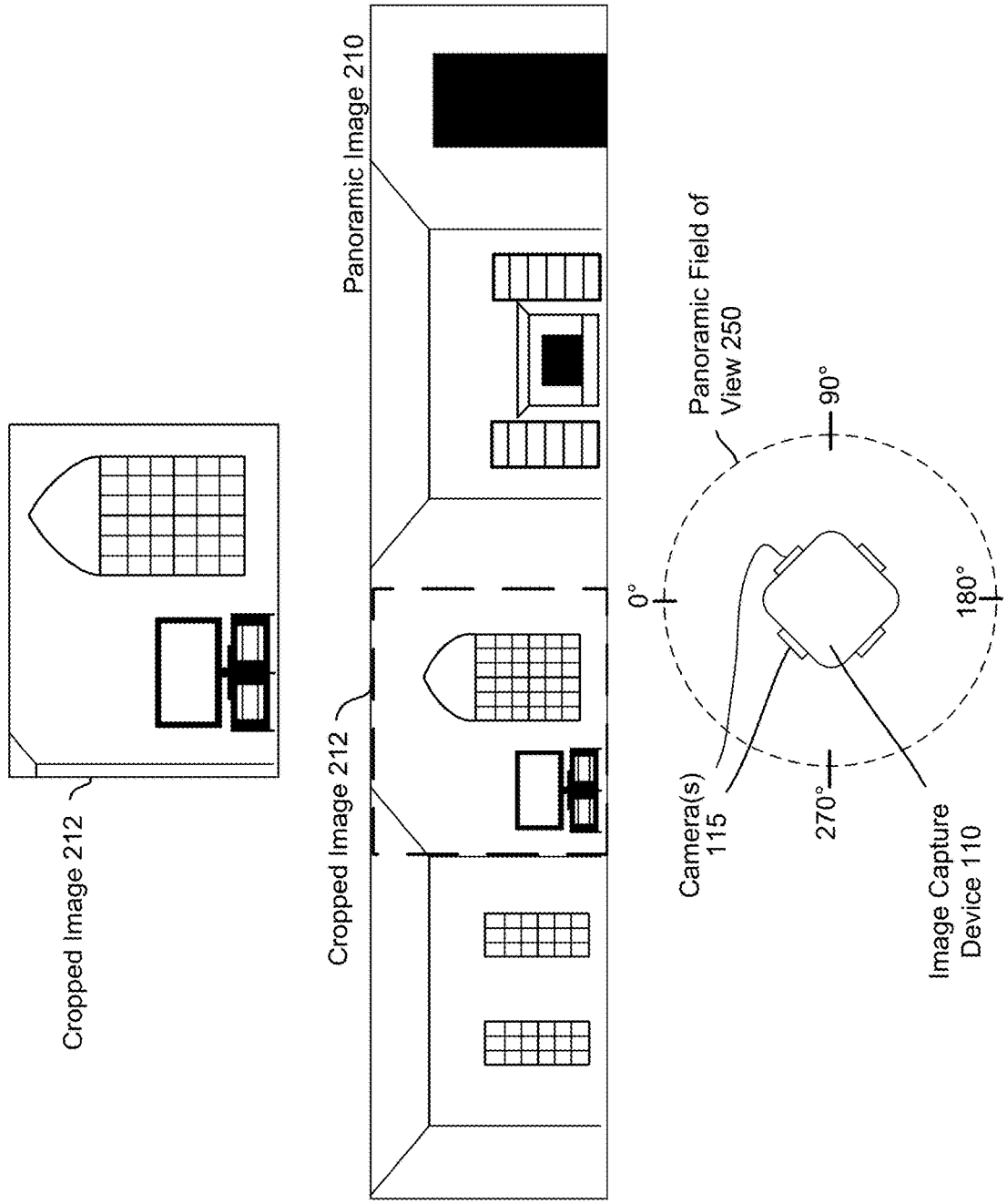

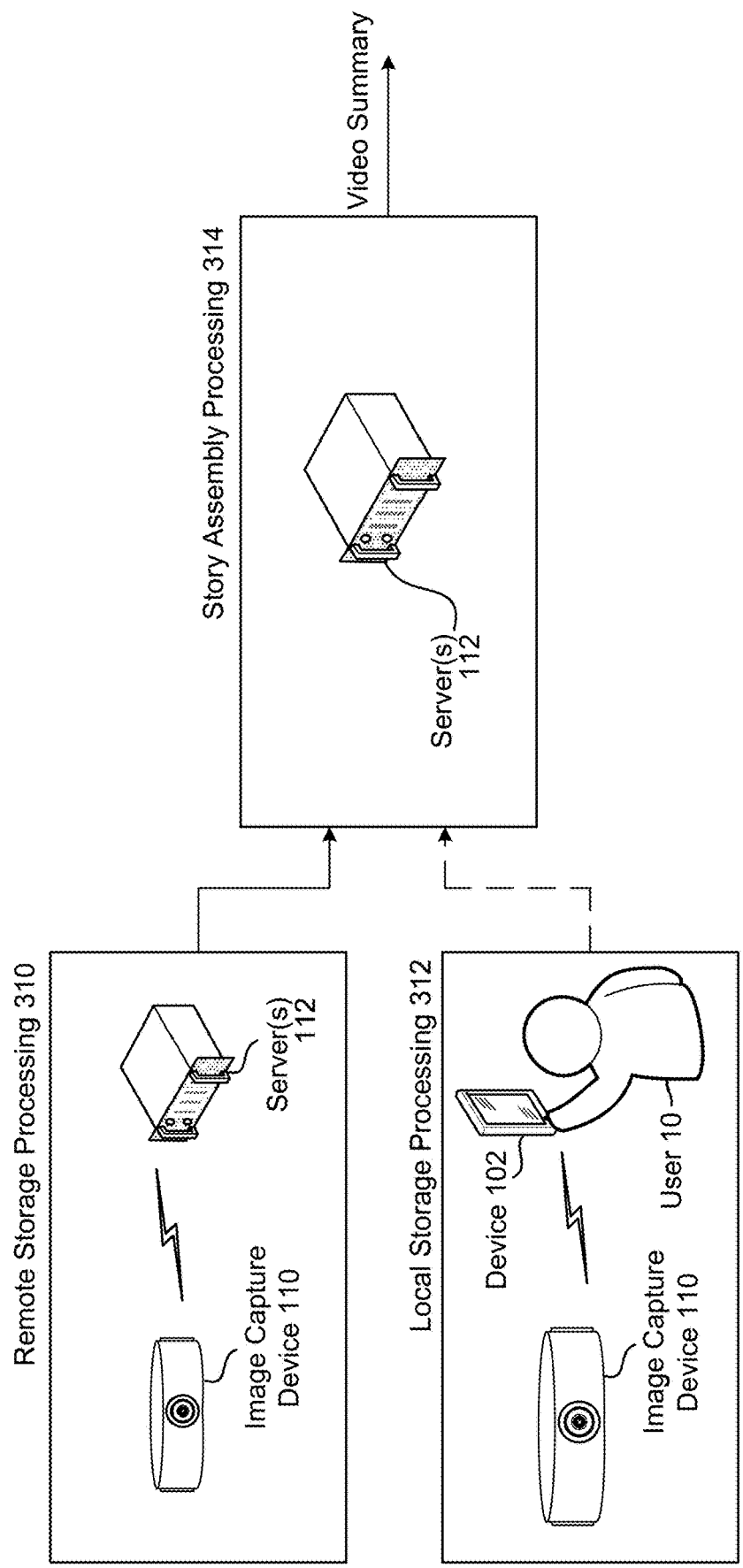

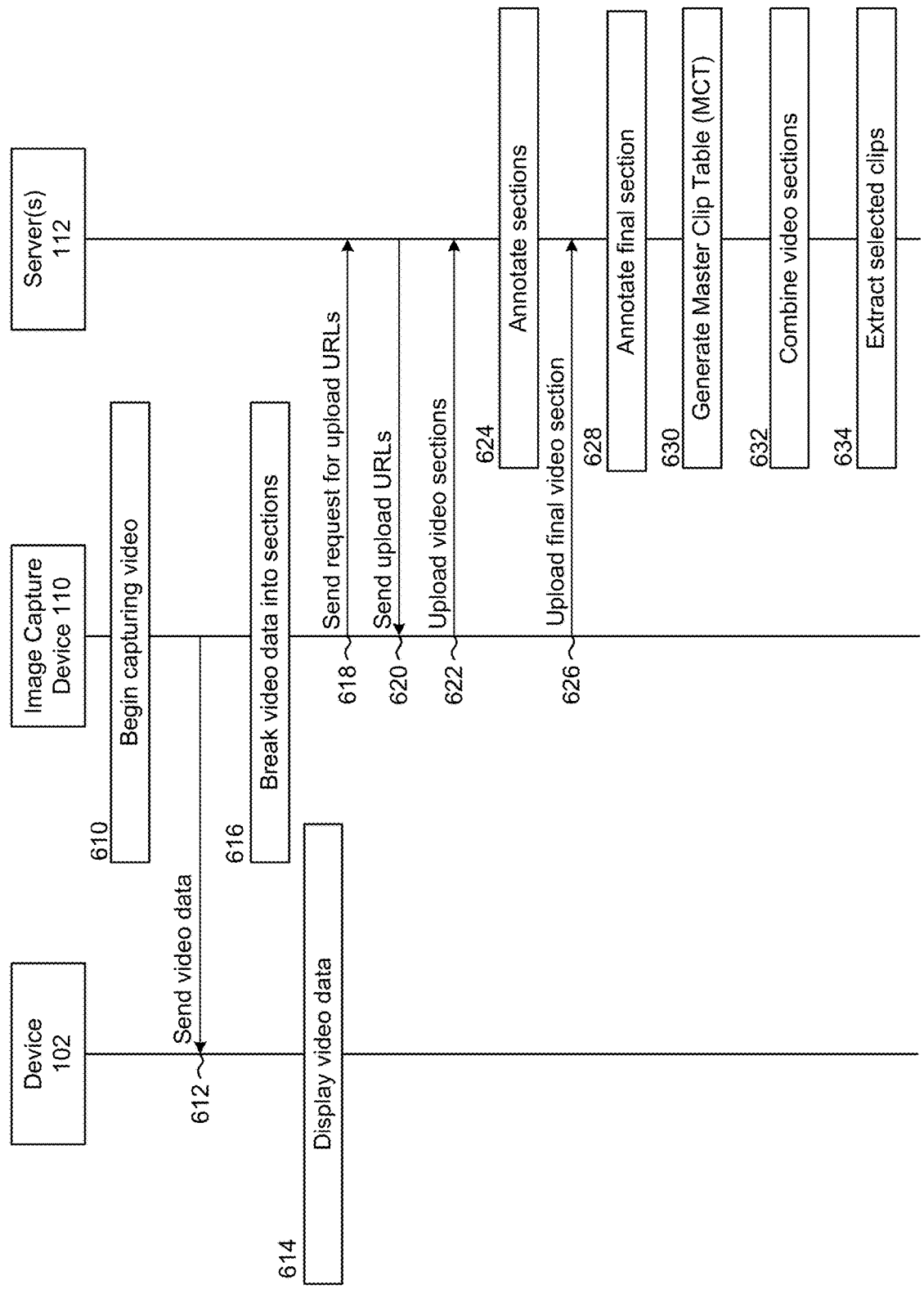

FIG. 9
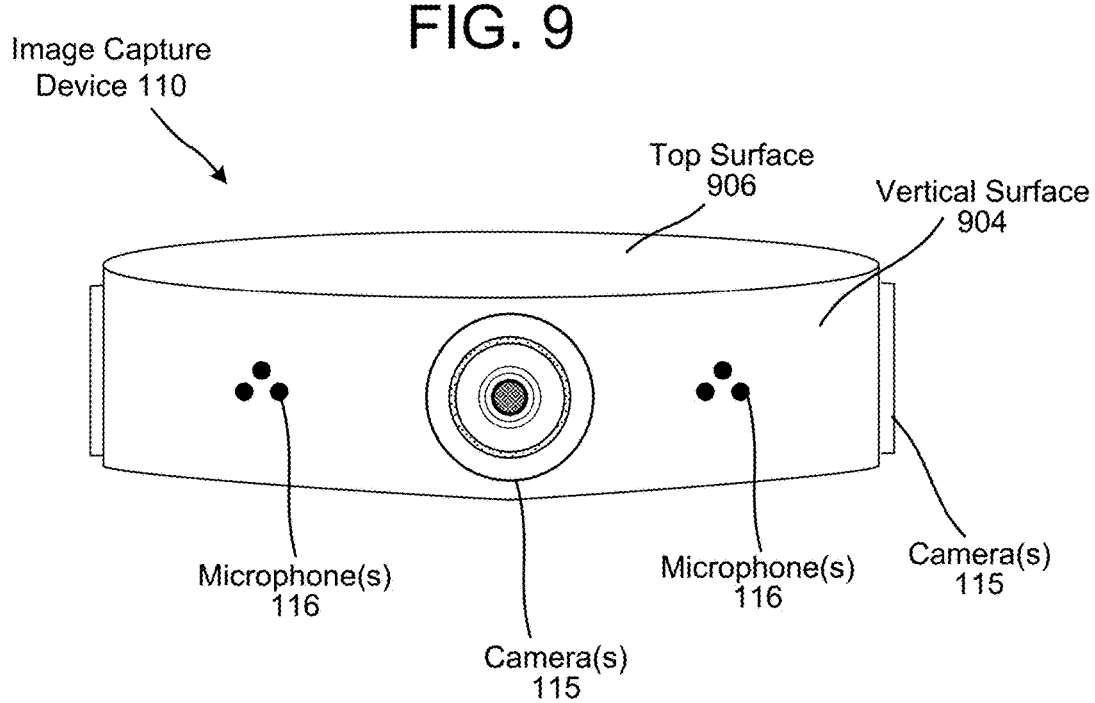
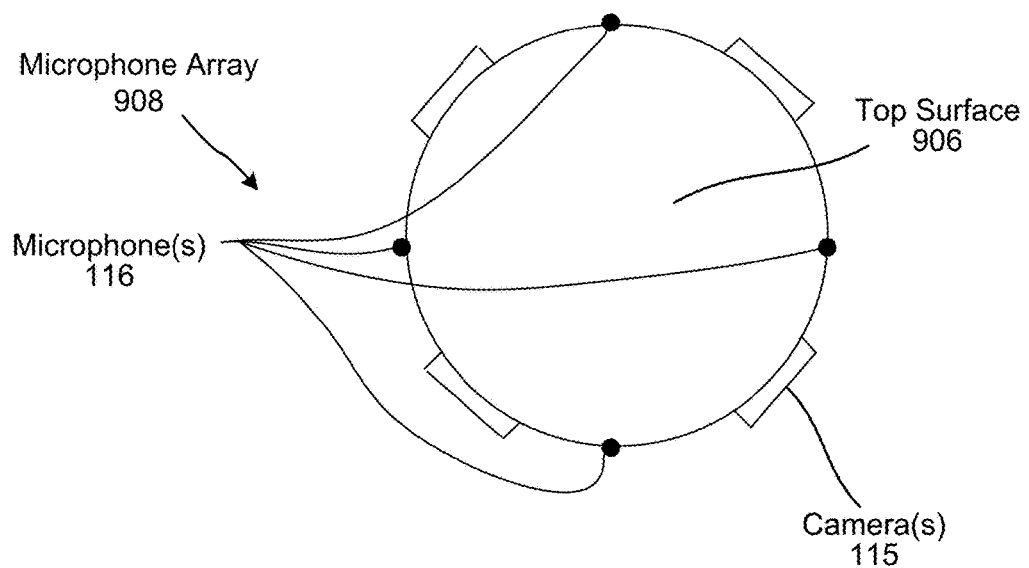

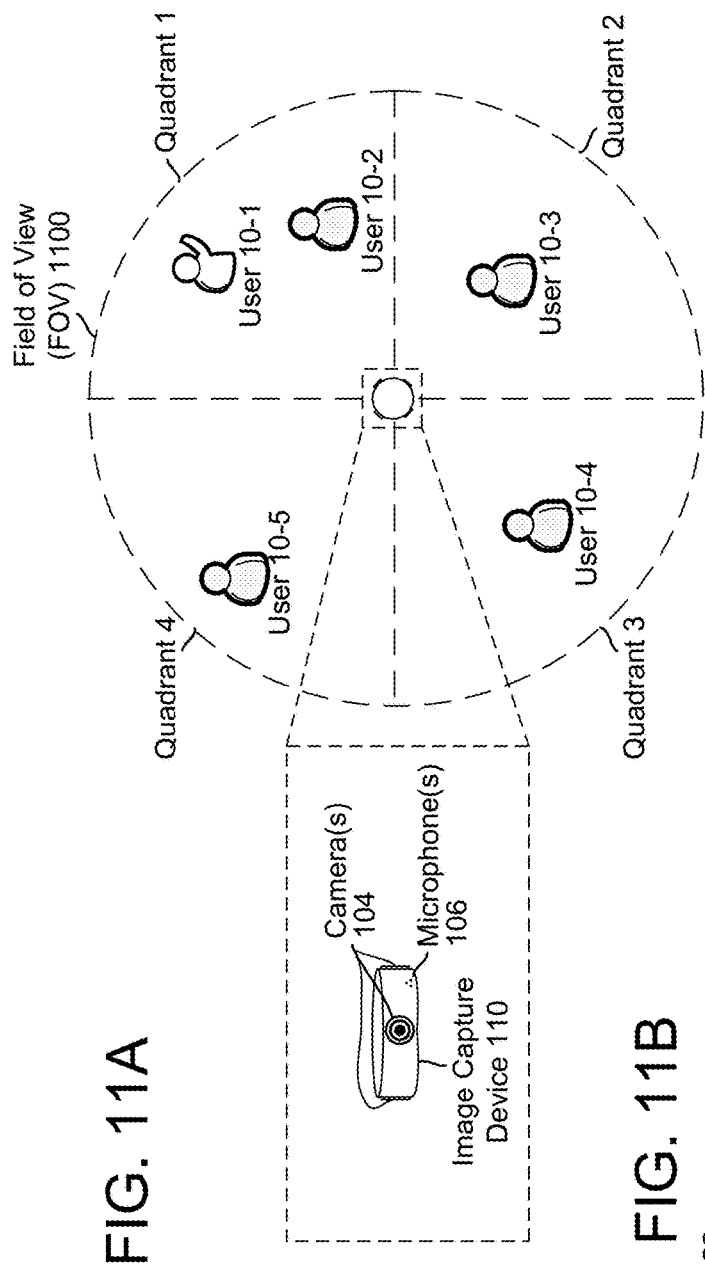
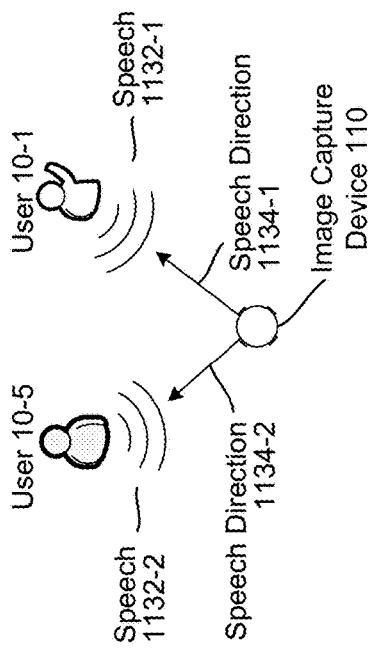
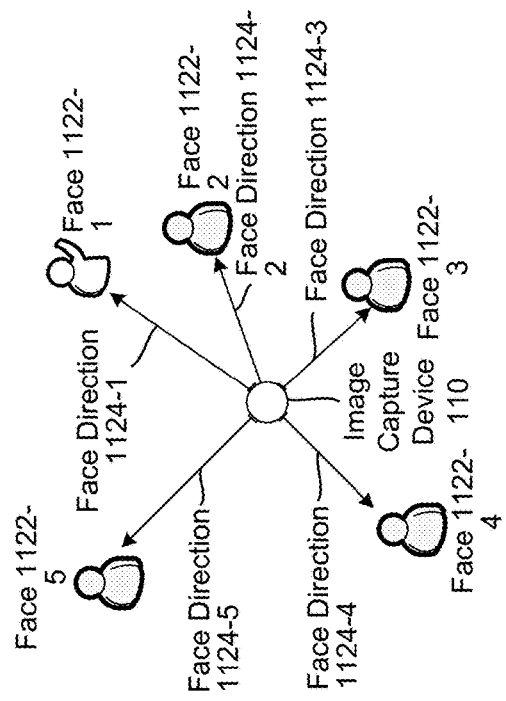
FIG. 11A
FIG. 11B
FIG. 11C

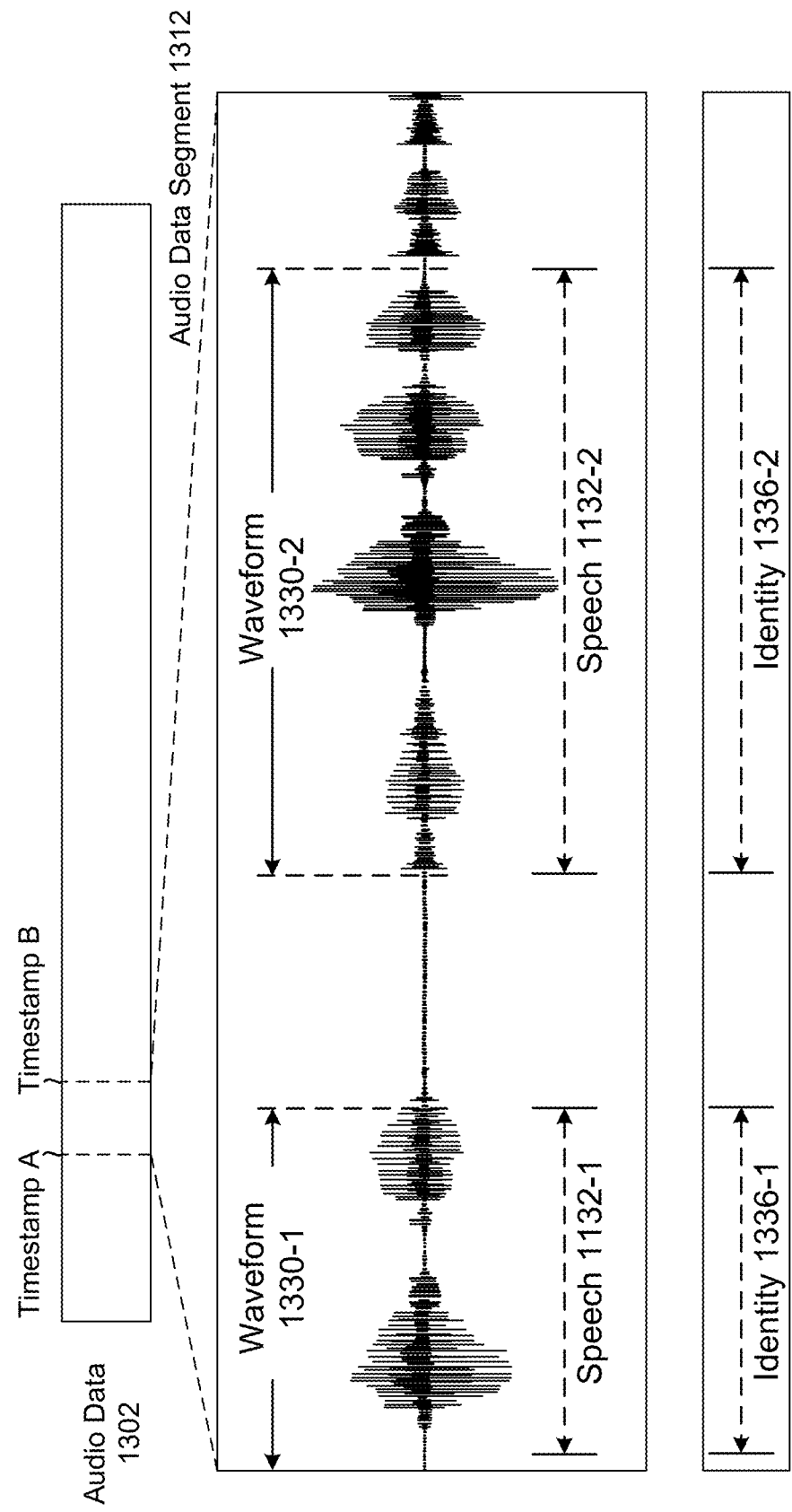

FIG. 14A

| Frame | Time, Location, Motion, Faces, Humans, Scenes, Audio, Landmarks, Objects, Pets, Directional Data, etc. |
|---|---|
| Frame 1 | |
| Frame 2 | |
| Frame 3 | |
| Frame 10 | |
| Frame 11 | |
| Frame 30 | |
| Frame 35 | |

Annotation Database 1410

FIG. 14C

| Frame | Priority Metric | Time, Location, Motion, Faces, Humans, Scenes, Audio, Landmarks, Objects, Pets, Directional Data, etc. |
|---|---|---|
| Frames 1-200 | | |
| Frames 350-600 | | |
| Frames 800-1200 | | |
| Frames 1500-1650 | | |
| Frames 2000-2200 | | |
| Frames 2400-2550 | | |
| Summary Data | | |

Annotation Database 1414

FIG. 14D

| Clip | Frames Included | Priority Metric | Summary Data | Time/Position of interesting moments |
|------|----------------|-----------------|--------------|--------------------------------------|
| Clip 1 | | | | |
| Clip 2 | | | | |
| Clip 3 | | | | |
| Clip 4 | | | | |
| Clip 5 | | | | |
| Clip 6 | | | | |
| Clip 7 | | | | |

Master Clip Table (MCT) 1420

FIG. 14E

| Clip | Capture Date | Frames Included | Priority Metric | Summary Data | Time/Position of interesting moments |
|---|---|---|---|---|---|
| Clip 1 | 9/15/2015 | | | | |
| Clip 2 | 9/15/2015 | | | | |
| Clip 3 | 9/15/2015 | | | | |
| Clip 4 | 9/15/2015 | | | | |
| Clip 50 | 9/24/2015 | | | | |
| Clip 51 | 9/24/2015 | | | | |
| Clip 52 | 9/24/2015 | | | | |

Master Clip Table (MCT) 1422

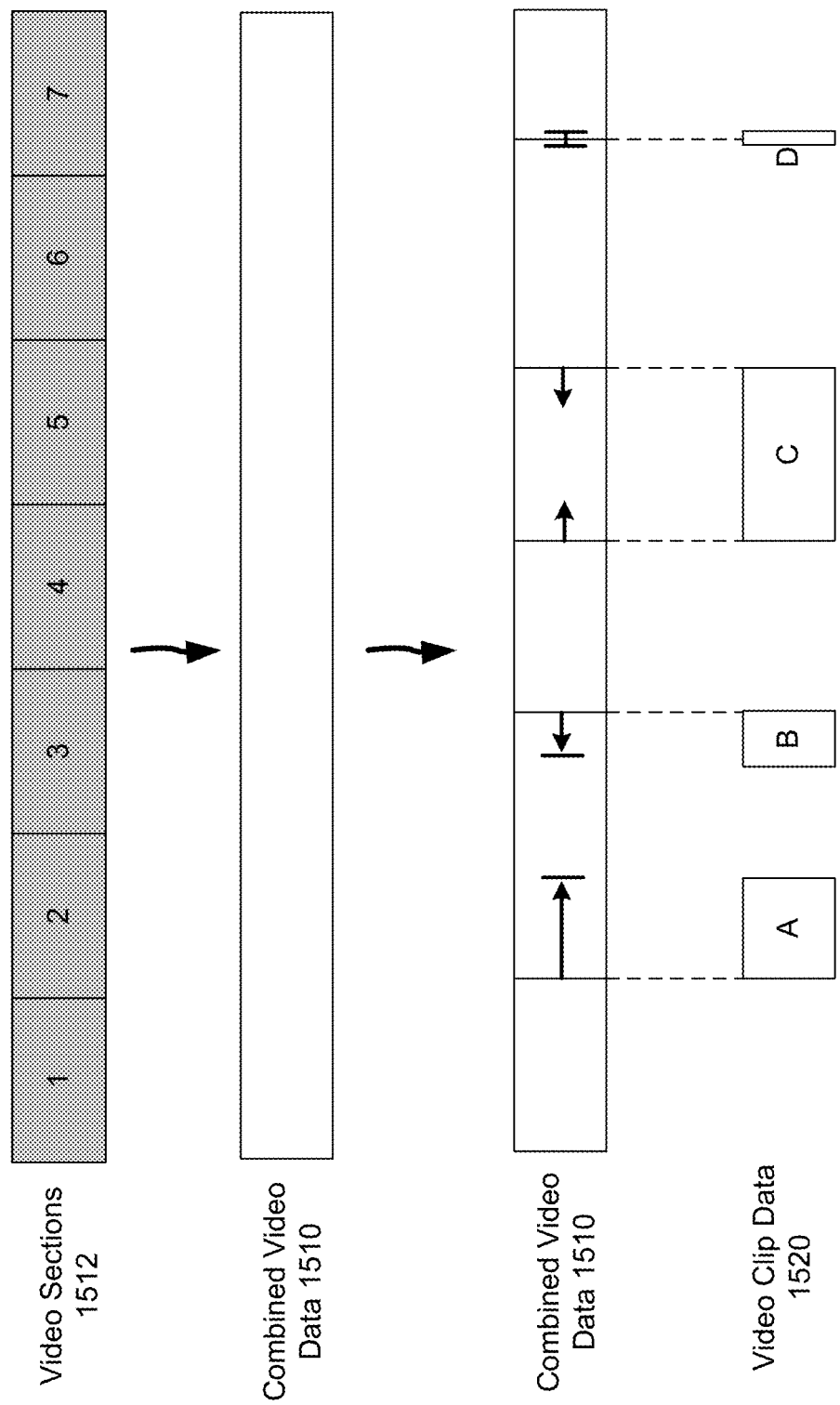

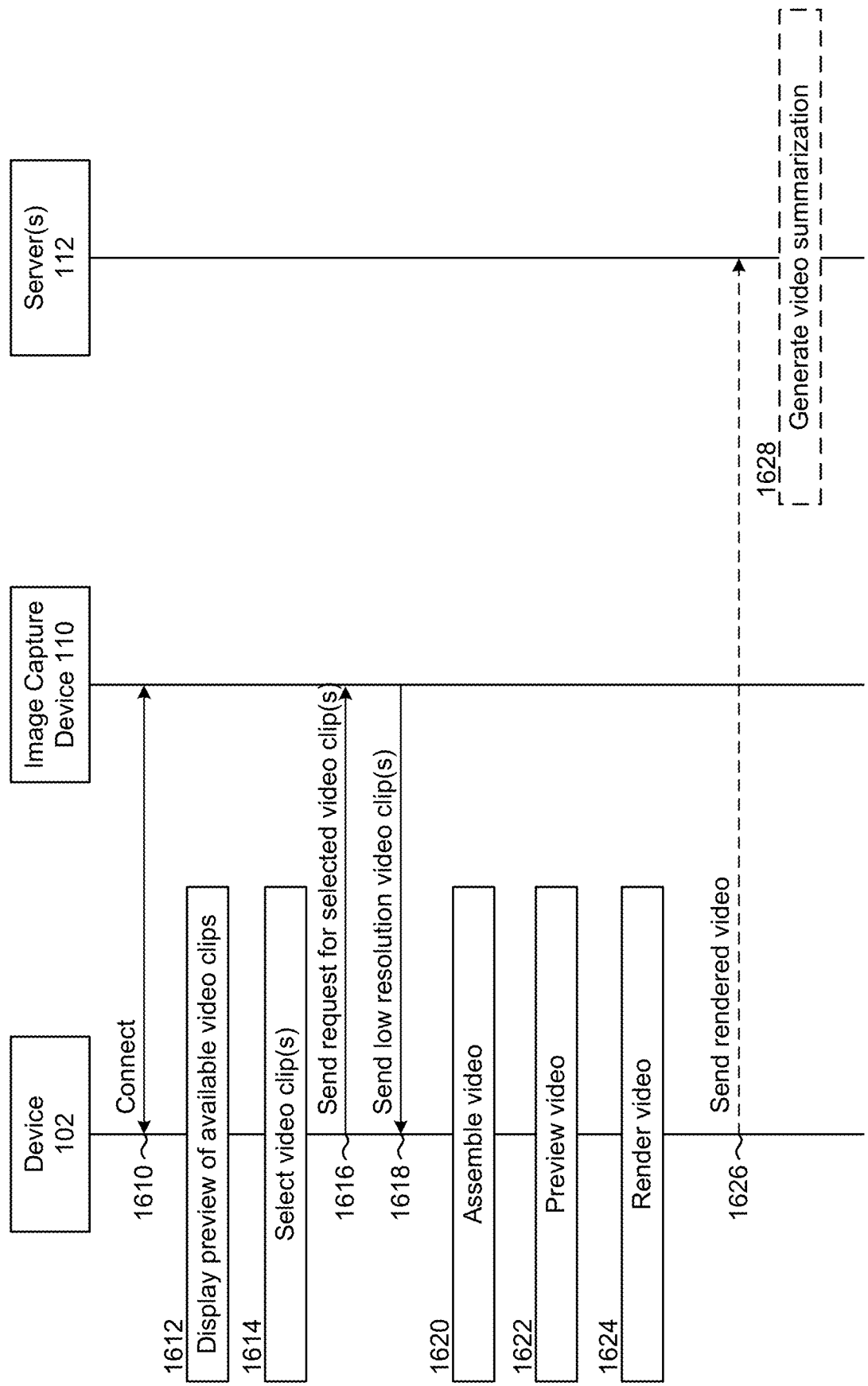

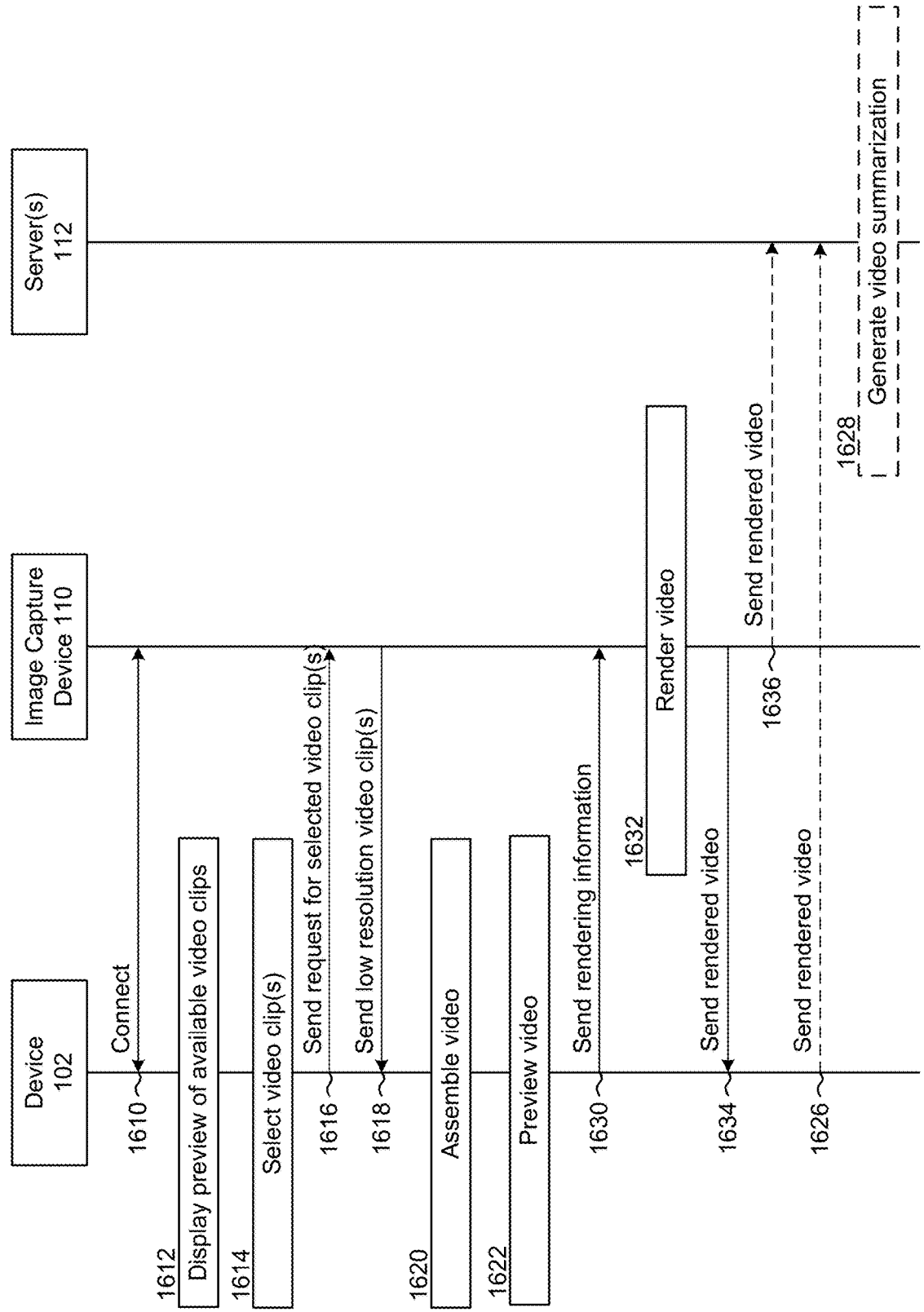

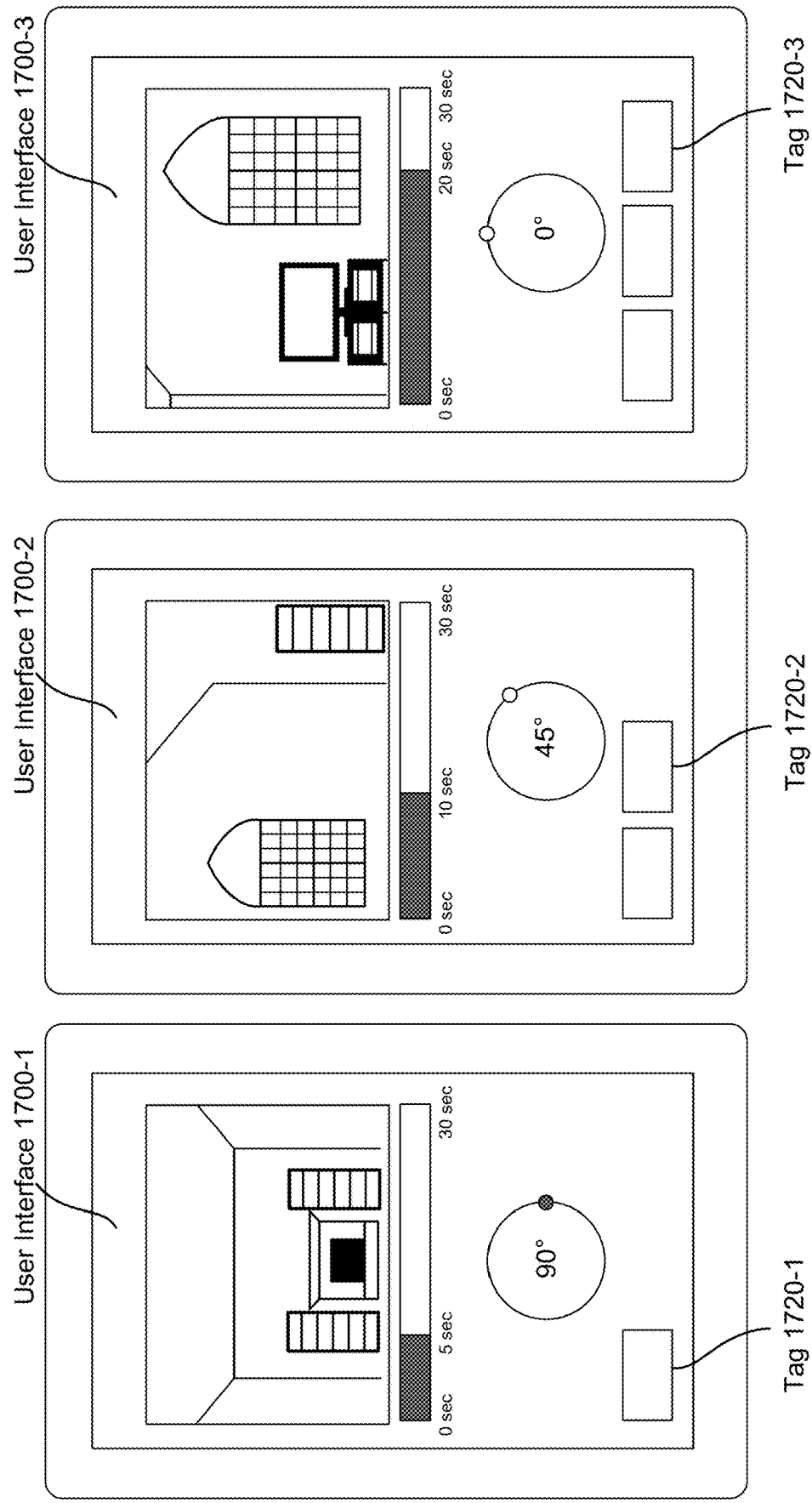

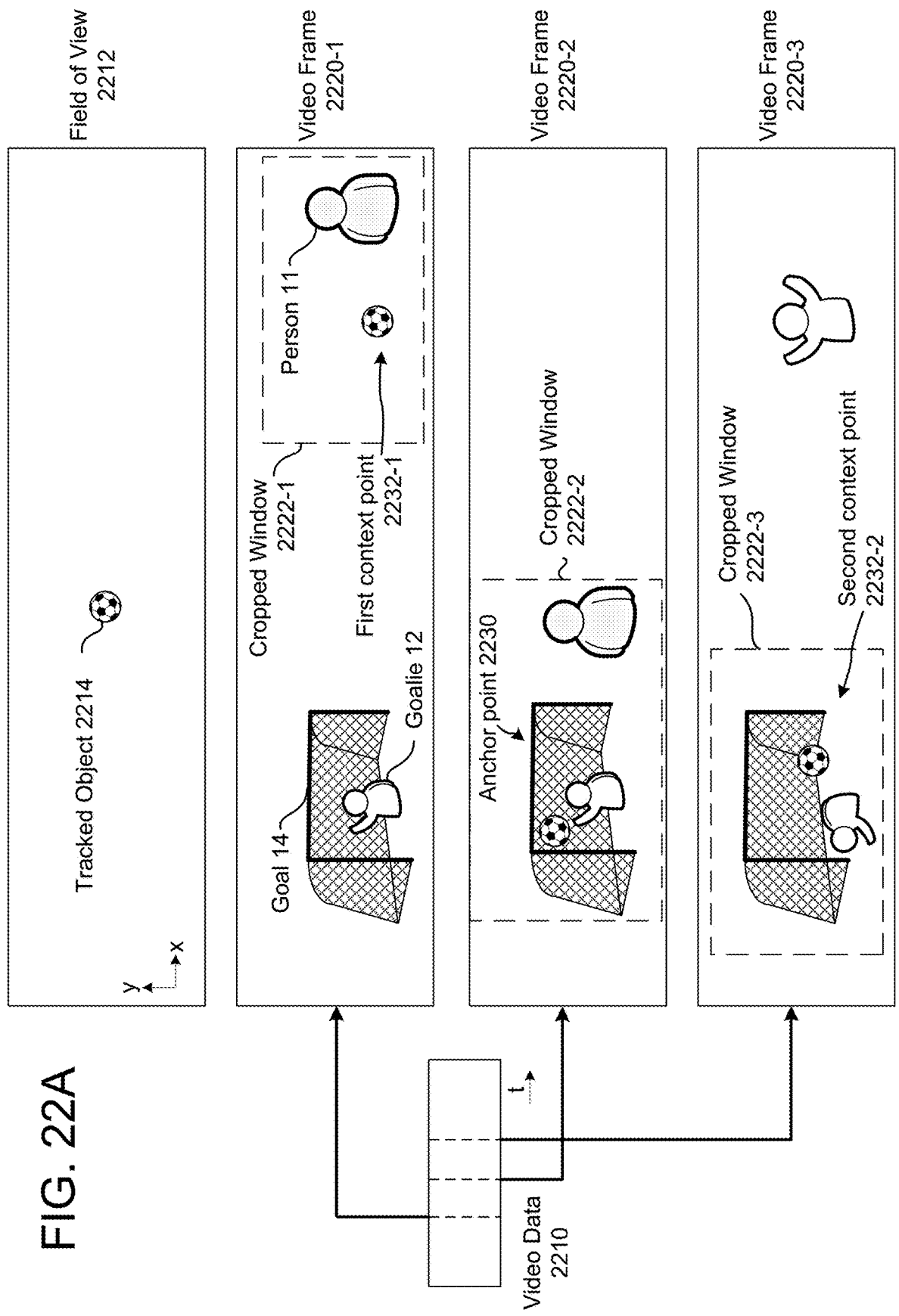

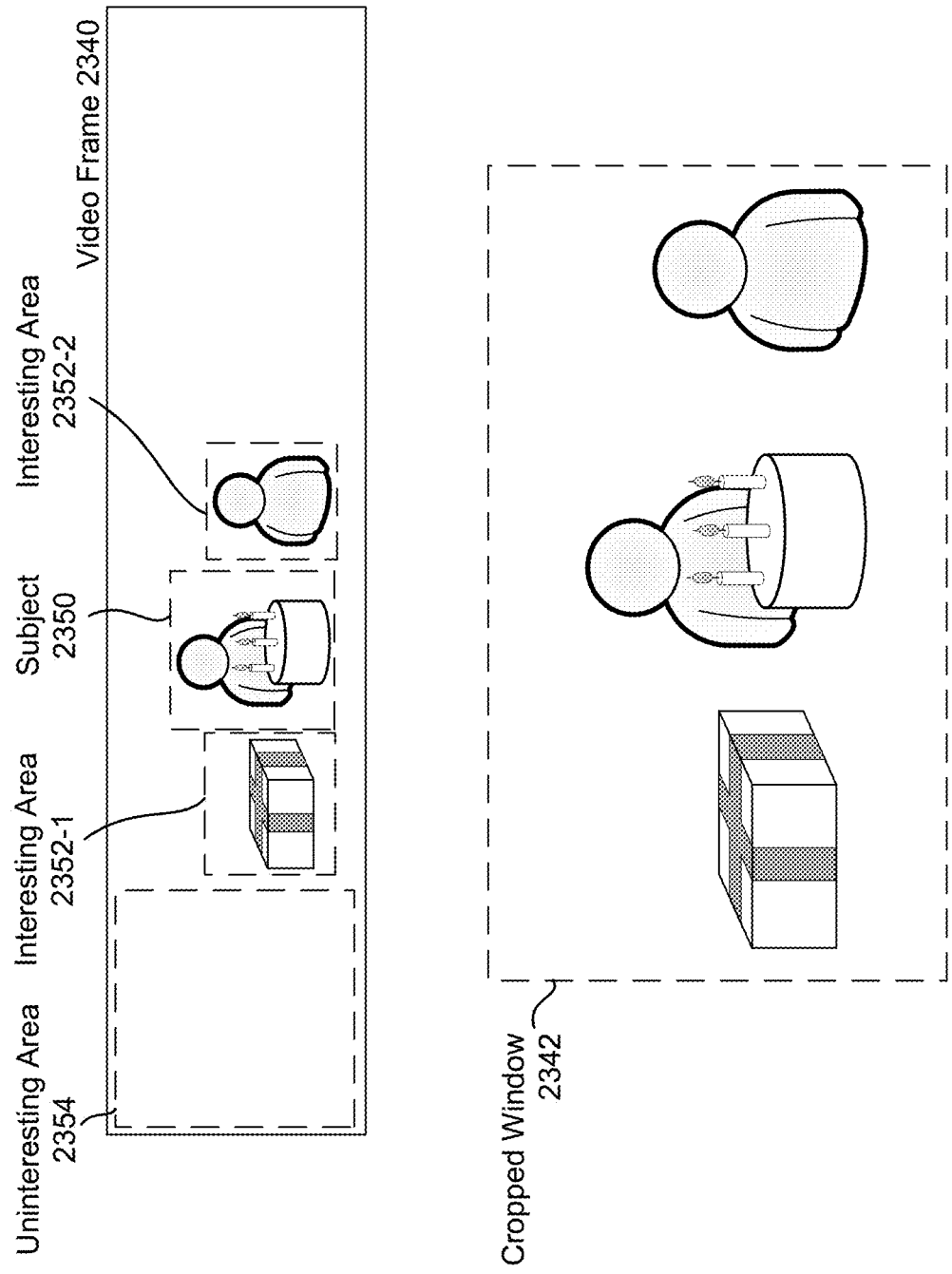

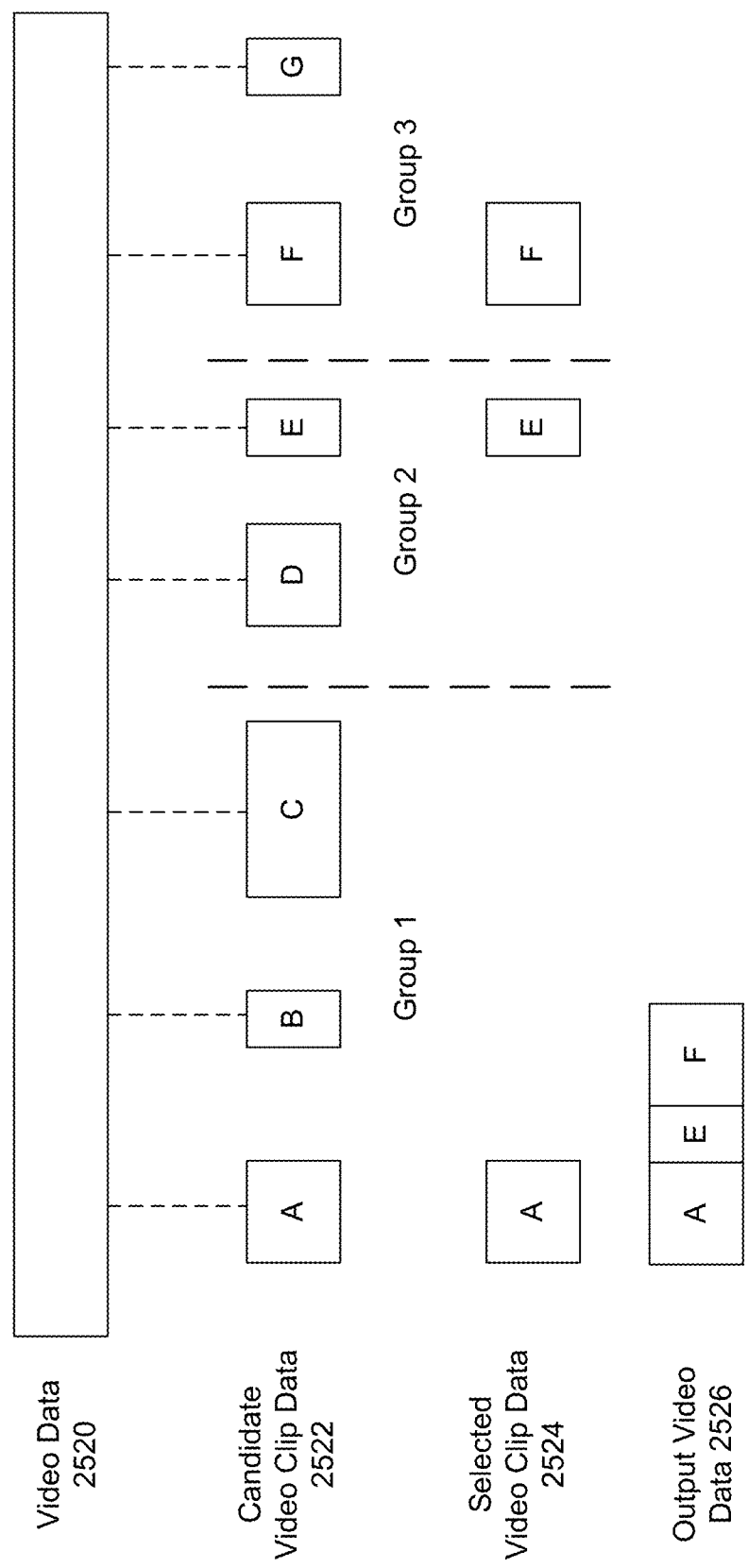

VIDEO INGESTION AND CLIP CREATION

CROSS-REFERENCE TO RELATED APPLICATION

This application is a continuation of, and claims the benefit of priority of, U.S. Non-Provisional patent application Ser. No. 14/870,227, filed Sep. 30, 2015, and entitled "VIDEO INGESTION AND CLIP CREATION," in the name of Matthew Alan Townsend, et al., the contents of which are expressly incorporated herein by reference in their entirety.

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated and shared.

BRIEF DESCRIPTION OF DRAWINGS

For a more complete understanding of the present disclosure, reference is now made to the following description taken in conjunction with the accompanying drawings.

FIGS. 1A-1C illustrate overviews of systems for implementing embodiments of the present disclosure.

FIGS. 2A-2B illustrate examples of a panoramic image, a cropped image and a user interface including an angle indicator according to embodiments of the present disclosure.

FIG. 3 illustrates examples of different processing performed according to embodiments of the present disclosure.

FIG. 5 illustrates an example of uploading individual video sections to improve a latency associated with annotating the video data according to embodiments of the present disclosure.

FIGS. 6A-6B conceptually illustrate example methods for uploading video data using automated processing according to embodiments of the present disclosure.

FIG. 9 is an illustration of an audio component that may be used according to embodiments of the present disclosure.

FIGS. 11A-11C illustrate examples of determining directions of faces and speech according to embodiments of the present disclosure.

FIG. 13 illustrates an example of generating an identity label using audio data according to embodiments of the present disclosure.

FIGS. 14A-14H illustrate examples of annotation data according to embodiments of the present disclosure.

FIG. 15 illustrates an example of combining video sections to form video data and extracting selected video clip data according to embodiments of the present disclosure.

FIGS. 16A-16B are communication diagrams conceptually illustrating example methods for rendering video data using manual processing according to embodiments of the present disclosure.

FIGS. 17A-17C illustrate an example of generating multiple video tags according to embodiments of the present disclosure.

FIGS. 22A-22B illustrate examples of tracking objects according to embodiments of the present disclosure.

FIGS. 23A-23B illustrate examples of selecting interesting areas according to embodiments of the present disclosure.

FIGS. 25A-25C illustrates an example of generating a video summarization according to embodiments of the present disclosure.

DETAILED DESCRIPTION

Figure 2B:
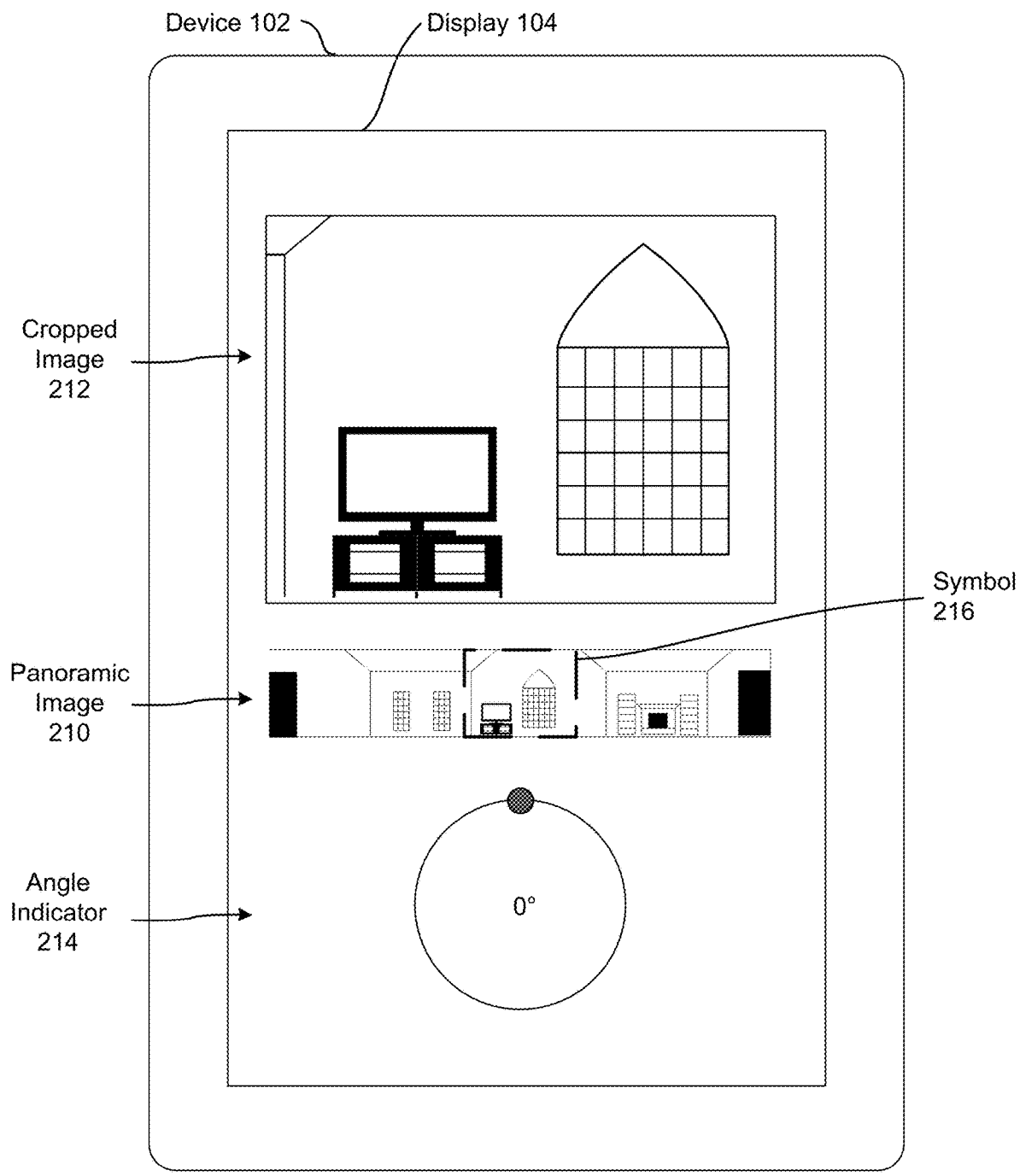

Electronic devices are commonly used to capture image/video data using one or more cameras. The device may capture video data including a wide field of view in order to capture a wide area and the video data may be captured over a lengthy period of time. Therefore, the video data may benefit from video editing prior to being displayed and/or shared via social networking. However, video editing may be time consuming and require specialized software to be performed.

To improve a video editing process, devices, systems and methods are disclosed that generate a video summarization that condenses lengthy video data (e.g., over an hour of recording) in a short video summary (e.g., 2-5 minutes) highlighting interesting events that occurred in the video data. The system may incorporate several models and techniques to determine what subject matter is interesting to include in the summarization. In addition, the device may generate output video in an aspect ratio suitable for viewing devices and in a format that may be viewed on a user device.

FIG. 1A illustrates an overview of a system 100 for implementing embodiments of the disclosure. The system 100 includes a device 102 having a display 104, an image capture device 110 and server(s) 112 all in communication with each other. While the following descriptions (of either FIG. 1A or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, while FIG. 1A illustrates the device 102 receiving input from a user 10, the image capture device 110 and/or the server(s) 112 may receive input from the user 10 without departing from the disclosure.

As illustrated in FIG. 1A, the image capture device 110 may begin (120) capturing video and may break (122) the video data (e.g., raw video data, panoramic video data or the like) into sections of video data (e.g., video sections). For example, raw video data may be video data in a first format, such as HD formatted video data, 4K formatted video data, stacked video data with a resolution of 2600 pixels by 2196 pixels, or some other format. The raw video data may be data output from one or more image sensors (e.g., the raw video data may be stitched together between multiple cameras) without being processed and/or compressed into a viewable video format. Thus, the device 102, image capture device 110 and/or server(s) 112 require software to interpret and display the raw video data. In contrast, panoramic video data may be video data in a second format that may be displayed on the device 102, such as video data with a resolution of 5200 pixels by 1080 pixels. The panoramic video data may include data output from the one or more image sensors after being processed and/or compressed into a viewable video format. In some examples, the image capture device 110 may generate the panoramic video data from the raw video data prior to sending the video data to the device 102 and/or server(s) 112. The device 102 may employ specialized software to view the raw video data, whereas the device 102 may view the panoramic video data with general software.

After completion of (or during) video capture for individual video sections, the image capture device 110 may send (124) the individual video sections and optional additional data and the server(s) 112 may receive (126) the individual video sections and the optional additional data and may annotate (128) individual video sections upon receiving an entirety of an individual video section (e.g., completion of an upload).

The additional data may include audio data, Inertial Measurement Unit (IMU) data from sensors (e.g., gyroscope, accelerometer, etc.) on the image capture device 110, video tags input to the image capture device 110, Global Positioning System (GPS) data indicating a geographic location of the image capture device 110, a frame selector statistic or the like. The image capture device 110 may determine the frame selector statistic from the video data (e.g., using every video frame, using a sampling rate of 1 Hz or the like) and the frame selector statistic may identify transitions in the video data. For example, the video data may include three distinct portions, such as a first indoor scene, a second outdoor scene and a third indoor scene, the frame selector statistic may identify the three unique portions by determining a similarity between individual video frames using color, correlation, motion data or the like and may group the video frames into three groups.

In some examples, the image capture device 110 may send the individual video sections in chronological order and the server(s) 112 may annotate the individual video sections in chronological order. However, the disclosure is not limited thereto and the image capture device 110 may send the individual video sections in any order and/or the server(s) 112 may annotate the individual video sections in any order. For example, the image capture device 110 may determine that a portion of the video data is more interesting (for example, using the additional data, using computer vision (CV) processing or the like) or includes more variety/transitions and may prioritize the individual video sections associated with this portion of the video data. As an example, the image capture device 110 may determine that the video data includes three unique portions and that the third portion includes more motion data and/or transitions. Instead of sending the individual video sections in chronological order, the image capture device 110 may send the individual video sections corresponding to the third portion first and the server(s) 112 may annotate the individual video sections corresponding to the third portion before annotating the remaining video sections. Additionally or alternatively, the image capture device 110 may send only a portion of the overall video data (e.g., send individual video sections corresponding to the third portion without sending the video sections corresponding to the first portion and the second portion) and/or the server(s) 112 may annotate only a portion of the individual video sections received (e.g., annotate the individual video sections corresponding to the third portion without annotating the remaining video sections).

The server(s) 112 may annotate the video sections to generate annotation data that may be stored in an annotation database. For example, the sever(s) 112 may generate annotation data based on the video data (e.g., using computer vision processing or the like), such as annotation data associated with time (e.g., a timestamp, a period of time, etc.), location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame), although the disclosure is not limited thereto and the server(s) 112 may generate additional annotation data as discussed below with regard to FIGS. 7-14H.

In addition to the annotation data generated based on the video data, the server(s) 112 may store annotation data corresponding to video tags and/or additional data. Additional data may include dates of holidays, events, sports scores or the like that may be associated with the video data based on proximity in time and/or space. For example, the additional data may include an event (e.g., a concert) at a geographic location on a specific date, and the server(s) 112 may associate the video data with the event when the video data is associated with the geographic location and the specific date.

A video tag is a tag (i.e., data structure) including annotation information that may be used in video summarization and/or rendering information that may be used to render a video. Examples of annotation information include an object, a person, an identity, an angle, a size, a position and/or a timestamp (e.g., a time associated with receiving user input, a time associated with an individual video frame, a range of time associated with a sequence of video frames or the like) associated with video frame(s). The annotation information may be input by a user or determined by the device 102, the image capture device 110 and/or the server(s) 112. Examples of rendering information include information used to render a video, such a sequence/order of video data in the rendered video, a begin point and end point associated with individual video clips included in the video, coordinates associated with cropping/panning within the video data, a theme, special effects, filters, layouts and/or transitions between video clips, audio data (e.g., musical track(s) or the like) and/or other editing effects known to one of skill in the art.

The image capture device 110 may end video capture and the server(s) 112 may determine (130) that a final video section is received and annotated. However, while FIG. 1A illustrates the image capture device 110 sending the video sections while capturing the video data, the present disclosure is not limited thereto. Instead, the image capture device 110 may capture the video data at a first time and upload the video data at a later time without departing from the present disclosure.

The server(s) 112 may generate (132) a master clip table (MCT), combine (134) the video sections sequentially to form combined video data and may extract (136) selected clips, as will be discussed in greater detail below. For example, the MCT may include a list of selected video clips from the combined video data, along with additional data such as frames included in a video clip, a priority metric associated with the video clip, summary data associated with the video clip and a time/position associated with interesting moment(s) within the video clip. A moment may be a particular sequence of video over time (i.e., over multiple frames of the video data) and over a particular coordinate position range within each frame (e.g., pixels within an X-Y coordinate range) where the position range may be less than an entire frame (i.e., less than a 360 degree panoramic frame). The particular position range may change between individual frames for a particular moment, that is the position range may change in size or move relative to a video frame boundary across video frames for a particular moment. In some examples, the MCT may include every video clip included in the video data (e.g., the video data is segmented into sequential video clips, each of which is included in the MCT), but the disclosure is not limited thereto and the MCT may include only a portion of the video clips (e.g., interesting video clips associated with a portion of the video data). Using the MCT, the server(s) 112 may extract a portion of the selected video clips to generate a plurality of video clips from the combined video data.

The server(s) 112 may generate the MCT based on priority metrics determined from annotation data. The server(s) 112 may determine a priority metric associated with each video frame in the video data, with individual video frames (e.g., selected video frames based on content represented in the selected video frames), with groups of video frames (e.g., tracks or moments) and/or with video clips. For example, the server(s) 112 may determine first priority metrics associated with individual video frames to determine interesting portions of the video data. Using the annotation data, the server(s) 112 may identify transitions within the video data (e.g., tracks), may group interesting video frames based on the transitions to determine moments and may determine second priority metrics associated with individual moments. The server(s) 112 may then extract video clips including interesting moments and may determine third priority metrics associated with individual video clips. Thus, the server(s) 112 may identify the most interesting video frames, may identify moments including the most interesting video frames and may generate video clips including the most interesting moments. The server(s) 112 may compare the priority metrics to each other (e.g., relative priority metrics) or to a global threshold (e.g., absolute priority metrics) to generate the MCT.

The server(s) 112 may identify transitions using a frame selector statistic. The frame selector statistic may determine if a first frame (e.g., frame number 1) is similar to a second frame (e.g., frame number 31) based on color data, correlation, motion data or the like. The frame selector statistic may be determined for each video frame in the video data or using a sampling rate (e.g., 1 Hz). Using the frame selector statistic, the server(s) 112 may identify the transitions within the video data and may generate tracks of video frames. For example, the server(s) 112 may group a first series of video frames prior to a first transition as a first track and may group a second series of video frames after the first transition as a second track. Thus, the server(s) 112 may identify a beginning video frame and an ending video frame associated with each track. The server(s) 112 may chain individual tracks together to generate video clips, with boundaries of the video clips corresponding to boundaries of the tracks (e.g., transitions identified by the frame selector statistic).

FIG. 1B illustrates another overview of the system 100 implementing embodiments of the disclosure. The system 100 includes a device 102 having a display 104, an image capture device 110 and server(s) 112 all in communication with each other.

As illustrated in FIG. 1B, the device 102 and the image capture device 110 may connect (150), which involves establishing a connection (e.g., pairing) between the device 102 and the image capture device 110. For example, the connection may allow the device 102 to view video data stored on the image capture device 110, change settings on the image capture device 110 or the like.

The image capture device 110 may send (152) low resolution video data, which may include raw video data and/or panoramic video data, and the device 102 may receive (154) the low resolution video data. As discussed above with regard to FIG. 1A, the image capture device 110 may optionally send additional data (e.g., audio data, IMU data, user tags, geographic location data, frame selector statistics or the like) in addition to the video data. The image capture device 110 may generate the low resolution video data using downsampling or other techniques known to one of skill in the art. The image capture device 110 may send the low resolution video data to reduce a processing, memory and/or bandwidth consumption associated with viewing the video data on the device 102 and/or reduce a latency perceived by the user 10. While steps 152-154 illustrate the image capture device 110 sending low resolution video data, the present disclosure is not limited thereto. Instead, the image capture device 110 may send video data without resizing without departing from the disclosure, despite the low resolution video data requiring less bandwidth/processor consumption.

The device 102 may assemble (156) a video. For example, the device 102 may organize the selected video data, select a begin point and end point associated with individual videos included in the video data, select a theme, control panning within the panoramic video data, add special effects, add filters, determine layouts and/or transitions between video clips, add audio data (e.g., musical track(s) or the like) and/or perform other editing techniques known to one of skill in the art (collectively referred to as rendering information).

In some examples, the device 102 may assemble the video based on user input. For example, the device 102 may display a user interface (UI) and the video data to the user and may receive input selecting the rendering information. The device 102 may optionally analyze the video data (e.g., using computer vision or the like) and suggest rendering information or display additional options available to the user. For example, the device 102 may determine transitions in the video data (e.g., determine a frame selector statistic identifying transitions by determining a similarity between individual video frames) and may display a suggested begin point and end point for a video clip based on the transitions. In some examples, the device 102 may extract video clips without user input, such as using the computer vision and/or frame selector statistic discussed above. The device 102 may preview (158) the video and perform additional video editing or preview a final version of the video.

The device 102 may send (160) rendering information to the image capture device 110, the image capture device 110 may receive (162) the rendering information, may render (164) the video, may send (166) the rendered video to the device 102 and the device 102 may receive (168) the rendered video. The rendering information may include the changes input to the device 102 in order to assemble the video in step 156. For example, the rendering information may indicate an order of the video data, the begin point and end point associated with the individual videos included in the video data, the selected theme, the selected panning for the individual videos, the special effects, the audio data and/or other editing steps. Examples of editing the video will be described in greater detail below with regard to generating video tags, which are data structures generated by the device 102 that include the rendering information and/or annotation data. For example, a first video tag may indicate the order of the videos, a second video tag may indicate the begin point and the end point associated with a single video, etc. Additionally or alternatively, a single video tag may include multiple edits, such as a first video tag indicating the begin point and the end point associated with a single video along with the selected panning for the single video and the special effects and/or audio data associated with the selected video. The video tags may correspond to individual videos or a group of videos without departing from the disclosure. While the examples described above refer to video tags including rendering information (e.g., editing steps used to render the video), a video tag may include annotation data (e.g., information about the video data) without departing from the disclosure.

While FIG. 1B illustrates the image capture device 110 sending the rendered video to the device 102, the present disclosure is not limited thereto. Instead, the image capture device 110 may send the rendered video to the server(s) 112 and the server(s) 112 may use the rendered video to generate a video summarization that may be sent to the device 102 or other devices.

The image capture device 110 may generate a video clip on the image capture device 110 using the raw video data stored on the image capture device 110. Additionally or alternatively, the image capture device 110 may generate the video clip using the panoramic video data stored on the image capture device 110 without departing from the disclosure. Thus, the image capture device 110 may render the video using high resolution inputs, resulting in the rendered video having a high resolution. For example, the image capture device 110 may render the video from the raw video data having a resolution of 2600 pixels by 2196 pixels or from the panoramic video data having a resolution of 5200 pixels by 1080 pixels without downsampling (e.g., reducing the resolution by discarding pixels, approximating pixel values and/or interpolating pixel values). However, the disclosure is not limited thereto. Instead, the image capture device 110 may downsample the raw video data to generate rendered video having a resolution of 1300 pixels by 1080 pixels or may downsample the panoramic video data to generate rendered video having a resolution of 2600 pixels by 540 pixels. Additionally or alternatively, the image capture device 110 may generate the rendered video having a resolution of 1920 pixels by 1080 pixels using a specific angle or directional view within the panoramic video data. However, the amount of downsampling may vary and the present disclosure is not limited thereto.

FIG. 1C illustrates another overview of a system 100 for implementing embodiments of the disclosure. The system 100 includes a device 102 having a display 104, an image capture device 110 and server(s) 112 all in communication with each other.

As illustrated in FIG. 1C, the server(s) 112 may receive (170) video data and, in some examples, additional data (e.g., audio data, IMU data, user tags, geographic location data, frame selector statistics or the like) in addition to the video data as discussed above with regard to FIG. 1A, The server(s) 112 may receive (172) annotation data and may determine (174) a theme. Thus, the server(s) 112 may analyze the annotation data to select a series of output theme(s) and formats that corresponds to the received video data. For example, the server(s) 112 may scan the master clip table (MCT) to extract facts about the video clips and assemble a collection of heuristic variables and truths. The server(s) 112 may include additional data, such as dates of holidays, events, sports scores or the like. The server(s) 112 may use a rule management system to evaluate each moment against a selector for a candidate theme, and may send the output scores from the themes into another scorecard to make a decision (e.g., thresholding). For example, if the video data included video clips of children opening packages and a Christmas tree, the server(s) 112 may identify multiple candidate themes and an output score for each. By ranking the output scores, the server(s) 112 may determine that the theme is "Holidays." In some examples, the server(s) 112 may output a desired number of themes (e.g., top three scoring themes), or may output themes with a score greater than a threshold. The server(s) 112 may generate multiple video summarizations or may store the themes for user feedback after generating a single video summarization.

The server(s) 112 may determine the theme based on annotation data such as scenes (e.g., indoor, outdoor, sports arena, etc.), number of people (e.g., individual or group of individuals), motion data (e.g., fast moving scene, slow moving scene, motion associated with the image capture device, etc.), specific object detection (e.g., birthday cake, balloons, etc.) or the like. For example, the specific object detection may identify specific objects associated with a birthday party (e.g., birthday cake, gifts, balloons, etc.), with a wedding (e.g., wedding cake, wedding dress, formal attire, etc.), a sporting event (e.g., sports arena, uniforms, etc.), a road trip (e.g., components of a vehicle, roads, etc.) or the like. The theme may be associated with a structure (e.g., sequence of video clips), layouts (e.g., number of video clips visible in a video frame), transitions (e.g., swipe, translate, slide, fade, etc.) between video clips/layouts, special effects (e.g., vignette, film scratches, flash bulb effect, etc.), scripted sequences (e.g., specific order of layouts), pacing (e.g., cadence of transitions, the video clips or audio data) and/or audio (e.g., music tracks corresponding to the video clips). For example, the server(s) 112 may apply an old black and white theme using a vignette, film scratches, desaturating to black and white, flash bulb effects and other special effects.

The server(s) 112 may rank (176) moments within the video data. For example, the server(s) 112 may determine a priority metric (e.g., interesting score) for moments within the video data using annotation data and/or retrieve the priority metric stored in the master clip table and may rank the moments using the priority metric. For example, a moment including multiple faces interacting with identifiable objects, good lighting, etc. may correspond to a high priority metric, whereas a moment including a landscape with no faces or identifiable objects may correspond to a low priority metric. The server(s) 112 may select (178) moments based on the ranking. In some examples, the server(s) 112 may select moments associated with priority metrics exceeding a threshold. Thus, the server(s) 112 selects as many moments that exist that exceed the threshold. However, in other examples the server(s) 112 may rank the moments and may only select a portion of the moments with priority metrics exceeding the threshold. For example, the server(s) 112 may select a desired number of moments based on the rankings (e.g., the top thirty moments or the like). Thus, the server(s) 112 may select the number of moments based on the desired number to include in the video summarization, instead of selecting all moments exceeding a global priority threshold. In some examples, the threshold may be determined based on the desired number of moments to include, such that a first threshold for a first video summarization may be different from a second threshold for a second video summarization. In some examples, the server(s) 112 may select a desired number of moments to include from each video clip. For example, a first video clip may include the top three ranked moments, but the server(s) 112 may include only one moment from the first video clip and may include a fourth ranked moment from a second video clip.

The server(s) 112 may determine (180) a structure of the video summarization. The structure defines an outline to be used when assembling a video summarization. For example, the server(s) 112 may examine the top-rated moments and identify which scenes represented in the moments should be included. Depending on the amount of source material, there may be one or many scenes to include. If there are a number of scenes, the server(s) 112 may select only a portion of the scenes using techniques similar to those described in greater detail above. In some examples, the server(s) 112 may select scenes based on specific identities or people, specific objects, specific characteristics or the like, which may be determined based on the master clip table and/or annotation data. For example, the user 10 may request the video summarization to emphasize a child, a holiday video summarization may include video clips having a Christmas tree, or the like.

The server(s) 112 may generate (182) a video summarization. The video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined in steps 176-180. While generating the video summarization, the server(s) 112 may optionally perform video stabilization (or other video editing) prior to rendering the final video summarization.

While FIG. 1C refers to ranking and selecting moments, the disclosure is not limited thereto. Instead, the server(s) 112 may rank and select video clips or the like without departing from the disclosure. Further, the moments referenced in FIG. 1C may be a combination of multiple moments or a moment comprising an overlap between multiple moments. For example, a first moment may correspond to a first user 10-1 and a second moment may correspond to a second user 10-2. The server(s) 112 may generate a third moment corresponding to video frames where the first user 10-1 and the second user 10-2 are in proximity and/or interacting.

While multiple aspects/embodiments/features may be described on their own (e.g., separate examples illustrated in different figures below), the system 100 may incorporate multiple different features/embodiments as part of the same system without departing from the scope of the disclosure. Thus, the system 100 may include any and all combinations of the features illustrated in the drawings and discussed below without departing from the present disclosure.

As used herein, raw video data and panoramic video data may include video data having a field of view beyond 180 degrees, which corresponds to video data with an aspect ratio greater than 2:1. However, the present disclosure is not limited thereto and the video data may be any video data from which an output video having smaller dimensions may be generated. Raw video data may be video data in a first format with a first resolution that may use specialized software to display on the device 102. For example, raw video data may be stacked and a frame of raw video data may have a resolution of 2600 pixels by 2196 pixels, meaning that the field of view is split in half and one half is combined vertically with the other half. For example, 0-180 degrees of the field of view may be represented in a bottom half of the raw video data and 180-360 degrees of the field of view may be represented in a top half of the raw video data. The raw video data may be data output from one or more image sensors (e.g., the raw video data may be stitched together between multiple cameras) without being processed and/or compressed into a viewable video format. Thus, the device 102, image capture device 110 and/or server(s) 112 require software to interpret and display the raw video data. In contrast, panoramic video data may be video data in a second format with a second resolution that may be displayed on the device 102 without specialized software. For example, a frame of panoramic video data may have a resolution of 5200 pixels by 1080 pixels. The panoramic video data may include data output from the one or more image sensors after being processed and/or compressed into a viewable video format. The device 102, the image capture device 110 and/or the server(s) 112 may generate the panoramic video data from the raw video data, and in some examples the panoramic video data may be replaced with raw video data captured by the one or more cameras without departing from the present disclosure. Therefore, in addition to the panoramic video data making up an edited clip or a video clip generated from larger video data, in some examples the panoramic video data may be unedited video data generated from the raw video data without departing from the present disclosure. For example, a user of the device 102 may identify relevant video clips from the device, the image capture device 110 and/or the server(s) 112 or the user may identify portions of the raw video data for additional editing (e.g., such as specifying events of interest or regions of interest within the raw video data). The device 102 may then input the selected video clips and/or the selected portions of the raw video data as panoramic video data for further editing.

As used herein, a video clip may be a short section of the panoramic video data (or other aspect ratio video data) including content determined to be "interesting" or desirable for purposes of video summarization. For example, panoramic video data may include several video clips that the device 102, the image capture device 110 and/or the server(s) 112 may extract from the panoramic video data. The device 102, the image capture device 110 and/or the server(s) 112 may determine a priority metric associated with a video clip using annotation data, the priority metric corresponding to a likelihood of interesting content, and may extract video clips based on the priority metric. Similarly, as used herein a moment may be a region of interest within a video clip. For example, a video clip may include one or several moments associated with a region of interest (e.g., position within the video frame, object/person within the video frame, etc.). A moment may include a bounding box around an interesting object or section of the video clip over time, and additional data may indicate a per-frame priority metric for the moment, a position of a detected face in the video clip, an identity of the detected face, or the like.

In some examples, the device 102 may determine that commands were received without requiring an explicit command from a user. For example, the device 102 may determine that the user selected a direction of view while viewing the panoramic video data for a period of time exceeding a threshold. The device 102 may determine to generate a video tag based on the period of time exceeding the threshold. Thus, the device 102 may generate a video tag if the user exits the video playback on the device 102 or inputs another command. Similarly, if the device 102 determines that the user didn't change the direction of view while viewing the panoramic video data, the device 102 may generate a video tag with the default direction of view despite the user not selecting the default direction of view.

As used herein, an editing tag is a tag (i.e., data structure) including information that may be used to render a video, such as an object, a person, an identity, an angle, a size, a position and/or a timestamp (e.g., a time associated with receiving user input, a time associated with an individual video frame, a range of time associated with a sequence of video frames or the like) associated with video frame(s).

The image capture device 110 may capture the raw video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the raw video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures raw video data that corresponds to panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

When capturing raw video data, the image capture device 110 may initially capture video data extending in a first direction and may stack a first half of video data on a second half of video data in a second direction to generate raw video data having a resolution of 2600 pixels by 2196 pixels (e.g., aspect ratio of around 13:11). However, despite the raw video data having an aspect ratio below 2:1, the raw video data may be used to generate panoramic video data having a resolution of 5200 pixels by 1080 pixels (e.g., aspect ratio of around 24:5). For example, if the raw video data has a resolution of 2600 pixels by 2196 pixels, a pixel coordinate of a bottom left pixel in the raw video data may have pixel coordinates of (0, 0) in the panoramic video data, a pixel coordinate of a bottom right pixel in the raw video data may have pixel coordinates of (2600, 0) in the panoramic image, a pixel coordinate in a top left pixel in the raw video data may have pixel coordinates of (2601, 1080) in the panoramic image and a pixel coordinate in a top right pixel in the raw video data may have pixel coordinates of (5200, 1080) in the panoramic image.

Video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the annotation data (which includes video tags), thus including in the video summarization the portions of video data (including the objects, angles, and times or the like) indicated by a user and/or determined to be interesting (e.g., priority metric exceeding a threshold) by the server(s) 112. For example, a user 10 may be attending a party and may want to capture the party without being distracted from the party itself. Therefore, the user 10 may locate the image capture device 110 at a central location in a room during the party and may optionally generate video tags using the device 102 to identify moments of particular interest to be included in the video summarization. The image capture device 110 may capture video data throughout the party, but the user 10 may generate video tags for specific moments or specific guests at the party. The server(s) 112 may generate a number of video clips using the video tags, where the video clips are associated with a particular time/timestamp, date, and/or position based on the video tags. Additionally or alternatively, the server(s) 112 may determine video clips using annotation data, for example by determining a priority metric for individual video frames in the video data and generating video clips including video frames having a highest priority metric. The video clips may be ordered chronologically in the video summary, where included video clips are ordered by their relative recording time/timestamp, but the present disclosure is not limited thereto and the server(s) 112 may determine an order of the video clips. The video summarization may also include a collection of still images, in a manner akin to a picture slideshow, where the still images are selected from the video data and may include images that were the subject of tags received as described above.

In some examples, the device 102 may generate video tag(s) and transmit the video tag(s) to the server(s) 112. Each video tag may include information about at least an object, a person, an identity, an angle, a size, a position and/or a timestamp associated with a corresponding cropped image, although the present disclosure is not limited thereto. In some examples, the video tags may include pixel coordinates associated with the cropped image, while in other examples the video tags may include additional information such as pixel coordinates associated a subject within the cropped image or other information determined by the device 102. Using the video tags, the server(s) 112 may generate edited video clips of the panoramic video data, the edited video clips including portions of the panoramic video data specified by the video tags. For example, the server(s) 112 may generate a video summarization including a series of video clips, some of which include portions of the panoramic video data associated with the video tags.

As part of generating the video summarization, the device 102 may display the output video data and may request input from a user of the device 102. For example, the user 10 may instruct the device 102 to generate additional video data (e.g., create an additional video clip), to modify an amount of video data included in the output video data (e.g., change a beginning time and/or an ending time to increase or decrease a length of the output video data), to modify a portion of the video data included in the output video data (e.g., zoom or pan within the video data), specify an object of interest, specify an event of interest, specify or modify an angle associated with the output video data, increase or decrease a panning speed or the like. Thus, the server(s) 112 may generate the output video data, the device 102 may display the output video data to the user and receive feedback from the user and the server(s) 112 may generate additional or different output video data based on the user input. The video tags may be configured to be similarly modified by the user during a video editing process.

FIG. 2A illustrates an example of panoramic video data according to embodiments of the present disclosure. As illustrated in FIG. 2A, an image capture device 110 may use camera(s) 115 to capture raw video data corresponding to panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

FIG. 3 illustrates examples of different processing performed according to embodiments of the present disclosure. The system 100 may include three types of processing, with overlap between them. As a first example, remote storage processing 310 includes communication between an image capture device 110 and server(s) 112 to upload raw video data to the server(s) 112 for the server(s) 112 to perform additional processing on, such as generating annotation data, a master clip table, combining the raw video data and generating panoramic video data. While the device 102 is not illustrated in the remote storage processing 310, the present disclosure is not limited thereto. Instead, the device 102 may enable additional functionality and input from a user to assist the server(s) 112, such as the device 102 generating video tags from input from a user 10 that are sent to the server(s) 112.

As a second example, local storage processing 312 includes communication between the image capture device 110 and the device 102 to generate video clips to share. The video clips may be edited using input from the user 10 on the device 102 and the edited video clips may be rendered on the device 102, the image capture device 110 and/or the server(s) 112. In contrast to the remote storage processing 310, the local storage processing 312 does not upload raw video data to the server(s) 112 and may require additional input from the user 10 to generated video clips. Thus, the local storage processing 312 may typically include local processing and editing to generate video clips that may be shared by the device 102. However, the present disclosure is not limited thereto and the video clips may be uploaded to the server(s) 112 to share and/or for additional editing, such as video summarization.

As a third example, the story assembly processing 314 includes processing by the server(s) 112 after receiving video data (e.g., raw video data, panoramic video data, video clips, edited video clips or the like). Thus, the story assembly processing 314 may take the received video data and any additional inputs and may generate video clips and/or video summarization(s). While the device 102 and/or image capture device 110 is not illustrated in the story assembly processing 314, the present disclosure is not limited thereto. Instead, the device 102 and/or image capture device 110 may enable additional functionality and input from a user 10 to assist the server(s) 112, such as the device 102 displaying a first video summarization to a user 10, receiving feedback from the user 10 and sending the feedback to the server(s) 112 to generate a second video summarization, as described in greater detail below.

Figure 4:
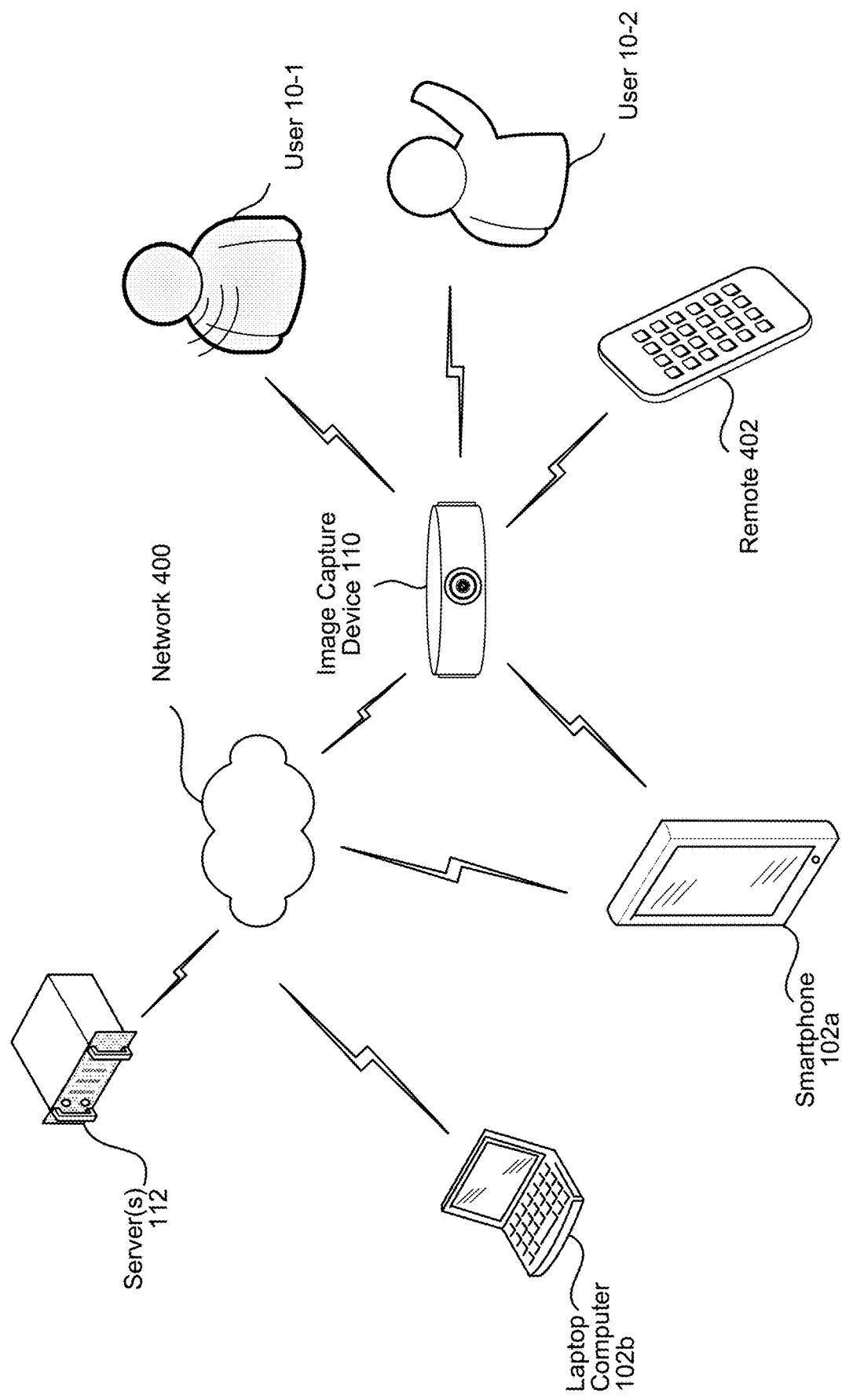
FIG. 4 illustrates an example of inputs to the device and communication paths between devices within the system according to embodiments of the present disclosure.

FIG. 4 illustrates an example of inputs to devices and communication paths between devices according to embodiments of the present disclosure. As illustrated in FIG. 4, the image capture device 110 may receive multiple inputs. As an example of a first input, the image capture device 110 may receive audio data from a microphone and the audio data may include a speech utterance from a first user 10-1. The image capture device 110 may perform Automatic Speech Recognition (ASR), keyword spotting, or other techniques on the audio data to determine a command associated with the speech utterance and may perform the command. For example, the image capture device 110 may generate a tag based on the command. Alternatively, the image capture device 110 may upload the audio data to the server(s) 112 and the server(s) 112 may perform ASR on the audio data and generate tags based on the speech utterance.

As an example of a second input, the image capture device 110 may receive video data from the camera(s) 115 and may analyze the video data for gestures and/or triggers as explained above. For example, the image capture device 110 may determine that a second user 10-2 performed a gesture and may interpret the gesture as a command to generate a tag. Alternatively, the image capture device 110 may identify a trigger included in the video data, such as a particular object or a particular face using facial recognition and may generate a tag associated with the trigger, as described in greater detail below.

As an example of a third input, the image capture device 110 may receive a signal from a remote 402, such as an infrared signal. The signal may include inputted text or a command to generate a tag. Therefore, the remote 402 may be included with the image capture device 110 to allow a user 10 to control the image capture device 110 without requiring the smartphone 102a or other devices.

As an example of a fourth input, the image capture device 110 may receive a signal directly from the smartphone 102a, such as Bluetooth or other wireless signals. The smartphone 102a may be used to input types of tags, tag priorities, camera locations, guest lists, guest relationships, guest priorities and customized triggers as discussed in greater detail below. The image capture device 110 may generate tags using the input from the smartphone 102a, for example based on interactions with an application on the smartphone 102a linked to the image capture device 110, etc. The image capture device 110 may also generate tags in response to a user pressing a button on the image capture device 110.

The server(s) 112 may be remote to other devices and may be accessible over network 400. For example, "cloud computing" techniques may make use include a number of servers in a remote facility and the server(s) 112 may be an individual server processing the video data from the image capture device 110. The network 400 may include a local or private network or may include a wide network such as the internet. Devices may be connected to the network 400 through either wired or wireless connections. For example, the smart phone 102a may be connected to the network 400 through a wireless service provider. Other devices, such as the image capture device 110, a laptop computer 102b, and/or server(s) 112, may connect to the network 400 through a wired connection. The server(s) 112 may be configured to receive, store, process and/or stream data related to, video data, image data and/or audio data associated with one or more of the image capture device 110, the smartphone 102a, the laptop computer 102b, etc.

As illustrated in FIG. 4, the server(s) 112 may receive multiple inputs from multiple devices. As a first example, the server(s) 112 may receive video data and tags from the image capture device 110. For example, the image capture device 110 may generate the tags using the inputs described above and may upload the video data and the tags to the server(s) 112 using a network connection. As a second example, the server(s) 112 may receive inputs from the smartphone 102a and/or the laptop computer 102b. For example, the smartphone 102a and/or the laptop computer 102b may be used to input types of tags, tag priorities, camera locations, guest lists, guest relationships, guest priorities and customized triggers. The server(s) 112 may generate tags using the input from the smartphone 102a and/or laptop computer 102b.

FIG. 5 illustrates an example of uploading and processing individual video sections to improve a latency associated with annotating the video data according to embodiments of the present disclosure. This process may be associated with the remote storage processing 310, which includes communication between an image capture device 110 and server(s) 112 to upload raw video data to the server(s) 112 for the server(s) 112 to perform additional processing, such as generating annotation data, generating a master clip table, combining the raw video data and generating panoramic video data, etc. However, the drawings and corresponding description are not limited to the remote storage processing 310 and may be applicable to the local storage processing 312 and/or the story assembly processing 314 without departing from the present disclosure. As illustrated, the image capture device 110 may divide video data into sections and upload individual sections to the server(s) 112, enabling the server(s) 112 to annotate (e.g., generate annotation data) the uploaded sections prior to receiving the entirety of the video data. Thus, by annotating individual video sections as they are uploaded, the server(s) 112 may reduce a latency associated with the annotating (as perceived by a user 10) as the server(s) 112 only have to annotate a portion of the video data after a final video section is uploaded.

As illustrated in FIG. 5, an image capture device 110 may capture video data 510-1 at a first time. After capturing video data exceeding a threshold, the image capture device 110 may divide the video data 510-1 into video sections 520-1 at the first time (e.g., first video section). The image capture device 110 may upload completed video sections 520-1, such as the first video section. This is indicated by the server(s) 112 receiving the first video section with a dotted line indicating that it is being uploaded.

The image capture device 110 may continue to capture video data 510-2 at a second time. At the second time, the image capture device 110 may divide the video data 510-2 into video sections 520-2 (e.g., first video section and second video section). Although the video data (510-2 and 510-3) in FIG. 5 is illustrated with dotted vertical lines delineating where the video section demarcations correspond to the video data, the video data may be received in a non-delineated form (for example, as part of a continuing video stream of incoming video data). Thus, dotted vertical lines in video data 510-2 and 510-3 are included only for illustrative purposes to illustrate the relationship between the video sections (520-2 and 520-3) to the video data (510-2 and 510-2).

As illustrated in FIG. 5, the upload of the first video section is complete at the second time, indicated by the first video section being shaded, and the server(s) 112 may be annotating the uploaded first video section (indicated by the diagonal hatching) while uploading the second video section. This process may continue, with individual video sections being uploaded to the server(s) 112 and the server(s) 112 annotating uploaded video sections, until a final video section is uploaded to the server(s) 112, indicating that the video capturing is complete.

For example, the image capture device 110 has completed video capturing at a third time, and the video data 510-3 includes an entirety of the video data to be uploaded from the image capture device 110 to the server(s) 112. As illustrated in FIG. 5, the image capture device 110 may divide the video data 510-3 into video sections 520-3 (e.g., first video section through tenth video section) and an upload of a majority of the video sections 520-3 is complete at the third time (e.g., first video section through ninth video section are uploaded to the server(s) 112). Therefore, while the image capture device 110 uploads the tenth video section to the server(s) 112, the server(s) 112 may have annotated a portion of the video sections 520-3 (e.g., first video section and second video section) and may be annotating the remaining video sections (e.g., third video section through ninth video section). Thus, instead of receiving the entirety of the video data 510-3 at the third time and annotating the video data 510-3, the server(s) 112 may receive a final video section and have already begun annotating the remaining video sections. Therefore, a latency of both the uploading and the annotating may be reduced.

Figure 6B:
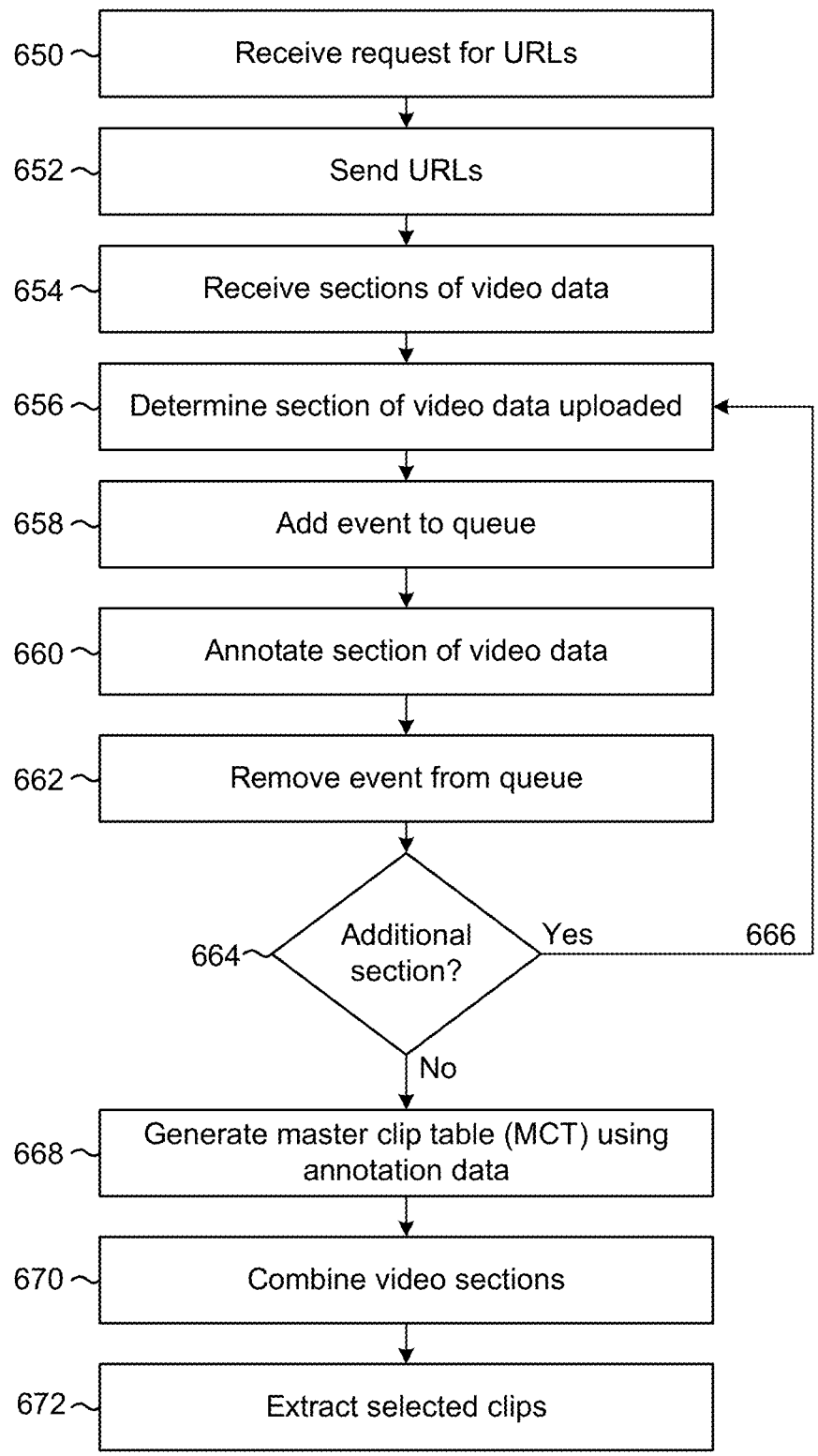

FIGS. 6A-6B are a communication diagram (6A) and a flowchart (6B) conceptually illustrating example methods for uploading video data using automated processing according to embodiments of the present disclosure. As illustrated in FIG. 6A, the image capture device 110 may begin (610) capturing video and may send (612) video data to the device 102 so that the device 102 may display (614) the video data. For example, the image capture device 110 may capture raw video data in a first format and may send the raw video data, a lower resolution version of the raw video data, panoramic video data in a second format or a lower resolution version of the panoramic video data to the device 102. The image capture device 110 may send the raw video data or the panoramic video data using a lower resolution to reduce a bandwidth/processing consumption of the image capture device 110 and/or the device 102. If the device 102 receives raw video data (of any resolution), the device 102 may display the raw video data using specialized software configured to display the raw video data. For example, the raw video data may include stacked video data (e.g., a resolution of 2600 pixels by 2196 pixels, with a right half of the video data stacked vertically on a left half of the video data) and the specialized software may be configured to display the raw video data in a panoramic format (e.g., a resolution of 5200 pixels by 1080 pixels) on the device 102. In contrast, the panoramic video data may already be in the panoramic format and the device 102 may display the panoramic video data using general software.

The image capture device 110 may break (616) the video data (e.g., raw video data or panoramic video data) into sections during video capture. After completion of video capture for individual sections of the video data, the image capture device 110 may send (618) request(s) for upload Universal Resource Locator (URL) from the server(s) 112 and the server(s) 112 may send (620) the upload URLs to the image capture device 110. The upload URLs may indicate an address on the server(s) 112 for the video section to be uploaded, although in some examples the upload URLs may be more sophisticated. For example, a URL may give the image capture device 110 access to and/or permission to modify an object identified by the URL. For example, using query string authentication, the server(s) 112 may enable the image capture device 110 to upload the video sections to the server(s) 112 while maintaining secure security protocols on the server(s) 112 (e.g., preventing other devices from accessing the video sections without granting security credentials/ permissions to the image capture device 110).

The image capture device 110 may upload (622) the individual video sections (and optionally, additional data) and the server(s) 112 may annotate (624) individual video sections upon completion of the upload. The image capture device 110 may end capturing video and may upload (626) a final video section to the server(s) 112. The server(s) 112 may annotate (628) the final section, generate (630) a master clip table (MCT), combine (632) the video sections sequentially to form combined video data and may extract (634) selected clips, as will be discussed in greater detail below. For example, the MCT may include a list of selected video clips from the combined video data, along with additional data describing why a selected video clip was selected and where interesting moment(s) are within the selected video clip. Using the MCT, the server(s) may 112 extract a portion of the selected video clips to generate a plurality of video clips from the combined video data.

As discussed above with regard to FIG. 1A, the image capture device 110 may capture the video data at a first time and upload the video data at a later time without departing from the present disclosure. Additionally or alternatively, the image capture device 110 may send the individual video sections in any order and/or the server(s) 112 may annotate the individual video sections in any order. In some examples, the image capture device 110 may send only a portion of the overall video data and/or the server(s) 112 may annotate only a portion of the individual video sections received without departing from the disclosure.

FIG. 6B is a flowchart conceptually illustrating an example method for uploading video data using automated processing according to embodiments of the present disclosure. As illustrated in FIG. 6B, the server(s) 112 may receive (650) a request for URLs, may send (652) URLs and may receive (654) sections of video data. For example, the server(s) 112 may determine a number of video sections to be uploaded and may generate individual URLs for each of the video sections.

The server(s) 112 may determine (656) that a section of video data has been uploaded and may add (658) an event to a queue. Thus, as each section of video data is uploaded, the server(s) 112 may add an additional event to the queue. The server(s) 112 may annotate (660) the section of video data and may remove (662) the corresponding event from the queue. Thus, as each section of video data is annotated, the server(s) 112 may remove the corresponding event from the queue. For example, the server(s) 112 may receive a first video section and a second video section and may add a first event and a second event to the queue. While the server(s) 112 are annotating the first video section, the server(s) 112 may receive a third video section and may add a third event to the queue. Upon finishing annotating the first video section, the server(s) 112 may remove the first event from the queue and begin annotating the second video section. Thus, the server(s) 112 may continue adding events to the queue upon a video section being uploaded and may remove events from the queue upon annotation being completed.

While this example illustrates sequential processing of the video sections, the present disclosure is not limited thereto and the video sections may be uploaded and/or annotated concurrently without departing from the disclosure. For example, the first video section and the second video section may be annotated at the same time.

The server(s) 112 may continue to annotate sections of video data received in step 654 upon an upload being complete. After the queue is empty, the server(s) 112 may determine (664) if there is an additional video section to be uploaded (e.g., the server(s) 112 is currently receiving a video section and/or sent out an additional URL). If there is an additional video section, the server(s) 112 may loop (666) to step 656 and repeat steps 656-664. If there are no additional video sections, the server(s) 112 may generate (668) a master clip table (MCT) using annotation data, may combine (670) video sections sequentially (e.g., concatenate) to generate combined video data and may extract (672) selected clips from the combined video data.

Figure 7:
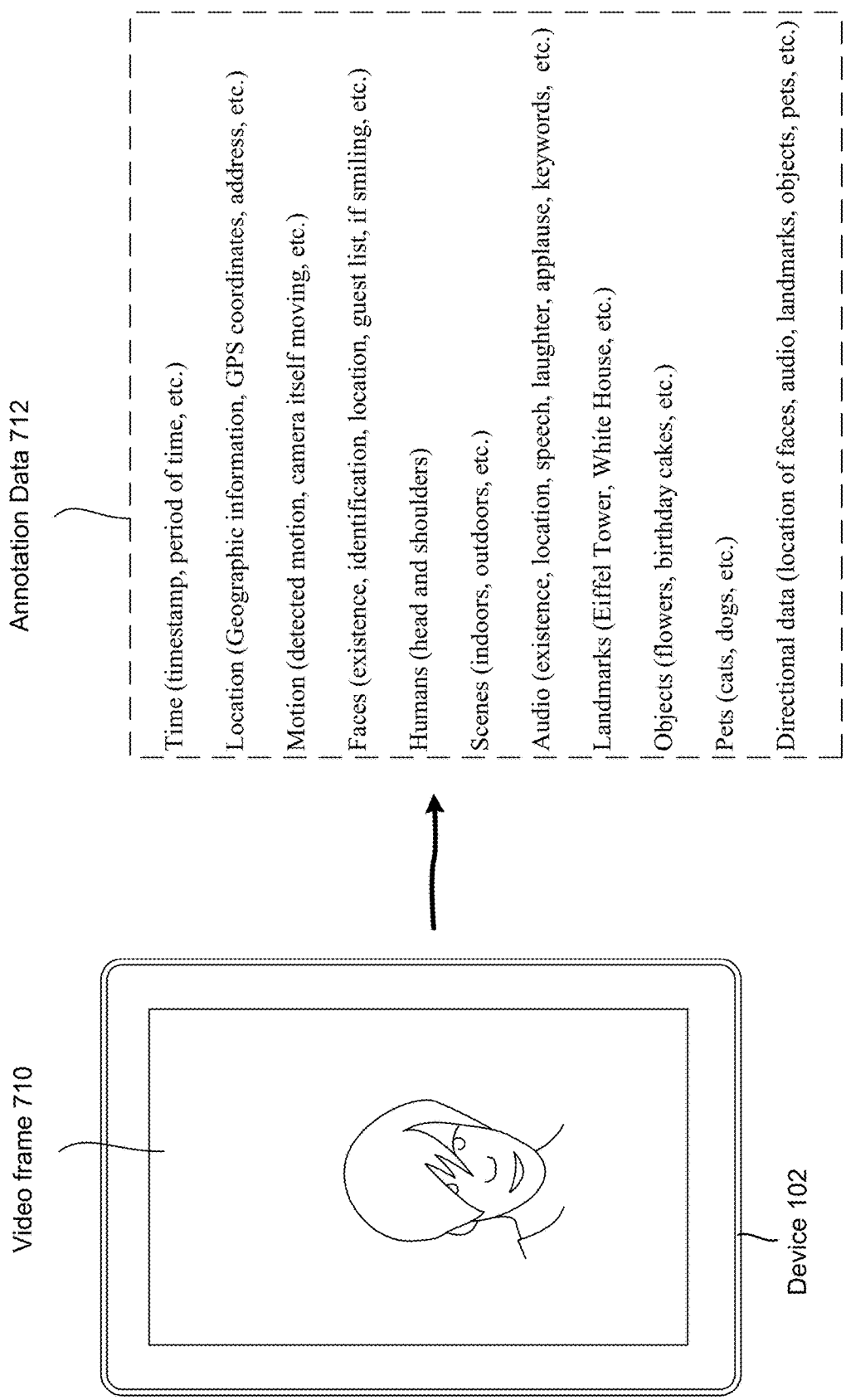
FIG. 7 illustrates an example of annotation data according to embodiments of the present disclosure.

FIG. 7 illustrates an example of types of annotation data according to embodiments of the present disclosure. As illustrated in FIG. 7, the server(s) 112 may analyze a video frame 710 and generate annotation data 712, which may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame).

In addition to the annotation data illustrated in FIG. 7, the server(s) 112 may generate additional annotation data. For example, the server(s) 112 may generate emotional data, which may include emotional detection (e.g., determining a mood such as happy, sad, excited, etc.) for an individual, a group of people, the video frame 710 or a combination thereof. As another example, the server(s) 112 may determine if a concert or other event is represented in the video frame 710 and may match the geographic location to the event. For example, the server(s) 112 may determine venues in proximity to the geographic location, events scheduled for the venues and determine if one of the events is represented in the video data. In some examples, the server(s) 112 may detect indications of an event (e.g., detecting a crowd, an amphitheater, a concert hall or the like) and may compare the geographic information to venues in proximity as a result of detecting the indications.

In some examples, the server(s) 112 may perform speech recognition on speech detected in audio associated with the video data to generate output text and may embed the output text in the annotation data. As a first example, the server(s) 112 may include output text corresponding to all of the speech detected in the audio, such as a transcription of a conversation or the like. As a second example, the server(s) 112 may analyze the output text and include a portion of the output text corresponding to key phrases. For example, the server(s) 112 may recognize "Happy Birthday" or a particular name in the output text and include the recognized phrase in associated annotation data.

Figure 8:
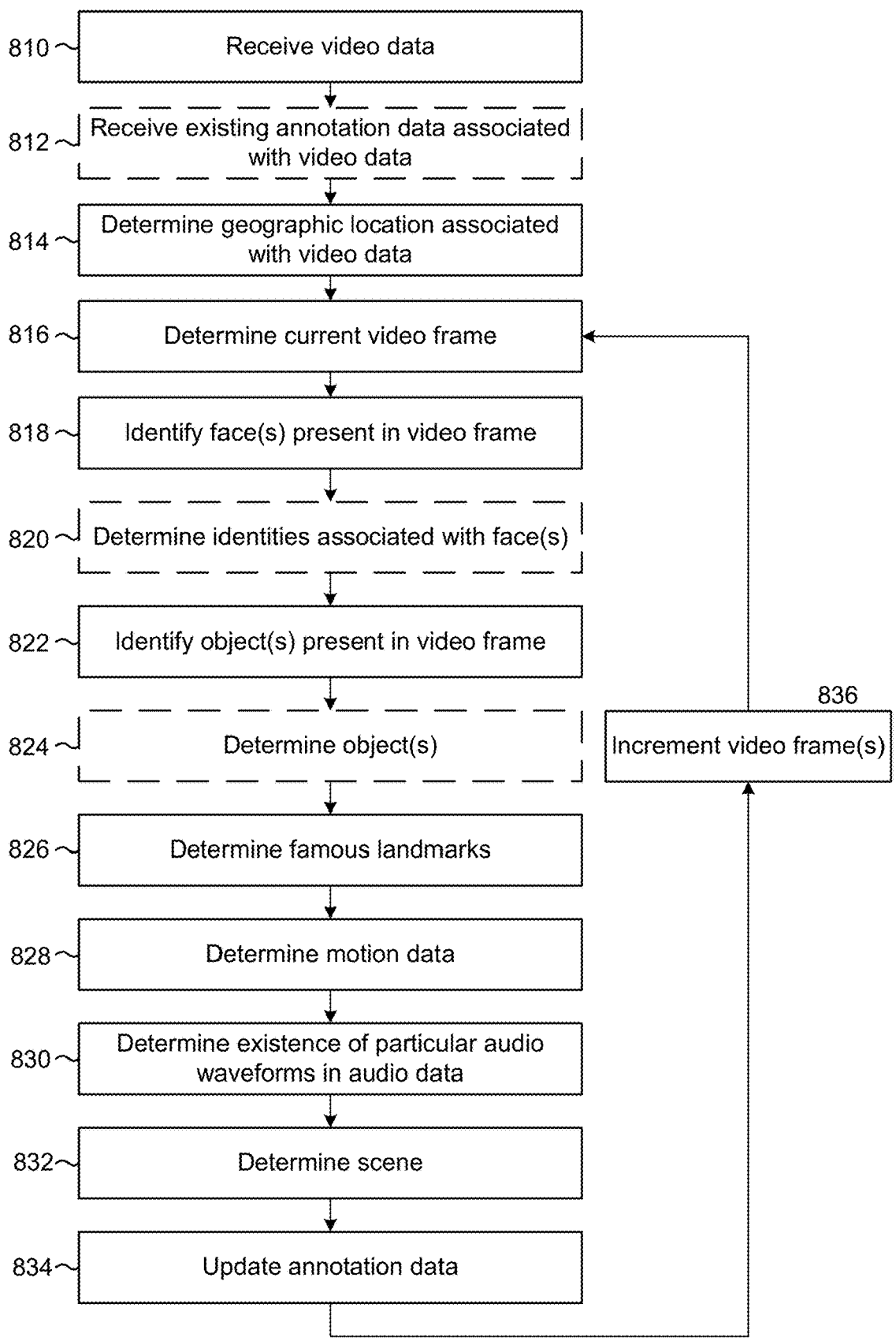
FIG. 8 is a flowchart conceptually illustrating an example method for generating annotation data according to embodiments of the present disclosure.

FIG. 8 is a flowchart conceptually illustrating an example method for generating annotation data according to embodiments of the present disclosure. As discussed above, the annotation data may be generated by the server(s) 112 or a remote device prior to generating the video summarization. For example, the server(s) 112 may generate annotation data upon receiving individual video clips, upon receiving video data or upon receiving a request for a video summarization. For ease of explanation, some of the steps illustrated in FIG. 8 are explicitly depicted as optional, indicated by dashed lines. However, any of the steps illustrated in FIG. 8 may be omitted without departing from the present disclosure. In addition, while the following description refers to the steps illustrated in FIG. 8 being executed by the server(s) 112, some or all of the steps illustrated in FIG. 8 may be executed by the device 102, the image capture device 110, the server(s) 112, a remote device or any combination thereof.

As illustrated in FIG. 8, the server(s) 112 may receive (810) video data and may optionally receive (812) existing annotation data associated with the video data. The server(s) 112 may receive the video data from a remote device (e.g., the device 102, the image capture device 110, a second server(s) 112 or the like) or by accessing the video data on the server(s) 112. The existing annotation data may have been determined by any of the device 102, the image capture device 110, the server(s) 112 and/or a remote device prior to the system receiving the video data in step 810. While video data may include multiple video clips, the video data illustrated in FIG. 8 refers to video data associated with a single video clip (e.g., a video clip captured from a beginning time to an ending time). The server(s) 112 may determine (814) a geographic location associated with the video data, such as a Global Positioning System (GPS) coordinates associated with where the video data was captured. However, the geographic location is not limited to the GPS coordinates and the server(s) 112 may determine a geographic location based on the GPS coordinates. If the video data is captured while in motion (e.g., in a plane, a car or other vehicle), the geographic location may be associated with the beginning time or the ending time of the video data.

The server(s) 112 may determine (816) a current video frame and may identify (818) face(s) present in the video frame. For example, the server(s) 112 may analyze the video frame and identify the face(s) based on facial recognition, identifying head and shoulders, identifying eyes, smile recognition or the like. Optionally, the server(s) 112 may determine (820) identities associated with the face(s). For example, the server(s) 112 may employ facial recognition and a database of identities, such as social networking database, to determine the identities. In some examples, the video data will be tagged with identities of faces represented in the video data. Thus, the server(s) 112 may determine the identity of a face in a video frame from a list of identities associated with the video data.

The server(s) 112 may identify (822) object(s) present in the video frame. For example, the server(s) 112 may identify object(s) such as physical objects (e.g., flowers, toys, clothing or the like), animals (e.g., pets such as cats, dogs, wildlife or the like), vehicles (e.g., cars, airplanes, or the like) or the like. Optionally, the server(s) 112 may determine (824) object(s), which may include determining a type of object, a brand of the object, a name for the object or the like. Thus, whereas step 822 identifies an existence of the object in the video frame, step 824 identifies an identity of the object or otherwise recognizes what the object is. The server(s) 112 may determine (826) famous landmarks (e.g., Big Ben, a famous cathedral, monument or the like) represented in the video frame based on the geographic location. For example, the geographic location may be in proximity to a monument and the server(s) 112 may identify the monument within the video frame.

The server(s) 112 may determine (828) motion data, including motion data associated with the image capture device (e.g., movement of the image capture device while capturing the video data) and objects represented in the video data (e.g., movement of an object relative to the image capture device). The server(s) 112 may determine (830) an existence of particular audio waveforms in audio data associated with the video data. For example, the server(s) 112 may identify an existence of speech, laughter, applause or the like. In some examples, as discussed in greater detail below with regard to FIG. 9, the server(s) 112 may identify music in the audio data. The server(s) 112 may determine (832) a scene associated with the video frame. For example, the server(s) 112 may determine if the video frame was captured indoors or outdoors and may determine other characteristics that may be useful in determining a scene associated with the video frame. Finally, the server(s) 112 may update (834) the annotation data associated with the video frame and increment (836) video frame(s) (e.g., one video frame, several video frames or the like) and repeat steps 816-834. For example, the server(s) 112 may increment video frames linearly to update annotation data for video frames in the video data by one or at a fixed increment. Additionally or alternatively, the server(s) 112 may increment the video frame(s) nonlinearly to focus on annotating interesting frames, which may be determined based on a low resolution preview or other techniques. Thus, the server(s) 112 may determine an amount to increment each time step 836 is performed and the amount to increment may vary without departing from the present disclosure.

In addition to using annotation data to generate video summarizations, the server(s) 112 may use the annotation data for additional functionality. As a first example, the server(s) 112 may extract information about a user from the annotation data and may use the extracted information to target advertisements to the user. As a second example, the server(s) 112 may collect annotation data from a plurality of users and/or video clips to collate information. Thus, the server(s) 112 may create a database of annotation data and may use the database to identify trends, brands or the like from video data from a variety of sources.

FIG. 9 is an illustration of an audio component that may be used according to embodiments of the present disclosure. In certain embodiments, direction information may be used to assist in speaker recognition/facial recognition. For example, the image capture device 110 may be configured with a number of components designed to provide direction information related to the capture and processing of speech. FIG. 9 illustrates details of microphone and speaker positioning in an example embodiment of the image capture device 110. In this embodiment, the image capture device 110 includes a microphone array 908 having four microphones 116 that are laterally spaced from each other so that they can be used by audio beamforming components to produce directional audio signals. The microphones 116 may, in some instances, be dispersed around a perimeter of the image capture device 110 in order to apply beampatterns to audio signals based on sound captured by the microphone(s) 116. In the illustrated embodiment, the microphones 116 are positioned at spaced intervals along a perimeter of the image capture device 110, although the present disclosure is not limited thereto. In some examples, the microphone(s) 116 may be spaced between the camera(s) 115 on a substantially vertical surface 904 of the image capture device 110 and/or a top surface 906 of the image capture device 110. In other examples, the microphone(s) 116 may be grouped with the camera(s) 115 (e.g., aligned with or spaced in close proximity to the camera(s) 115) on a substantially vertical surface 904 of the image capture device 110 and/or a top surface 906 of the image capture device 110. Each of the microphones 116 is omnidirectional in the described embodiment, and beamforming technology is used to produce directional audio signals based on signals form the microphones 116. In other embodiments, the microphones may have directional audio reception, which may remove the need for subsequent beamforming.

In various embodiments, the microphone array 908 may include greater or less than the number of microphones shown. For example, an additional microphone may be located in the center of the top surface 906 and used in conjunction with peripheral microphones for producing directionally focused audio signals.

Speaker(s) 902 may be located at the bottom of the image capture device 110, and may be configured to emit sound omnidirectionally, in a 360 degree pattern around the image capture device 110. For example, the speaker(s) 902 may comprise a round speaker element directed downwardly in the lower part of the image capture device 110.

Using the microphone array 908 and the plurality of microphones 116 the image capture device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The image capture device 110 may include an audio processing module that may include one or more audio beamformers or beamforming components that are configured to generate an audio signal that is focused in a direction from which user speech has been detected. More specifically, the beamforming components may be responsive to spatially separated microphone elements of the microphone array 908 to produce directional audio signals that emphasize sounds originating from different directions relative to the image capture device 110, and to select and output one of the audio signals that is most likely to contain user speech.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

Figure 10:
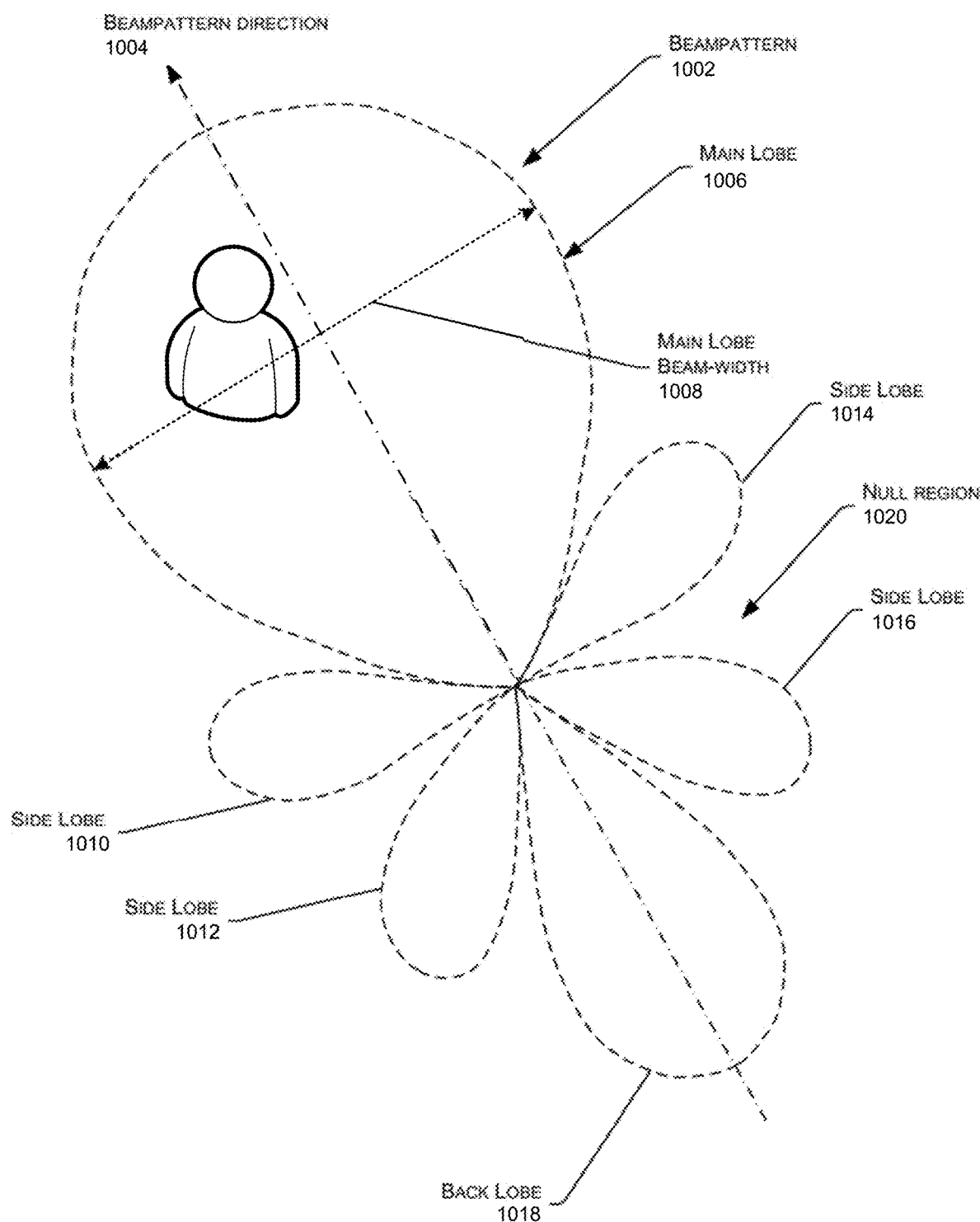
FIG. 10 is an illustration of beamforming according to embodiments of the present disclosure.

FIG. 10 is an illustration of beamforming according to embodiments of the present disclosure. FIG. 10 illustrates a schematic of a beampattern 1002 formed by applying beamforming coefficients to signal data acquired from a microphone array of the image capture device 110. As mentioned above, the beampattern 1002 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 1002 may exhibit a plurality of lobes, or regions of gain, with gain predominating in a particular direction designated the beampattern direction 1004. A main lobe 1006 is shown here extending along the beampattern direction 1004. A main lobe beam-width 1008 is shown, indicating a maximum width of the main lobe 1006. In this example, the beampattern 1002 also includes side lobes 1010, 1012, 1014, and 1016. Opposite the main lobe 1006 along the beampattern direction 1004 is the back lobe 1018. Disposed around the beampattern 1002 are null regions 1020. These null regions are areas of attenuation to signals. In the example, the user 10 resides within the main lobe 1006 and benefits from the gain provided by the beampattern 1002 and exhibits an improved SNR ratio compared to a signal acquired with non-beamforming. In contrast, if the user 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the image capture device 110 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the image capture device 110 may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking location in the environment. The device may devote more CPU resources to digital signal processing (DSP) techniques for that lobe or set of lobes. For example, the device may run acoustic echo cancelation (AEC) at full strength across the three most commonly targeted lobes, instead of picking a single lobe to run AEC at full strength. The techniques may thus improve subsequent automatic speech recognition (ASR) and/or speaker recognition results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the image capture device 110 when performing speaker recognition on the resulting audio signal.

Using the beamforming and directional based techniques above, the system may determine a direction of detected audio relative to the audio capture components. Such direction information may be used to link speech/a recognized speaker identity to video data as described below.

FIGS. 11A-11C illustrate examples of determining directions of faces and speech according to embodiments of the present disclosure. As illustrated in FIG. 11A, the image capture device 110 may capture video data 10 in 360 degrees around the image capture device 110 using camera(s) 115, such that the field of view (FOV) 1100 includes Quadrant 1, Quadrant 2, Quadrant 3 and Quadrant 4. However, the present disclosure is not limited thereto and the image capture device 110 may capture video data 10 in a wide FOV around the image capture device 110 (e.g., from 180 degrees to 360 degrees) without departing from the present disclosure. In addition, the image capture device 110 may capture audio data 12 in 360 degrees around the image capture device 110 using the microphone(s) 116. Therefore, the image capture device 110 may capture video data 10 and audio data 12 including a first user 10-1, a second user 10-2, a third user 10-3, a fourth user 10-4 and a fifth user 10-5.

As illustrated in FIG. 11B, the image capture device 110 may detect a first face 1122-1 (associated with the first user 10-1), a second face 1122-2 (associated with the second user 10-2), a third face 1122-3 (associated with the third user 10-3), a fourth face 1122-4 (associated with the fourth user 10-4) and a fifth face 1122-5 (associated with the fifth user 10-5). Using techniques known to one of skill in the art, the image capture device 110 may determine a first face direction 1124-1 to the first face 1122-1, a second face direction 1124-2 to the second face 1122-2, a third face direction 1124-3 to the third face 1122-3, a fourth face direction 1124-4 to the fourth face 1122-4 and a fifth face direction 1124-5 to the fifth face 1122-5, the directions 1124 relative to the image capture device 110.

As illustrated in FIG. 11C, the image capture device 110 may detect first speech 1132-1 (associated with the first user 10-1) and second speech 1132-2 (associated with the fifth user 10-5). In this example, the second user 10-2, third user 10-3 and fourth user 10-4 may be silent during a period of time and therefore may not be included in the audio data 12. Using techniques known to one of skill in the art or disclosed in greater detail above with regard to FIGS. 9 and 10, the image capture device 110 may determine a first speech direction 1134-1 to the first speech 1132-1 and a second speech direction 1134-2 to the second speech 1132-2, the directions 1134 relative to the image capture device 110.

In some examples, the image capture device 110 may identify the first user 10-1 and associate the first user 10-1 with the first face 1122-1 and the first speech 1132-1 based on the first face direction 1124-1 and the first speech direction 1134-1, despite the first user 10-1 not being included in the speaker recognition database. For example, the image capture device 110 may identify the first user 10-1 from the first face 1122-1 using facial recognition, may identify that the first face 1122-1 is talking during the first speech 1132-1, may determine that the first face direction 1124-1 matches the first speech direction 1134-1 and may therefore associate the first user 10-1 with the first face 1122-1 and the first speech 1132-1.

In other examples, the image capture device 110 may identify the fifth user 10-5 and associate the fifth user 10-5 with the fifth face 1122-5 and the second speech 1132-2 based on the fifth face direction 1124-5 and the second speech direction 1134-2, despite the fifth user 10-5 not being included in the facial recognition database. For example, the image capture device 110 may identify the fifth user 10-5 from the second speech 1132-2 using speaker recognition, may identify that the fifth face 1122-5 is talking during the second speech 1132-2, may determine that the fifth face direction 1124-5 matches the second speech direction 1134-2 and may therefore associate the fifth user 10-5 with the fifth face 1122-5 and the second speech 1132-2.

While FIGS. 11B-11C are described in reference to the image capture device 110, the present disclosure is not limited thereto. Therefore, any of the steps described as being performed by the image capture device 110 may instead be performed by the device 102, the server(s) 112 or the like. Similarly, any of the steps described below with regard to FIG. 12 and/or FIG. 13 may be performed by the device 102, the image capture device 110 and/or the server(s) 112 without departing from the present disclosure. For ease of explanation, the following steps will be described as being performed by the server(s) 112.

Figure 12:
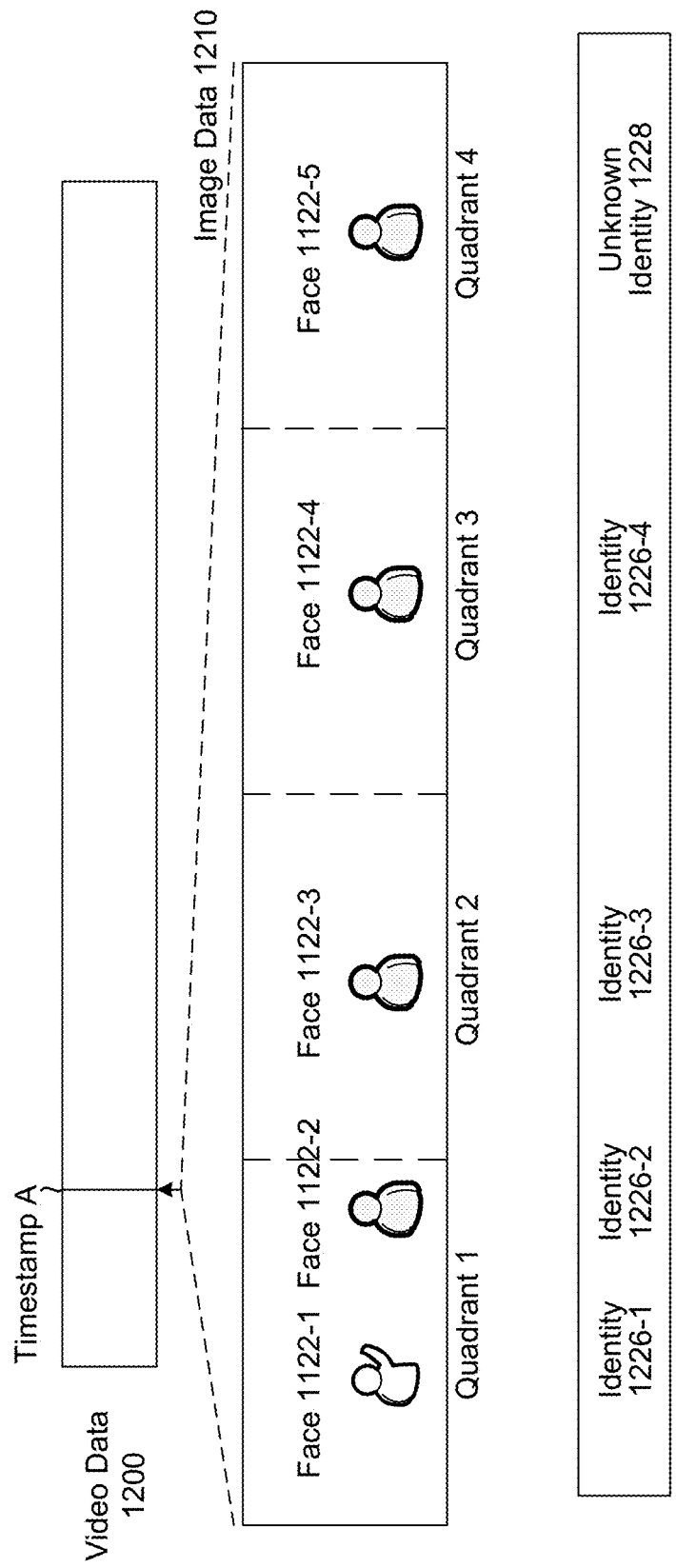
FIG. 12 illustrates an example of generating an identity label using image data according to embodiments of the present disclosure.

FIG. 12 illustrates an example of determining an identity from image data according to embodiments of the present disclosure. As illustrated in FIG. 12, the server(s) 112 may receive image data 1210 associated with Timestamp A of the video data 10. As shown the image data 1210 may include image data from multiple cameras associated with the image capture device 110, for example one camera for Quadrant 1, one camera for Quadrant 2, one camera for Quadrant 3 and one camera for Quadrant 4. Using facial recognition, the server(s) 112 may detect, in the image data 1210, the first face 1122-1, the second face 1122-2, the third face 1122-3, the fourth face 1122-4 and the fifth face 1122-5, and may associate the first face 1122-1 with the first identity 1226-1, the second face 1122-2 with the second identity 1226-2, the third face 1122-3 with the third identity 1226-3 and the fourth face 1122-4 with the fourth identity 1226-4. However, the fifth face 1122-5 may not be in the facial recognition database and therefore the server(s) 112 may assign unknown identity 1228 to the fifth face 1122-5.

FIG. 13 illustrates an example of determining an identity from audio data according to embodiments of the present disclosure. As illustrated in FIG. 13, the server(s) 112 may receive an audio data clip 1312 between Timestamp A and Timestamp B of the audio data 1302. Using speaker recognition, the server(s) 112 may detect a first waveform 1330-1 and a second waveform 1330-2, may associate the first waveform 1330-1 with the first speech 1132-1 and the second waveform 1330-2 with the second speech 1132-2, and may associate the first speech 1132-1 with a first identity 1336-1 and the second speech 1132-2 with a second identity 1336-2.

Various machine learning techniques may be used to recognize a face using facial recognition and/or a speaker using speaker recognition. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training examples may be used during training. For example, as discussed above, additional image data and/or additional audio data may be acquired may be used as "ground truth" for the training examples. In some examples, the device 102 may determine a confidence score associated with the additional image data and/or additional audio data (e.g., a confidence level that the identity is correctly predicted by the device 102 based on the additional image data and/or additional audio data) and may use additional image data and/or additional audio data associated with a high confidence score (e.g., confidence score above 80%).

Machine learning techniques may also be used to train models to perform other tasks discussed herein, for example identifying interesting content to include in a summarization, determine a video theme, identify a face, determine an identity, etc.

Figure 14B:

FIGS. 14A-14H illustrate examples of annotation data according to embodiments of the present disclosure. As illustrated in FIG. 14A, the server(s) 112 may store annotation data in an annotation database 1410. The annotation database 1410 may include the annotation data discussed above (e.g., time, location, motion, faces, humans, scenes, audio, landmarks, objects, pets, directional data, etc.) for individual video frames. As illustrated in FIG. 14A, the annotation database 1410 includes Frame 1, Frame 2, Frame 3, Frame 10, Frame 11, Frame 30 and Frame 35, although the annotation database 1410 may include any number of video frames and is not limited to the example illustrated in FIG. 14A. In some examples, the annotation database 1410 may include an entry for individual video frames included in video data (e.g., every video frame has an entry). In other examples, the annotation database 1410 may include an entry every fixed number of video frames (e.g., 5th, 10th, 15th etc.). In some examples, the annotation database 1410 may include an entry whenever the annotation data changes (e.g., annotation data is associated with intervening video frames until a following entry in the annotation database 1410). Additionally or alternatively, the annotation database 1410 may include an entry for select video frames without departing from the present disclosure. For example, the server(s) 112 may determine a priority metric (discussed below) for individual video frames and store the annotation data associated with individual video frames having a priority metric exceeding a threshold. Other techniques for storing annotation data may also be used.

The server(s) 112 may determine the priority metric (e.g., interesting score) using the annotation data. For example, the server(s) 112 may use an algorithm or other technique to calculate the priority metric based on objects included in the video frame or other characteristics of the video frame. The priority metric may be used to generate video clips and/or to rank individual video frames. For example, the server(s) 112 may determine first video frames associated with priority metrics exceeding a threshold and may group first video frames in proximity to generate a video clip. As an example, the server(s) 112 may determine that Frames 1-11 are associated with priority metrics exceeding the threshold and may generate a video clip including Frames 1-11.

The annotation database 1410 illustrated in FIG. 14A may include video frames for multiple clips included in the video data. However, the disclosure is not limited thereto and FIG. 14B illustrates an annotation database 1412 for an individual video clip. As illustrated in FIG. 14B, the annotation database 1412 includes Frame 1, Frame 2, Frame 3, Frame 10, Frame 11, Frame 30 and Summary Data associated with the overall video clip. The annotation database 1412 includes a series of columns corresponding to annotation data that is included in the video clip and indicates whether the annotation data is represented in each video frame. For example, Face 1 is represented in Frame 1, Frame 2, Frame 3, Frame 10, Frame 11 and Frame 30, while Face 3 is only represented in Frame 11 and Frame 30. Thus, the annotation database 1412 may indicate the annotation data associated with individual video frames.

The summary data may include statistics for the video clip that are unique to the particular video clip. For example, the summary data may include a frame selector statistic identifying transitions within the video clip (e.g., grouping the video frames based on a similarity index) or the like. Additionally or alternatively, the summary data may include video "fingerprints" that indicate characteristics of the video clip that may be used to identify similar video clips. For example, the characteristics of the video clip may include feature vectors, histograms of image data, gradients of the image data, histograms of gradients, a signature of the image data or the like that may be used to determine if image data is similar between video clips.

While the annotation database 1412 illustrated in FIG. 14B lists individual frames for the video clip, video frames may be grouped together as illustrated in the annotation database 1414 illustrated in FIG. 14C. For example, the annotation database 1414 groups Frames 1-200, Frames 350-600, Frames 800-1200, Frames 1500-1650 and Frames 2000-2200, Frames 2400-2550. The annotation database 1414 may group the video frames based on annotation data and/or the frame selector statistic for the overall video clip.

FIG. 14D illustrates a Master Clip Table (MCT) 1420 that includes Clips 1-7. The MCT 1420 may indicate which frames are associated with a video clip (e.g., Clip 1 may be associated with Frames 1-450, which corresponds to a 15 second video clip at 30 Hz), a priority metric associated with the video clip, summary data (as discussed above with regard to FIG. 14B) associated with the video clip and/or a time/position of interesting moments within the video clip (e.g., pixel coordinates associated with individual timestamps corresponding to the moment).

In some examples, the user 10 may generate a video clip, which may be included in the MCT 1420 with or without annotation data. The server(s) 112 may annotate the user-generated video clip, although the present disclosure is not limited thereto. A moment may be a bounding box around an interesting object or section of the video clip over time. Additional data may be included about a moment, such as a per-frame interest rating, a position of a detected face, an identity of a detected face or the like.

The server(s) 112 may generate the MCT 1420 based on priority metrics determined from the annotation data. The server(s) 112 may determine a priority metric associated with each video frame in the video data, with individual video frames (e.g., selected video frames based on content represented in the selected video frames), with groups of video frames (e.g., tracks or moments) and/or with video clips. For example, the server(s) 112 may determine first priority metrics associated with individual video frames to determine interesting portions of the video data. Using the annotation data, the server(s) 112 may identify transitions within the video data (e.g., tracks), may group interesting video frames based on the transitions to determine moments and may determine second priority metrics associated with individual moments. The server(s) 112 may then extract video clips including interesting moments and may determine third priority metrics associated with individual video clips. Thus, the server(s) 112 may identify the most interesting video frames, may identify moments including the most interesting video frames and may generate video clips including the most interesting moments. The server(s) 112 may compare the priority metrics to each other (e.g., relative priority metrics) or to a global threshold (e.g., absolute priority metrics) to generate the MCT 1420.

In some examples, the MCT 1420 may include every video clip included in the video data (e.g., the video data is segmented into sequential video clips, each of which is included in the MCT 1420), but the disclosure is not limited thereto and the MCT 1420 may include only a portion of the video clips (e.g., interesting video clips associated with a portion of the video data). While the MCT 1420 illustrated in FIG. 14D includes video clips associated with a single sequential stream of video data (e.g., video captured at one time), the disclosure is not limited thereto. Instead, a MCT 1422 may include video clips associated with multiple streams of video data (e.g., video captured at more than one time, such as separate recordings) as illustrated in FIG. 14E. As illustrated in FIG. 14E, the MCT 1422 includes Clips 1-4 captured at a first time (e.g., capture date of Sep. 15, 2015) and Clips 50-52 captured at a second time (e.g., capture data of Sep. 24, 2015). Additionally or alternatively, the MCT 1422 may include video clips from separate recordings on the same date (e.g., first video recording at one point on Sep. 15, 2015, second video recording at a later point on Sep. 15, 2015) and/or video clips captured by multiple image capture devices 110 without departing from the disclosure.

Figure 14F:

FIG. 14F illustrates a detection results database 1430. Instead of including individual rows for individual video frames or groups of video frames, the detection results database 1430 includes individual rows for annotation data and indicates groups of video frames including the annotation data. For example, Face 1 may be associated with a first group of video frames (e.g., frames 1-150), a second group of video frames (e.g., frames 600-900), a third group of video frames (e.g., frames 1500-2000) etc. Thus, the detection results database 1430 indicates individual sections of the video data associated with the annotation data. Additionally or alternatively, the detection results database 1430 may indicate multiple groups of video frames in a single column without departing from the disclosure.

Figure 14G:
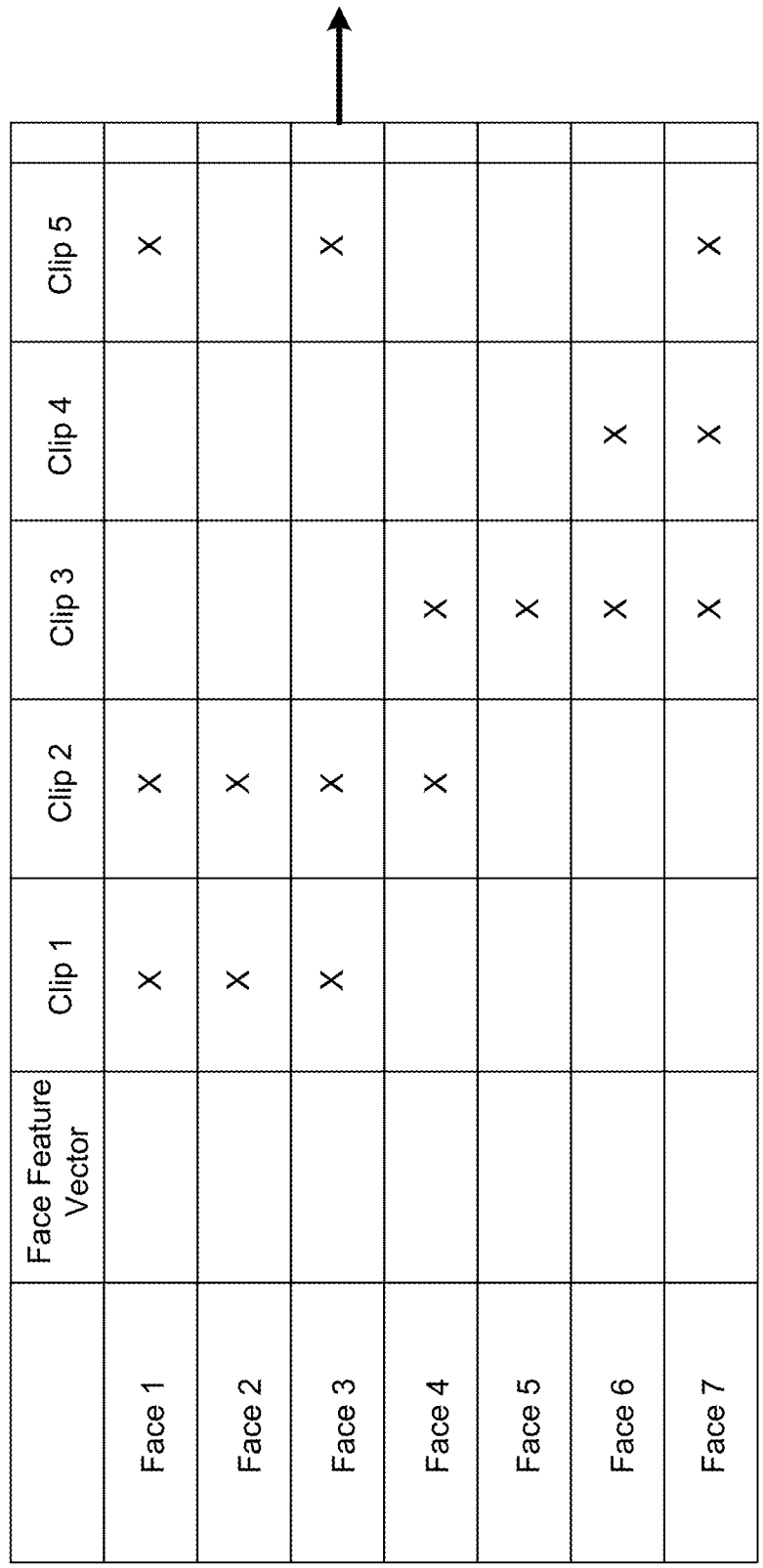

FIG. 14G illustrates a face database 1440 including a list of unique faces represented in the video data and indicating which video clips are associated with each of the individual faces. The server(s) 112 may analyze individual video clips using facial recognition (e.g., a facial recognition engine or the like) using Face Feature Vectors (which includes information that characterizes the appearance of individual faces under various poses and/or illuminations), may identify unique faces within each of the video clips, and may determine if the same face is detected in multiple video clips. For example, Face 1 is represented in Clip 1, Clip 2 and Clip 5 but not represented in Clip 3 and Clip 4. The server(s) 112 may include one or more images associated with individual faces (stored in the Face Feature Vector), or may access a database with images of individual faces in different poses. In some examples, an identity of an individual face may be determined (e.g., based on user input or using facial recognition processing) and stored in the face database 1440. In some examples, a first unique face represented in first video clips may be associated with a second unique face represented in second video clips and the information may be combined in the face database 1440. For example, a user 10 may be identified as a first unique face (e.g., Face 1 represented in Clips 1, 2 and 5) and a second unique face (e.g., Face 4 represented in Clip 3). Using identity information, user input, updated facial recognition processing or additional video data, the server(s) 112 may determine that the first unique face and the second unique face are associated with the user 10 and may merge Face 1 and Face 4. Thus, the face database 1440 may be updated over time based on subsequent processing. While FIG. 14G illustrates the face database 1440 indicating video clips associated with individual faces, the disclosure is not limited thereto and the face database 1440 may indicate video frames associated with the individual faces without departing from the disclosure.

Figure 14H:
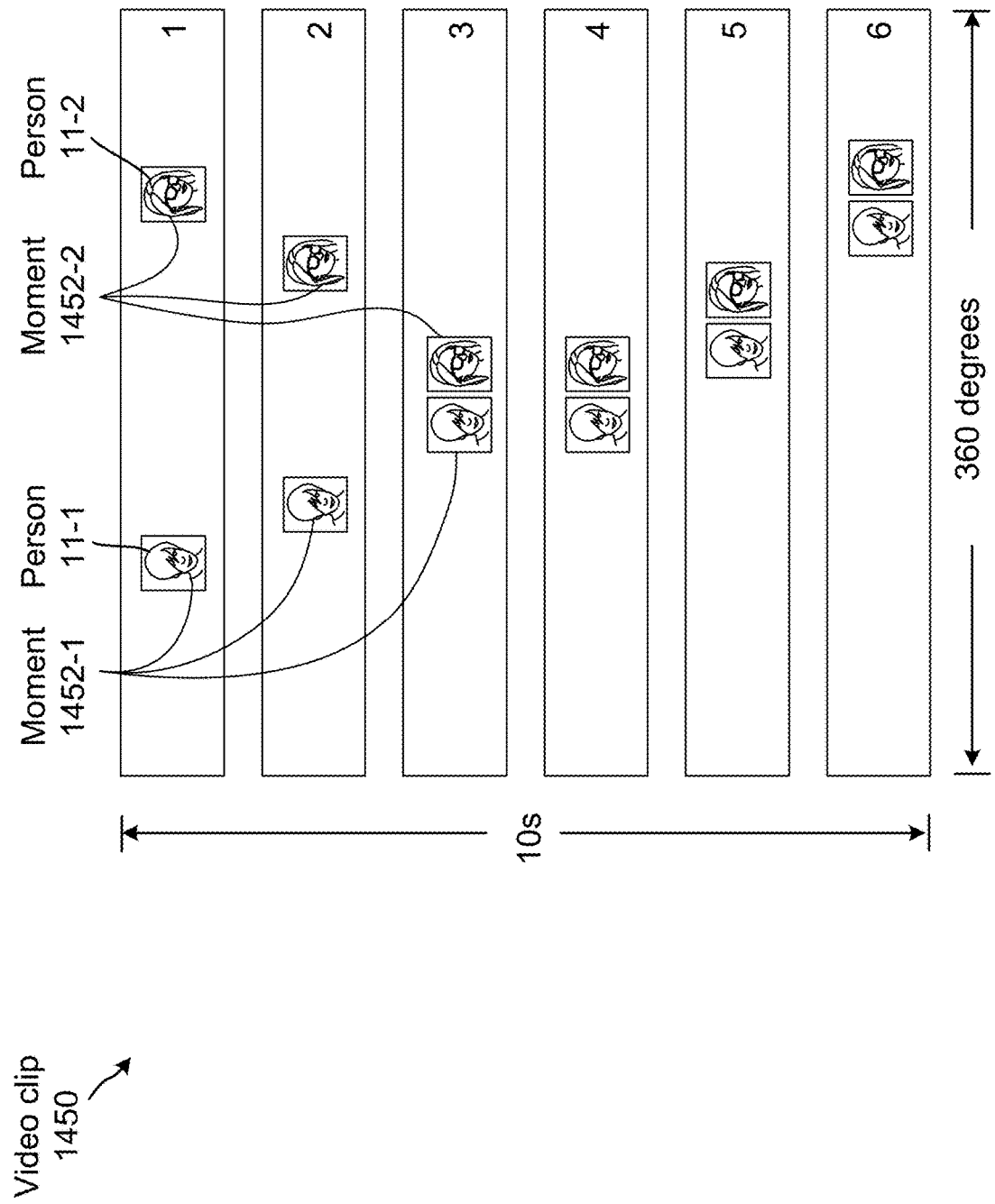

FIG. 14H illustrates an example of a video clip annotated with two moments, which are tracked over the course of the video clip. As illustrated in FIG. 14H, a video clip 1430 may be 10 seconds long and may include a field of view of 360 degrees. In a first video frame (e.g., Frame 1), a first person 11-1 is at a first position and a second person 11-2 is at a second position. As the video clip progresses, the first person 11-1 travels in a first direction towards the second position and the second person 11-2 travels in a second direction towards the first position. The first person 11-1 and the second person 11-2 meet in a third video frame (e.g., Frame 3) and, remaining in proximity to each other, both move in the first direction (e.g., Frame 5 and Frame 6). The server(s) 112 may annotate the video clip 1430 with two moments, a first moment 1432-1 associated with the first person 11-1 (e.g., bounding box surrounding the first person 11-1) and a second moment 1432-2 associated with the second person 11-2 (e.g., bounding box surrounding the second person 11-2). In some examples, the server(s) 112 may annotate the video clip 1430 with a third moment indicating positions and/or video frames where the first person 11-1 and the second person 11-2 are in proximity. For example, the third moment may be a bounding box including the first person 11-1 and the second person 11-2 in Frames 3-6.

FIG. 15 illustrates an example of combining video sections to form video data and extracting selected video clip data according to embodiments of the present disclosure. As discussed above, the server(s) 112 may receive individual video sections 1512 from the image capture device 110, enabling the server(s) to upload and/or annotate the individual video sections 1512 prior to receiving a final video section (e.g., while the image capture device 110 is still capturing video data and/or uploading captured video data). The server(s) 112 may sequentially combine (e.g., concatenate) the video sections 1512 to generate combined video data 1510. For example, the server(s) 112 may organize the video sections 1512 in chronological order using timestamps associated with the video sections 1512, may determine that the video sections 1512 are sequential (e.g., no gaps between neighboring video sections 1512) and may combine the video sections 1512 to generate the combined video data 1510.

From the combined video data 1510, the server(s) 112 may extract selected video clips (e.g., video clip data 1520) based on the annotation database 1410 and/or the MCT 1420. In one example, the server(s) 112 may extract the video clip data 1520 based on a priority metric for individual video frames. For example, the server(s) 112 may determine first video frames having a priority metric exceeding a threshold, may group first video frames in proximity to each other and may generate one or more video clips including the first video frames.

FIGS. 16A-16B are communication diagrams conceptually illustrating example methods for rendering video data using manual processing according to embodiments of the present disclosure. FIGS. 16A-16B may be associated with local storage processing 312, which includes communication between the image capture device 110 and the device 102 to generate video clips to share. In contrast to the remote storage processing 310, the local storage processing 312 does not typically upload raw video data to the server(s) 112, does not typically generate annotation data associated with the video data and typically includes video editing on the device 102 and/or the image capture device 110, although the disclosure is not limited thereto. FIG. 16A illustrates an example method of rendering video data locally on the device 102, whereas FIG. 16B illustrates an example method of rendering video data locally on the image capture device 110.

As illustrated in FIG. 16A, the device 102 and the image capture device 110 may connect (1610), which involves establishing a connection (e.g., pairing) between the device 102 and the image capture device 110. For example, the connection may allow the device 102 to view video data stored on the image capture device 110, change settings on the image capture device 110 or the like.

The device 102 may display (1612) a preview of available video clips stored on the image capture device 110. For example, the image capture device 110 may store raw video data and/or panoramic video data and the device 102 may access previews of the stored video data. Based on input to the device 102, the device 102 may select (1614) video clip(s) to view and/or edit on the device 102. For example, the device 102 may display previews of videos (e.g., video data) from the image capture device 110 and, based on input from a user 10, may select individual videos.

The device 102 may send (1616) a request for the selected video clip(s) to the image capture device 110 and the image capture device 110 may send (1618) low resolution video clip(s), which may include raw video data and/or panoramic video data. In some examples, the image capture device 110 may send additional data (e.g., audio data, IMU data, user tags, geographic location data, frame selector statistics or the like) in addition to the video data, as discussed above with regard to FIG. 1A. The device 102 may need specialized software to view the raw video data, whereas the device 102 may view the panoramic video data with general software. For example, raw video data may be video data in a first format, such as stacked video data with a resolution of 2600 pixels by 2196 pixels. In contrast, panoramic video data may be video data in a second format that may be displayed on the device 102 without the specialized software, such as video data with a resolution of 5200 pixels by 1080 pixels. In some examples, the image capture device 110 may generate the panoramic video data from the raw video data prior to sending the low resolution video clip(s) to the device 102. While steps 1616-1618 illustrate the image capture device 110 sending low resolution video clip(s), the present disclosure is not limited thereto. Instead, the image capture device 110 may send video data without resizing without departing from the disclosure, despite the low resolution video clip(s) requiring less bandwidth/processor consumption.

The device 102 may assemble (1620) a video. For example, the device 102 may organize the selected video clip(s), select a begin point and end point associated with individual video clip(s), select a theme, control panning within the panoramic video data, add special effects, add filters, determine layouts and/or transitions between video clips, add audio data (e.g., musical track(s) or the like) and/or perform other editing techniques known to one of skill in the art (collectively referred to as rendering information). In some examples, the device 102 may assemble the video based on user input. For example, the device 102 may display a user interface (UI) and the video data to the user and may receive input selecting the rendering information. The device 102 may optionally analyze the video data (e.g., using computer vision or the like) and suggest rendering information or display additional options available to the user. For example, the device 102 may determine transitions in the video data (e.g., determine a frame selector statistic identifying transitions by determining a similarity between individual video frames) and may display a suggested begin point and end point for a video clip based on the transitions. In some examples, the device 102 may extract video clips without user input, such as using the computer vision and/or frame selector statistic discussed above.

The device 102 may preview (1622) the video and perform additional video editing or preview a final version of the video. The device 102 may render (1624) the video on the device 102. For example, the device 102 may generate a video clip on the device 102 using the video data being displayed by the device 102. Thus, if the image capture device 110 sends low resolution video data, the device 102 may generate the video clip using the low resolution video data. As an example, the low resolution video data may be downsampled from a normal resolution, such as raw video data having a resolution of 2600 pixels by 2196 pixels being downsampled to the low resolution video data having a resolution of 1300 pixels by 1080 pixels or panoramic video data having a resolution of 5200 pixels by 1080 pixels being downsampled to the low resolution video data having a resolution of 2600 pixels by 540 pixels. However, the amount of downsampling may vary and the present disclosure is not limited thereto. Instead, the device 102 may request high resolution video clips from the image capture device 110 and may render the video using the high resolution video data without departing from the present disclosure.

Optionally, the device 102 may send (1626) the rendered video to the server(s) 112 and the server(s) 112 may generate (1628) video summarization including the rendered video. For example, the server(s) 112 may perform video summarization on the rendered video to generate a shortened version of the rendered video highlighting particular moments. Additionally or alternatively, the server(s) 112 may receive a group of rendered videos and may perform video summarization to highlight portions of the group of rendered videos. In some examples, the server(s) 112 may perform video summarization on videos stored on the server(s) 112, which may include the rendered video.

As illustrated in FIG. 16B, the device 102 and the image capture device 110 may connect (1610), which involves establishing a connection (e.g., pairing) between the device 102 and the image capture device 110. For example, the connection may allow the device 102 to view video data stored on the image capture device 110, change settings on the image capture device 110 or the like.

The device 102 may display (1612) a preview of available video clips stored on the image capture device 110. For example, the image capture device 110 may store raw video data and/or panoramic video data and the device 102 may access previews of the stored video data. Based on input to the device 102, the device 102 may select (1614) video clip(s) to view and/or edit on the device 102. For example, the device 102 may display previews of videos (e.g., video data) from the image capture device 110 and, based on input from a user 10, may select individual videos.

The device 102 may send (1616) a request for the selected video clip(s) to the image capture device 110 and the image capture device 110 may send (1618) low resolution video clip(s), which may include raw video data and/or panoramic video data. The device 102 may need specialized software to view the raw video data, whereas the device 102 may view the panoramic video data with general software. For example, raw video data may be video data in a first format, such as stacked video data with a resolution of 2600 pixels by 2196 pixels. In contrast, panoramic video data may be video data in a second format that may be displayed on the device 102 without the specialized software, such as video data with a resolution of 5200 pixels by 1080 pixels. In some examples, the image capture device 110 may generate the panoramic video data from the raw video data prior to sending the low resolution video clip(s) to the device 102. While steps 1616-1618 illustrate the image capture device 110 sending low resolution video clip(s), the present disclosure is not limited thereto. Instead, the image capture device 110 may send video data without resizing without departing from the disclosure, despite the low resolution video clip(s) requiring less bandwidth/processor consumption.

The device 102 may assemble (1620) a video and preview (1622) the video and perform additional video editing or preview a final version of the video as discussed above with regard to FIG. 16A.

In contrast to rendering the video clip on the device 102, the device 102 may send (1630) rendering information to the image capture device 110, the image capture device 110 may render (1632) the video and the image capture device 110 may send (1634) the rendered video to the device 102. The rendering information may include the changes input to the device 102 in order to assemble the video in step 1620. For example, the rendering information may indicate an order of the selected video clip(s), the begin point and end point associated with the individual video clip(s), the selected theme, the selected panning for the individual video clip(s), the special effects, the audio data and/or other editing steps. Examples of editing the video will be described in greater detail below with regard to video tags, which are data structures generated by the device 102 that include the rendering information and/or annotation information. For example, a first video tag may indicate the order of the selected video clip(s), a second video tag may indicate the begin point and the end point associated with a single video clip, etc. Additionally or alternatively, a single video tag may include multiple edits, such as a first video tag indicating the begin point and the end point associated with a single video clip along with the selected panning for the single video clip and the special effects and/or audio data associated with the selected video clip. The video tags may correspond to individual video clips or a group of video clips without departing from the disclosure.

The image capture device 110 may generate a video clip on the image capture device 110 using the raw video data stored on the image capture device 110. Additionally or alternatively, the image capture device 110 may generate the video clip using the panoramic video data stored on the image capture device 110 without departing from the disclosure. Thus, the image capture device 110 may render the video using higher resolution inputs, resulting in the rendered video having a higher resolution. For example, the image capture device 110 may render the video from the raw video data having a resolution of 2600 pixels by 2196 pixels or from the panoramic video data having a resolution of 5200 pixels by 1080 pixels without downsampling. However, the disclosure is not limited thereto. Instead, the image capture device 110 may downsample the raw video data to generate rendered video having a resolution of 1300 pixels by 1080 pixels or the panoramic video data to generate rendered video having a resolution of 2600 pixels by 540 pixels. Additionally or alternatively, the image capture device 110 may generate the rendered video having a resolution of 1920 pixels by 1080 pixels using a specific angle or directional view within the panoramic video data. However, the amount of downsampling may vary and the present disclosure is not limited thereto.

Optionally, the image capture device 110 may send (1636) the rendered video to the server(s) 112 and/or the device 102 may send (1626) the rendered video to the server(s) 112. For example, the image capture device 110 may send the rendered video to the server(s) in step 1636 without sending the rendered video to the device 102. The server(s) 112 may generate (1628) video summarization including the rendered video. For example, the server(s) 112 may perform video summarization on the rendered video to generate a shortened version of the rendered video highlighting particular moments. Additionally or alternatively, the server(s) 112 may receive a group of rendered videos and may perform video summarization to highlight portions of the group of rendered videos. In some examples, the server(s) 112 may perform video summarization on videos stored on the server(s) 112, which may include the rendered video.

Figure 17B:
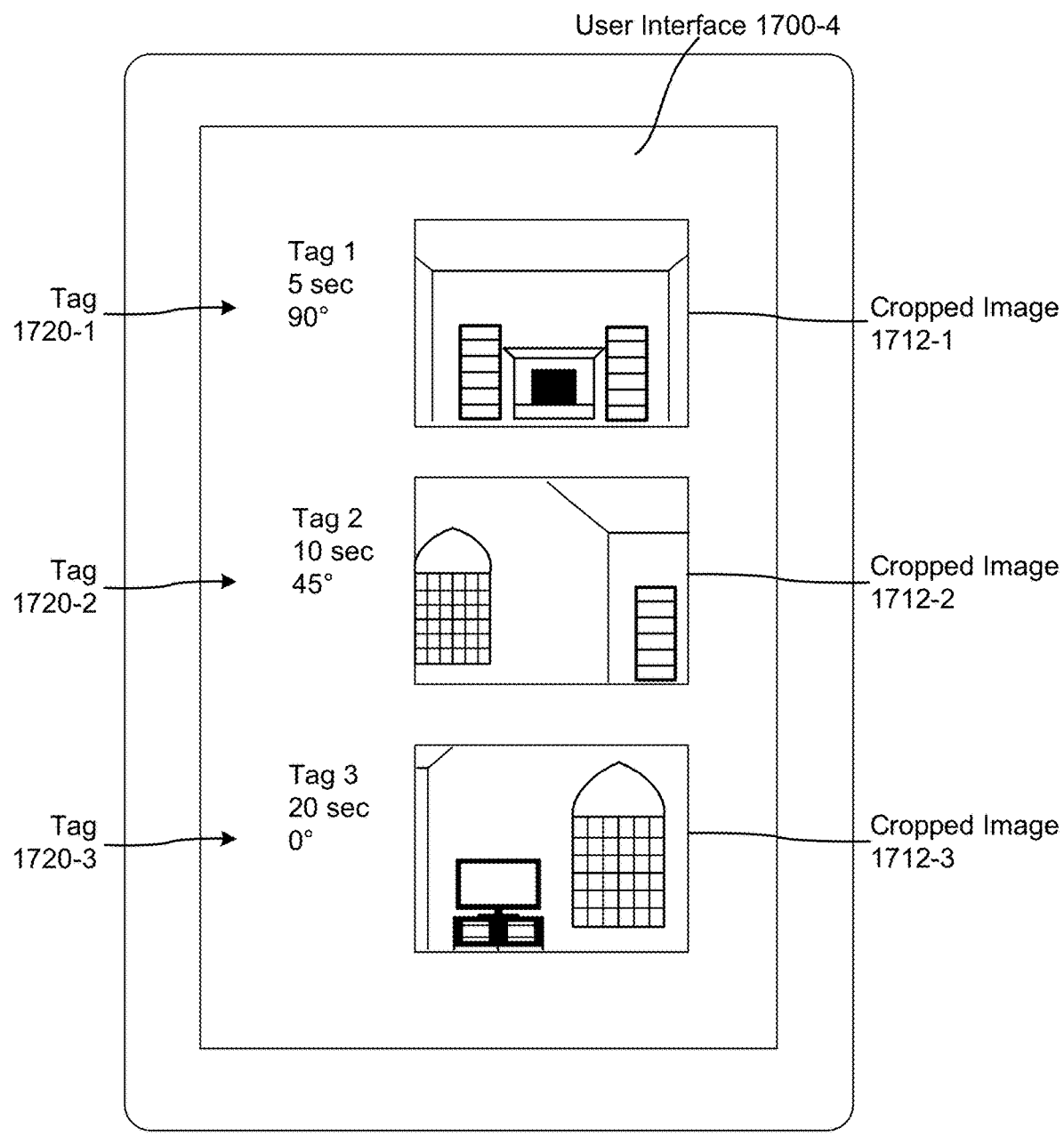
Figure 17C:
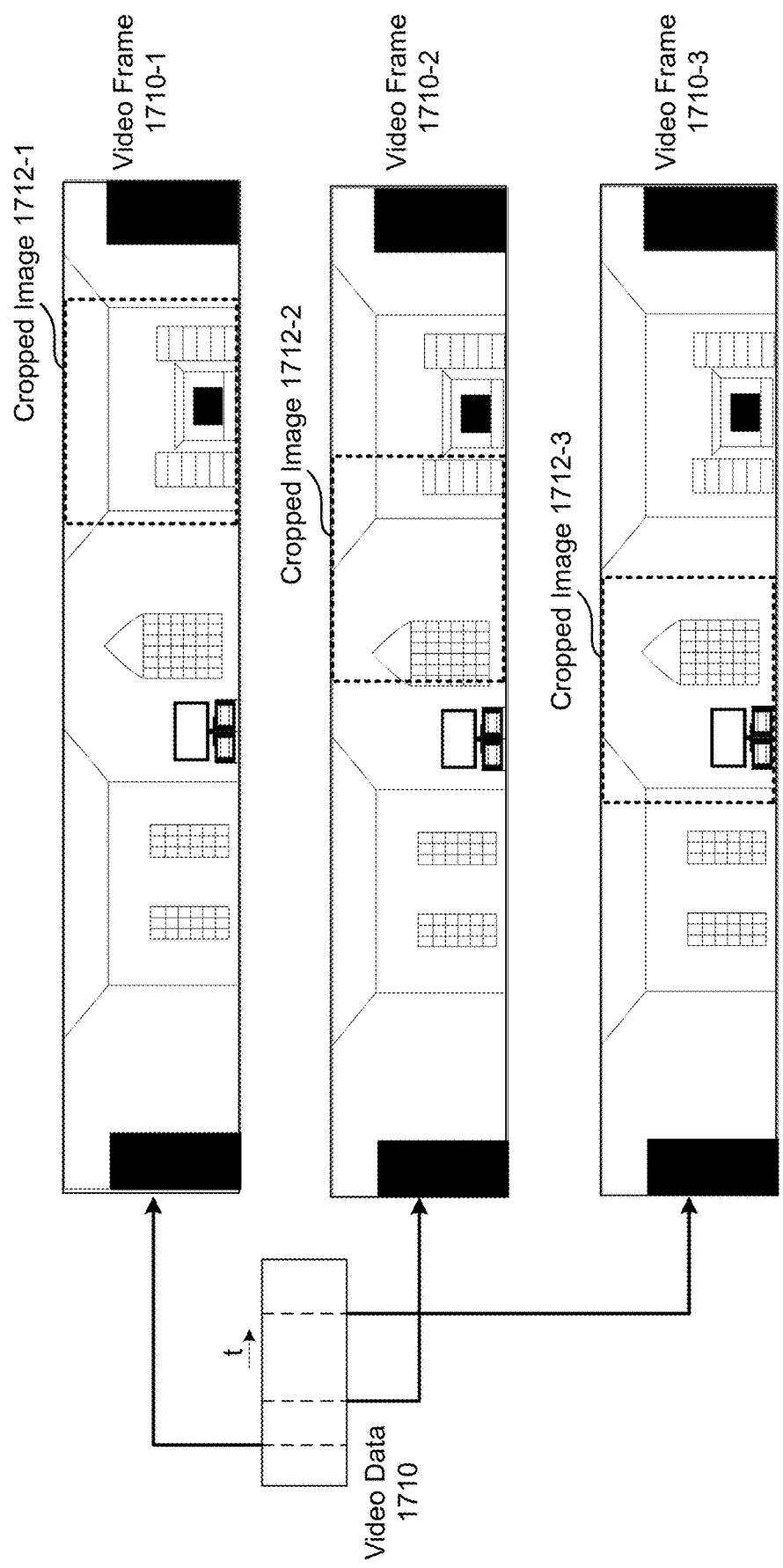

FIGS. 17A-17C illustrate an example of generating video tags according to embodiments of the present disclosure. As illustrated in FIG. 17A, the device 102 may generate a first tag 1720-1 associated with a first user interface 1700-1, a second tag 1720-2 associated with a second user interface 1700-2 and a third tag 1720-3 associated with a third user interface 1700-3. For example, the device 102 may display a video clip at a first video frame (e.g., the first video frame having a timestamp of 5 seconds) in the first user interface 1700-1 and may receive user input selecting a first angle (e.g., 90 degrees) and commanding the device 102 to generate the first tag 1720-1. The device 102 may then display the video clip at a second video frame (e.g., the second video frame having a timestamp of 10 seconds) in the second user interface 1700-2 and may receive user input selecting a second angle (e.g., 45 degrees) and commanding the device 102 to generate the second tag 1720-2. The device 102 may then display the video clip at a third video frame (e.g., the third video frame having a timestamp of 20 seconds) in the third user interface 1700-3 and may receive user input selecting a third angle (e.g., 0 degrees) and commanding the device 102 to generate the third tag 1720-3. While FIG. 17A illustrates three video tags, the disclosure is not limited thereto and a number of video tags generated by the device 102 may vary without departing from the present disclosure.

As illustrated in FIG. 17B, the device 102 may display a fourth user interface 1700-4 including one or more video tags. For example, the fourth user interface 1700-4 may include the first tag 1720-1 and first attributes associated with the first tag (e.g., first title, first timestamp, first angle and first cropped image 1712-1), the second tag 1720-2 and second attributes associated with the second tag (e.g., second title, second timestamp, second angle and second cropped image 1712-2) and the third tag 1720-3 and third attributes associated with the third tag (e.g., third title, third timestamp, third angle and third cropped image 1712-2).

FIG. 17C illustrates an example of panning according to embodiments of the present disclosure. As illustrated in FIG. 17C, the device 102 may pan from a first cropped image 1712-1 to a third cropped image 1712-3. For example, video frames 1710 may include a plurality of pixels in an x and y array, such that each pixel is associated with x and y coordinates of the video data at a particular moment in time. Thus, a first video frame 1710-1 includes first image data associated with a first time, a second video frame 1710-2 includes second image data associated with a second time and a third video frame 1710-3 includes third image data associated with a third time. The first tag 1720-1 may identify the first cropped image 1712-1 in the first video frame 1710-1, the second tag 1720-2 may identify the second cropped image 1712-2 in the second video frame 1710-2 and the third tag 1720-3 may identify the third cropped image 1712-3 in the third video frame 1710-3.

As illustrated in FIG. 17C, the simulated panning travels in a horizontal direction (e.g., negative x direction) from a first position of the first cropped image 1712-1 through a second position of the second cropped image 1712-2 to a third position of the third cropped image 1712-3. Therefore, the simulated panning extends along the x axis without vertical movements in the output video data. However, the present disclosure is not limited thereto and the cropped images 1712 may have varying sizes without departing from the present disclosure. Further, while FIG. 17C illustrates only the second cropped image 1712-2 between the first cropped image 1712-1 and the third cropped image 1712-3, the disclosure is not limited thereto and output video data may include a plurality of cropped images without departing from the present disclosure.

In some embodiments, the device 102 may pan at a constant rate throughout the video clip. For example, the device 102 may determine a difference between the beginning angle and the final angle and a length of the video clip and therefore may pan from the beginning angle to the final angle using a constant rate. In other embodiments, the device 102 may identify an object of interest in the video clip and may pan from the beginning angle to the final angle based on the object of interest. For example, the device 102 may identify and/or recognize content within video data using facial recognition, object recognition, sensors included within objects or clothing, computer vision or the like. For example, the computer vision may scan image data and identify a ball, including pixel coordinates and dimensions associated with the ball.

When panning between the beginning angle and the final angle, a rate of change in angle may be controlled by the device 102. For example, a velocity and/or acceleration of the panning may be limited to a ceiling value based on user preferences and/or user input. For example, the device 102 may use an acceleration curve to determine the velocity and/or acceleration of the panning and may limit the acceleration curve to a ceiling value. The ceiling value may be an upper limit on the velocity and/or acceleration to prevent a disorienting user experience, but the device 102 does not receive a low limit on the velocity and/or acceleration.

The velocity, acceleration, field of view, panning preferences, zooming preferences or the like may be stored as user preferences or settings associated with templates. Various machine learning techniques may be used to determine the templates, user preferences, settings and/or other functions of the system described herein. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including back propagation, statistical learning, supervised learning, semi-supervised learning, stochastic learning, or other known techniques. Many different training examples may be used during training. For example, video data from similar events may be processed to determine shared characteristics of the broadcasts and the characteristics may be saved as "ground truth" for the training examples. For example, machine learning techniques may be used to analyze golf broadcasts and determine characteristics associated with a golf template.

The device 102 may store a database of templates and may determine a relevant template based on the video clip. For example, the device 102 may generate and store templates associated with events like a party (e.g., a birthday party, a wedding reception, a New Year's Eve party, etc.), a sporting event (e.g., a golf template, a football template, a soccer template, etc.) or the like. A template may include user preferences and/or general settings associated with the event being recorded to provide parameters within which the device 102 processes the video data. Various other templates may be trained by the system, for example using machine learning techniques and training data to train the system as to important or non-important objects/events in various contexts.

Figure 18:
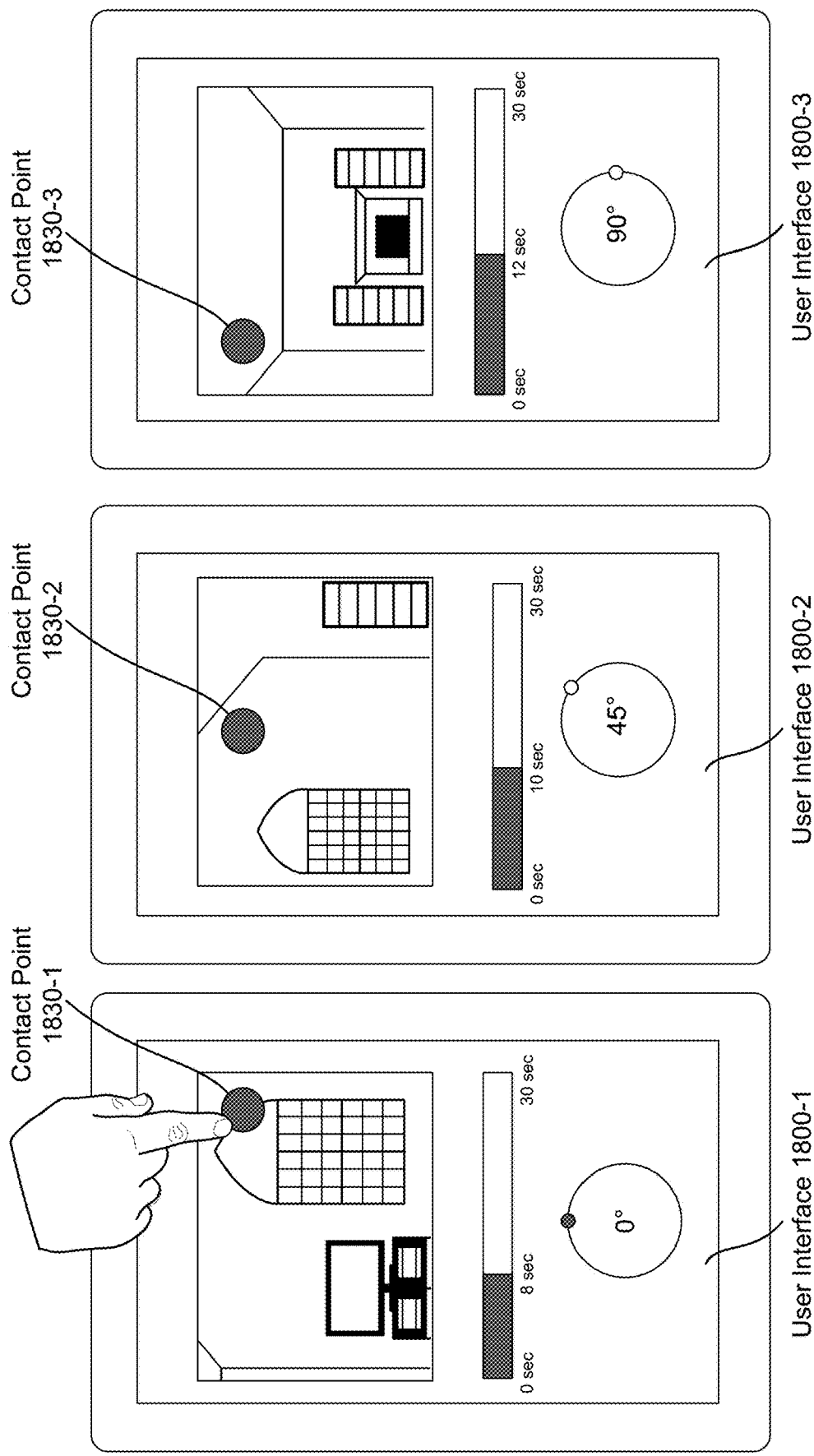
FIG. 18 illustrates an example of tracking angle generating video tags during playback of panoramic video data according to embodiments of the present disclosure.

FIG. 18 illustrates an example of tracking angles and generating video tags during playback of panoramic video data according to embodiments of the present disclosure. As illustrated in FIG. 18, the device 102 may playback video data from a beginning of a video clip to an end of the video clip. The device 102 may determine a beginning angle based on user input, object tracking, facial tracking, existing video tags or the like and may display a beginning video frame using the beginning angle. During playback, the device 102 may receive user input and may modify and/or track an angle associated with individual video frames based on the user input. For example, a user may touch the display 104 at a first time and swipe to the left as a subject moves to the right (within the video frame) during the video clip. Based on the swipe motion detected on the display 104, the device 102 may update the cropped image displayed on the display 104 during playback of the video clip, thus panning to the right along with the subject. The device 102 may store an angle associated with each video frame in the video clip, store an angle associated with a video frame when the user input changes the angle, store an angle associated with a video frame at a specified interval of time (e.g., every 3 seconds), store an angle associated with a video frame based on motion detected in the video frame or the like.

As illustrated in FIG. 18, at a first time the device 102 may display a first user interface 1800-1 (including a first cropped image, a first timing indicator and a first angle indicator) and may detect a first contact point 1830-1 corresponding to a user touching the display 104 at a first position. At a second time, the device 102 may display a second user interface 1800-2 (including a second cropped image, a second timing indicator and a second angle indicator) and may detect a second contact point 1830-2 corresponding to a user touching the display 104 at a second position. At a third time, the device 102 may display a third user interface 1800-3 (including a third cropped image, a third timing indicator and a third angle indicator) and may detect a third contact point 1830-3 corresponding to a user touching the display 104 at a third position. Based on the first contact point 1830-1, the second contact point 1830-2 and the third contact point 1830-3, the device 102 may determine that the user input a swipe motion in the cropped image and may determine to pan right (e.g., increase the angle from 0 degrees to 90 degrees). The device 102 may determine that the user input the swipe motion incrementally between the contact points 1830 to provide feedback on the display 104 with lower latency. In addition, the device 102 may allow the user to pause the video clip during playback for greater control of the desired angle. Therefore, the user may change a directional view of the cropped image by swiping the cropped image during playback of the video clip, the device 102 may update the display 104 accordingly and may track angles associated with individual video frames.

While FIG. 18 illustrates three user interfaces and three contact points, the present disclosure is not limited thereto and the device 102 may display a plurality of user interfaces and detect a plurality of contact points such that the cropped image displayed by the device 102 pans based on coordinates of the contact points. Further, the present disclosure is not limited to detecting contact corresponding to the cropped image and determining changes to the angle based on the detected contact. Instead, the device 102 may determine a desired angle based on contact corresponding to the angle indicator, a panoramic image or the like, as discussed above with regard to FIGS. 5B-5D, without departing from the present disclosure.

The device 102 may store angles as supporting data associated with individual video frames. For example, each video frame of a video clip may include an angle to display based on the steps described above. However, the device 102 may apply smoothing or other processing to smooth a panning effect during playback. For example, the device 102 may determine that the angle does not change more than a threshold for a period of time and may average the angle for the period of time. Thus, the device 102 may determine that a five second sequence of video frames having angles from 88 to 92 degrees may be averaged to a five second sequence of video frames having an angle of 90 degrees. Thus, an additional button or input may be displayed to allow the user to instruct the device 102 (or a remote device) to clean up the angles/panning in the video tags during video summarization. If the user selects to clean up the angles/panning, the device 102 may store this preference in the video tag so that the video summarization applies smoothing and other processing to improve stability during playback.

As discussed above, the device 102, image capture device 110 and/or the server(s) 112 may render the video using rendering information included in the generated video tags. For example, the rendering information may indicate an order of the selected video clip(s), the begin point and end point associated with the individual video clip(s), the selected theme, the selected panning for the individual video clip(s), the special effects, the audio data and/or other editing steps. As a first example, a first video tag may indicate the order of the selected video clip(s), a second video tag may indicate the begin point and the end point associated with a single video clip, etc. As a second example, a single video tag may include multiple edits, such as a first video tag indicating the begin point and the end point associated with a single video clip along with the selected panning for the single video clip and the special effects and/or audio data associated with the selected video clip. The video tags may correspond to individual video clips or a group of video clips without departing from the disclosure.

The previous drawings are primarily associated with the remote storage processing 310 and the local storage processing 312, which result in video data being uploaded to the server(s) 112. The following drawings are primarily associated with story assembly processing 314, which includes processing by the server(s) 112 after receiving video data (e.g., raw video data, panoramic video data, video clips, edited video clips or the like). Thus, the story assembly processing 314 may take the received video data and any additional inputs and may generate video clips and/or video summarization(s).

Figure 19:
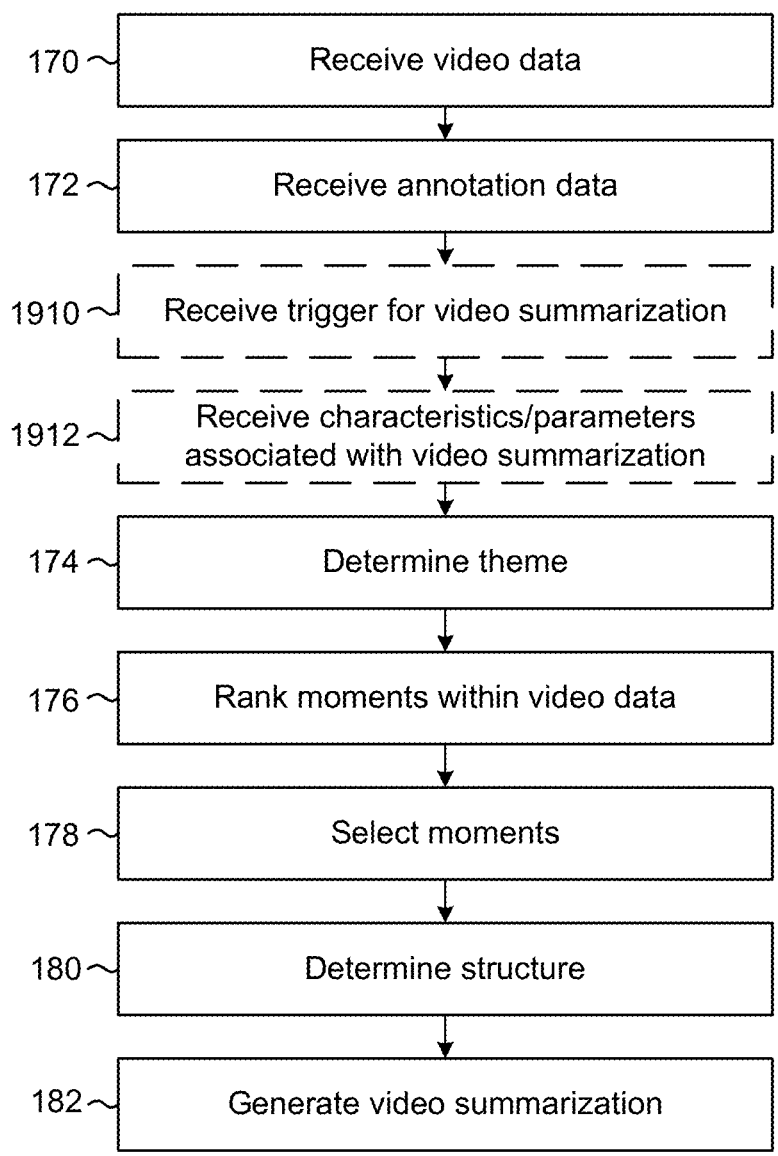
FIG. 19 is a flowchart conceptually illustrating an example method for performing storytelling processing according to embodiments of the present disclosure.

FIG. 19 is a flowchart conceptually illustrating an example method for performing storytelling processing according to embodiments of the present disclosure. As illustrated in FIG. 19, the server(s) 112 may receive (170) video data and, in some examples, additional data (e.g., audio data, IMU data, user tags, geographic location data, frame selector statistics or the like) in addition to the video data as discussed above with regard to FIG. 1A, The server(s) 112 may receive (172) annotation data, may optionally receive (1910) a trigger for video summarization and may receive (1912) characteristics/parameters associated with the video summarization. For example, the trigger for video summarization may indicate that the user 10 requested a video summarization, that the user 10 uploaded a number of videos at a single time or having capture dates within a period of time, that the video summarization is being generated based on an event, a holiday, a year in review or the like. In some examples, such as when the user 10 requests a video summarization, the server(s) 112 may receive characteristics/parameters to include in the video summarization. For example, if the system receives a request for video summarization (such as a request initiated by the user 10 using device 102), the indication may comprise identities of people to include, objects to include and/or other characteristics/parameters that may be indicated by annotation data. In some examples, the user 10 may optionally input a title for the video summarization and the server(s) 112 may perform natural language processing to extract a theme and/or concepts associated with a theme. In some examples, the user may select face(s) associated with the video summarization and the server(s) 112 may select a theme based on the face(s) selected.

Additionally or alternatively, if the trigger for video summarization is a particular event, holiday, year in review or the like, the trigger may be associated with characteristics/parameters. For example, a Christmas triggered video summarization may indicate that gifts, Christmas trees, holiday decorations and lights or the like should be included in the video summarization. The server(s) 112 may determine (174) a theme. Thus, the server(s) 112 may analyze the annotation data to select a series of output theme(s) and formats that corresponds to the received video data. For example, the server(s) 112 may scan the master clip table (MCT) to extract facts about the video clips and assemble a collection of heuristic variables and truths. The server(s) 112 may include additional data, such as dates of holidays, events, sports scores or the like. The server(s) 112 may use a rule management system to evaluate each moment against a selector for a candidate theme, and may send the output scores from the themes into another scorecard to make a decision (e.g., thresholding). For example, if the video data included video clips of children opening packages and a Christmas tree, the server(s) 112 may identify multiple candidate themes and an output score for each. By ranking the output scores, the server(s) 112 may determine that the theme is "Holidays." In some examples, the server(s) 112 may output a desired number of themes (e.g., top three scoring themes), or may output themes with a score greater than a threshold. The server(s) 112 may generate multiple video summarizations or may store the themes for user feedback after generating a single video summarization.

The server(s) 112 may rank (176) moments within the video data. For example, the server(s) 112 may determine a priority metric (e.g., interesting score) for moments within the video data using annotation data and/or retrieve the priority metric stored in the master clip table and may rank the moments using the priority metric. For example, a moment including multiple faces interacting with identifiable objects, good lighting, etc. may correspond to a high priority metric, whereas a moment including a landscape with no faces or identifiable objects may correspond to a low priority metric. The server(s) 112 may select (178) moments based on the ranking. In some examples, the server(s) 112 may select moments associated with priority metrics exceeding a threshold. Thus, the server(s) 112 selects as many moments that exist that exceed the threshold. However, in other examples the server(s) 112 may rank the moments and may only select a portion of the moments with priority metrics exceeding the threshold. For example, the server(s) 112 may select a desired number of moments based on the rankings (e.g., the top thirty moments or the like). Thus, the server(s) 112 may select the number of moments based on the desired number to include in the video summarization, instead of selecting all moments exceeding a global priority threshold. In some examples, the threshold may be determined based on the desired number of moments to include, such that a first threshold for a first video summarization may be different from a second threshold for a second video summarization. In some examples, the server(s) 112 may select a desired number of moments to include from each video clip. For example, a first video clip may include the top three ranked moments, but the server(s) 112 may include only one moment from the first video clip and may include a fourth ranked moment from a second video clip.

The server(s) 112 may determine (180) a structure of the video summarization. The structure defines an outline to be used when assembling a video summarization. For example, the server(s) 112 may examine the top-rated moments and identify which scenes represented in the moments should be included. Depending on the amount of source material, there may be one or many scenes to include. If there are a number of scenes, the server(s) 112 may select only a portion of the scenes using techniques similar to those described in greater detail above. In some examples, the server(s) 112 may select scenes based on specific identities or people, specific objects, specific characteristics or the like, which may be determined based on the master clip table and/or annotation data. For example, the user 10 may request the video summarization to emphasize a child, a holiday video summarization may include video clips having a Christmas tree, or the like.

The server(s) 112 may generate (182) a video summarization. In some examples, the server(s) 112 may generate the video summarization based on the user 10 uploading a number of videos at a single time or having capture dates within a period of time. Additionally or alternatively, the server(s) 112 may generate the video summarization based on user input requesting the video summarization and/or automatically based on an event, a holiday, a year in review or the like. The video summarization may include video clips captured at different times or dates and/or captured by different image capture devices 110. Thus, the video summarization is not limited to a single block of video data captured by a single image capture device 110. The video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined in steps 176-180.

Figure 20:
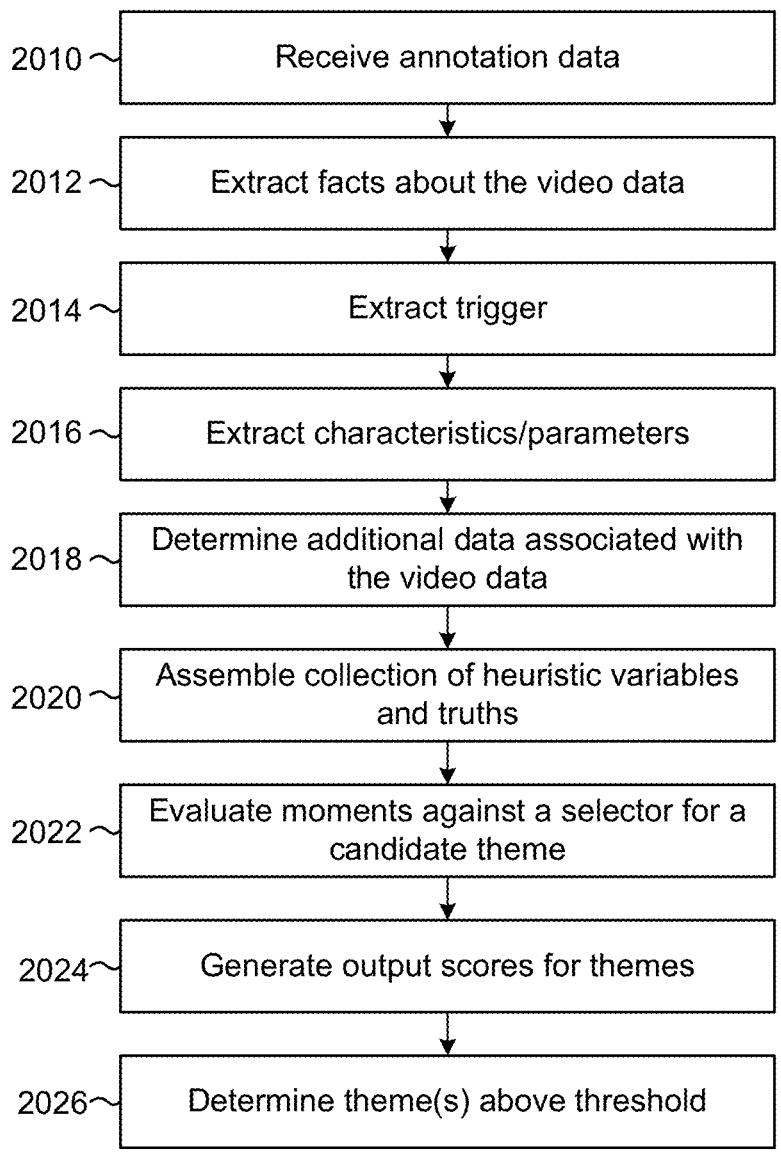
FIG. 20 is a flowchart conceptually illustrating an example method for determining a theme according to embodiments of the present disclosure.

FIG. 20 is a flowchart conceptually illustrating an example method for determining a theme according to embodiments of the present disclosure. As illustrated in FIG. 20, the server(s) 112 may receive (2010) annotation data and extract (2012) facts about the video data from the annotation data. The server(s) 112 may extract (2014) a trigger for the video summarization, extract (2016) characteristics/parameters associated with the video summarization and determine (2018) additional data associated with the video data. For example, the characteristics/parameters may be input by a user 10 or determined based on the trigger for the video summarization. The additional data may include dates of holidays, events, sports scores or the like that may be relevant to the video summarization. In some examples, the additional data may be stored in the annotation database as part of the annotation data, although the disclosure is not limited thereto.

In some examples, the facts extracted from the annotation data may include information about a scene (e.g., indoors, outdoors, sports arena, etc.), whether the video clip represents individuals or a group of people, heuristics about motion (e.g., fast moving scene, slow moving scene, camera in motion, people in motion, etc.), object annotation and/or specific object detection (e.g., birthday cake, balloons, etc.), although the disclosure is not limited thereto. In some examples the trigger for video summarization may include year in review, holiday, birthday, event, based on the user 10 uploading a number of videos at the same time, based on the user 10 uploading a number of videos captured on the same day or within a period of time, based on the user 10 uploading a number of vides within geographical proximity, or the like.

In some examples, the additional data may include a title input by the user 10 for the video summarization, which may be processed using natural language understanding to extract characteristics associated with the title. Additionally or alternatively, the additional data may include cross-user data extracted from other users. For example, the server(s) 112 may generate video "fingerprints" that indicate characteristics of a video clip that may be used to identify similar video clips without compromising user privacy or confidentiality. The characteristics of the video clip may include feature vectors, histograms of image data, gradients of the image data, histograms of gradients, a signature of the image data or the like that may be used to determine if image data is similar between video clips. Using the video fingerprints, the server(s) 112 may identify similar video data uploaded by other users representing an event (e.g., a number of videos uploaded after the Olympics, a sporting event, a concert or the like). Due to the similarity between the video data, the server(s) 112 may borrow characteristics of manually selected summarization and automatically transfer manual selections from other users to generate the video summarization.

The server(s) 112 may assemble (2020) a collection of heuristic variables and truths and evaluate (2022) moments against a selector for a candidate theme. Thus, each moment has a certain set of attributes that may be compared to candidate themes in order to select the appropriate theme. For example, the server(s) 112 may determine that a moment includes movement, such as a changing geographic location, prominently represents a face, includes motion above a threshold and represents a specific object such as a road or road signs. As a result, the server(s) 112 may determine a likely candidate theme to be a Road Trip theme. The server(s) 112 may generate (2024) output scores for candidate themes and determine (2026) theme(s) having an output score exceeding a threshold. In some examples, the server(s) 112 may output a desired number of themes (e.g., top three scoring themes), or may output themes with a score greater than a threshold. The server(s) 112 may generate multiple video summarizations or may store the themes for user feedback after generating a single video summarization. After determining characteristics of the video data (e.g., every clip included in the video data) to determine a theme, the server(s) 112 may select individual video clips using the selected theme.

Figure 21:
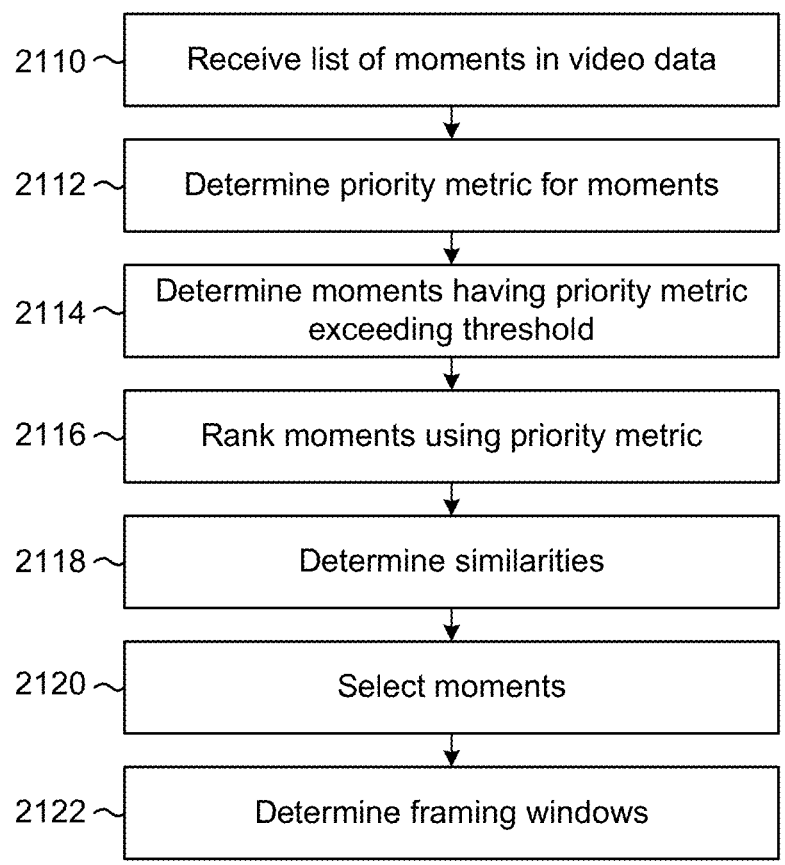
FIG. 21 is a flowchart conceptually illustrating an example method for selecting moments according to embodiments of the present disclosure.

FIG. 21 is a flowchart conceptually illustrating an example method for selecting moments according to embodiments of the present disclosure. As illustrated in FIG. 21, the server(s) 112 may receive (2110) a list of moments in the video data and determine (2112) priority metrics for the moments. As discussed above, the server(s) 112 may generate a priority metric associated with individual moments included in video data based on annotation data or may retrieve previously generated priority metrics from a master clip table. The server(s) 112 may determine (2114) first moments having a priority metric exceeding a threshold and may rank (2116) the first moments using the individual priority metrics. The server(s) 112 may determine (2118) similarities between the first moments, may select (2120) moments based on the rankings, similarities and/or the priority metrics and may determine (2122) framing windows associated with the moments.

The server(s) 112 may determine similarities between the first moments using a similarity matrix to identify similar content (e.g., video clips having high affinity with respect to certain attributes/characteristics). For example, the server(s) 112 may determine if two moments are similar in terms of color characteristics, number of faces, motion data, etc., which may be indicated by the similarity matrix (e.g., a two dimensional array indicating a similarity between the two video clips). The server(s) 112 may select moments to increase a diversity across moments, such as by selecting one moment from each group of similar moments. For example, the server(s) 112 may determine that each moment in a group of moments have a relatively high priority metric but the group of moments include similar content. Instead of selecting multiple moments from the group of moments, the server(s) 112 may select the highest ranked moment of the group of moments based on the priority metric.

In addition to selecting moments to increase a diversity across moments, the server(s) 112 may select moments based on a likelihood of interest indicated by the priority metric. In a first example, the server(s) 112 may select moments having a priority metric exceeding a global threshold. In a second example, the threshold may be determined based on the desired number of moments, such that a first threshold for a first video summarization may be different from a second threshold for a second video summarization. In a third example, the server(s) 112 may only select a portion of the moments with priority metrics exceeding the threshold. For example, the server(s) 112 may select a desired number of moments based on the rankings (e.g., the top thirty moments or the like). Thus, the server(s) 112 may select the number of moments based on the desired number to include in the video summarization, instead of selecting all moments exceeding the global priority threshold. Additionally or alternatively, the server(s) 112 may select a desired number of moments from individual video clips, thus including lower rated moments from a first video clip rather than multiple moments from a second video clip.

A moment may be associated with a region of interest within a video clip, which may include a time range (e.g., beginning frame and an ending frame) and a position (e.g., x and y pixel coordinates) within the video data. The server(s) 112 may generate video clips based on the time range associated with the moment, but a video clip may include an entirety of the pixel coordinates associated with the video data over the time range. Therefore, the server(s) 112 may determine a region of interest associated with a moment and may determine framing windows that include a portion of the pixel coordinates (e.g., a cropped image). Thus, the server(s) 112 may render the framing windows when generating the video summarization, such that the video summarization only includes the portion of the pixel coordinates associated with the region of interest (indicated by the framing windows) over the time range. As discussed below with regard to FIGS. 22A-24, the server(s) 112 may determine the framing windows associated with individual moments using context points.

The server(s) 112 may determine a context point in video data, and the context point may be associated with a time (e.g., image frame) and a position (e.g., x and y pixel coordinates) within the video data 2210 (for example a position/coordinates within certain frame(s) of the video data). For example, the first context point may correspond to a beginning of the event (e.g., a first time) and pixels in the video data 2210 associated with an object or other content (e.g., a first position) at the first time. Therefore, the server(s) 112 may associate the first context point with first image data (corresponding to the first time) and first pixel coordinates within the first image data (corresponding to the first position) that display the object. The server(s) 112 may determine a second context point, which may also be associated with a time (e.g., image frame) and a position (e.g., x and y coordinates) within the video data 2210. For example, the second context point may correspond to an end of the event (e.g., a second time) and pixels in the video data 2210 associated with the object (e.g., a second position) at the second time. Therefore, the server(s) 112 may associate the second context point with a second image (corresponding to the second time) and second pixel coordinates within the second image (corresponding to the second position) that display the object.

The server(s) 112 may determine a first framing window associated with the first context point. In some examples, the first framing window may include content associated with the event (e.g., a tracked object, person or the like) and may be sized according to a size of the content and the first direction. For example, the content may be a face associated with first pixels having first dimensions and the first direction may be in the horizontal direction (e.g., positive x direction). The server(s) 112 may determine that the content should be included in 50% of the first framing window and may therefore determine a size of the framing window to have second dimensions twice the first dimensions. As the first direction is in the positive x direction, the server(s) 112 may situate the framing window with lead room (e.g., nose room) in the positive x direction from the content.

The server(s) 112 may determine a second framing window associated with the second context point. In some examples, the second framing window may include content associated with the event (e.g., a tracked object, person or the like) and may be sized according to a size of the content. Unlike the first framing window, the second framing window may be sized or located with or without regard to the first direction. For example, as the simulated panning ends at the second framing window, the server(s) 112 may center-weight (i.e., place the content in a center of the frame) the second framing window without including lead room.

In addition to or instead of outputting video data, the server(s) 112 may output the framing windows as video tags for video editing. For example, the server(s) 112 may determine the framing windows and output the framing windows server(s) 112 to perform additional editing and/or subsequent video summarization on the video data. The framing windows may be output using video tags, each video tag including information about a size, a position and a timestamp associated with a corresponding framing window. In some examples, the video tags may include pixel coordinates associated with the framing window, while in other examples the video tags may include additional information such as pixel coordinates associated with the object of interest within the framing window or other information determined by the server(s) 112. Using the video tags, the server(s) 112 may generate edited video clips of the input data, the edited video clips simulating the panning and zooming using the framing windows. For example, the server(s) 112 may generate a video summarization including a series of video clips, some of which simulate panning and zooming using the framing windows.

As the server(s) 112 is processing the video data after capturing of the video data has ended, the server(s) 112 has access to every video frame included in the video data. Therefore, the server(s) 112 can track objects and people within the video data and may identify context points (e.g., interesting points in time, regions of interest, occurrence of events or the like). After identifying the context points, the server(s) 112 may generate framing windows individually for the context points and may simulate panning and zooming between the context points. For example, the output video data may include portions of the image data for each video frame based on the framing window, and a difference in position and/or size between subsequent framing windows results in panning (e.g., difference in position) and/or zooming (e.g., difference in size). The output video data should therefore include smooth transitions between context points.

The server(s) 112 may identify and/or recognize content within the video data using facial recognition, object recognition, sensors included within objects or clothing, computer vision or the like. For example, the computer vision may scan image data and identify a soccer ball, including pixel coordinates and dimensions associated with the soccer ball. Based on a sporting event template, the server(s) 112 may generate a framing window for the soccer ball such that pixels associated with the soccer ball occupy a desired percentage of the framing window. For example, if the dimensions associated with the soccer ball are (x, y) and the desired percentage of the framing window is 50%, the server(s) 112 may determine that dimensions of the framing window are (2x, 2y).

The server(s) 112 may store a database of templates and may determine a relevant template based on video data of an event being recorded. For example, the server(s) 112 may generate and store templates associated with events like a party (e.g., a birthday party, a wedding reception, a New Year's Eve party, etc.), a sporting event (e.g., a golf template, a football template, a soccer template, etc.) or the like. A template may include user preferences and/or general settings associated with the event being recorded to provide parameters within which the server(s) 112 processes the video data. For example, if the server(s) 112 identifies a golf club and a golf course in the video data, the server(s) 112 may use a golf template and may identify golf related objects (e.g., a tee, a green, hazards and a flag) within the video data. Using the golf template, the server(s) 112 may use relatively large framing windows to simulate a wide field of view to include the golf course. In contrast, if the server(s) 112 identifies a birthday cake, gifts or other birthday related objects in the video data, the server(s) 112 may use a birthday template and may identify a celebrant, participants and areas of interest (e.g., a gift table, a cake or the like) within the video data. Using the birthday template, the server(s) 112 may use relatively small framing windows to simulate a narrow field of view to focus on individual faces within the video data. Various other templates may be trained by the system, for example using machine learning techniques and training data to train the system as to important or non-important objects/events in various contexts.

In some embodiments, the server(s) 112 may pan at a constant rate throughout the video clip. For example, the server(s) 112 may determine a difference between a first context point and a last context point and a length of the video clip and therefore may pan from the first context point to the last context point using a constant rate. In other embodiments, the server(s) 112 may identify an object of interest in the video clip and may pan from the first context point to the last context point based on the object of interest.

When panning between context points (e.g., framing windows), an amount of pan/zoom may be based on a size of the content within the framing window. For example, a wider field of view can pan more quickly without losing context, whereas a narrow field of view may pan relatively slowly. Thus, a velocity and/or acceleration of the pan/zoom may be limited to a ceiling value based on the template selected by the server(s) 112 and/or user input. For example, the server(s) 112 may use an acceleration curve to determine the velocity and/or acceleration of the pan/zoom and may limit the acceleration curve to a ceiling value. The ceiling value may be an upper limit on the velocity and/or acceleration to prevent a disorienting user experience, but the server(s) 112 does not receive a low limit on the velocity and/or acceleration.

As discussed above, the velocity, acceleration, field of view, panning preferences, zooming preferences or the like may be stored as user preferences or settings associated with templates. Various machine learning techniques may be used to determine the templates, user preferences, settings and/or other functions of the system described herein.

FIG. 22A illustrates an example of tracking an object according to embodiments of the present disclosure. The server(s) 112 may track the object using a sensor (e.g., RFID tag within the object), using computer vision to detect the object within the video data or the like. As illustrated in FIG. 22A, the server(s) 112 may track a tracked object 2214 (e.g., a soccer ball) within the field of view 2212 associated with video data 2210. A first video frame 2220-1 includes first image data associated with a first time, a second video frame 2220-2 includes second image data associated with a second time and a third video frame 2220-3 includes third image data associated with a third time. As the server(s) 112 is processing the video data 2210 after capturing of the video data 2210 has ended, the server(s) 112 has access to every video frame included in the video data 2210. Thus, the server(s) 112 may determine an anchor point associated with an event of interest and then determine a first context point preceding the anchor point and a second context point following the anchor point. The anchor point, the first context point and the second context point may be associated with a time (e.g., video frame) and a position (e.g., a plurality of pixels having x and y coordinates) within the video data. For example, the first context point may be associated with pixel coordinates in the first video frame 2220-1, the anchor point may be associated with pixel coordinates in the second video frame 2220-2 and the second context point may be associated with pixel coordinates in the third video frame 2220-3.

To determine that the event of interest occurred, the server(s) 112 may track the tracked object 2214 and determine if the tracked object 2214 interacts with any identifiable content (e.g., face, person, object, goal or the like). For example, the server(s) 112 may determine if the tracked object 2214 goes out of bounds, scores a goal, is passed between multiple players or other actions associated with the game of soccer. The server(s) 112 may determine that an event occurred based on user preferences, such as when the soccer ball goes out of bounds or scores a goal. As illustrated in FIG. 22 the event is scoring a goal, so the server(s) 112 may determine that the event occurred when the tracked object 2214 is in proximity to a goal 14 (e.g., a distance between the tracked object 2214 and the goal 14 is below a threshold). The server(s) 112 may therefore determine an anchor point 2230 associated with pixel coordinates of the tracked object 2214 and/or goal 14 (e.g., position) in the second video frame 2220-2 (e.g., time).

After determining the anchor point 2230, the server(s) 112 may determine the first context point 2232-1 preceding the anchor point. To determine the first context point 2232-1, the server(s) 112 may determine when the tracked object 2214 is first in proximity to the goal 14 or may determine a fixed duration prior to the anchor point 2230. As a first example, the first context point 2232-1 may correspond to the tracked object 2214 being in proximity to the goal 14 when a distance between the tracked object 2214 and the goal 14 is below a second threshold. As the first threshold is being used to determine that an event occurred, the second threshold is used to determine when the event began and is therefore larger than the first threshold. In the first example, the first context point 2232-1 may occur at any time prior to the anchor point 2230 and may vary depending on multiple variables. Therefore, the output video data may provide context for how the tracked object 2214 arrived near the goal 14. As a second example, the first context point 2232-1 may correspond to the fixed duration prior to the anchor point 2230, such as a period of 5 or 10 seconds before the second video frame 2220-2. As the fixed duration is constant, the first context point 2232-1 corresponds to the first video frame 2220-1 regardless of a position of the tracked object 2214. In the second example, the output video data may provide a lead-in time prior to the anchor point 2230.

Similarly, the server(s) 112 may determine the second context point 2232-2 following the anchor point. To determine the second context point 2232-2, the server(s) 112 may determine when the tracked object 2214 is last in proximity to the goal 14 subsequent to the anchor point 2230 or may determine a fixed duration following the anchor point 2230. As a first example, the second context point 2232-2 may correspond to the tracked object 2214 moving out of proximity to the goal 14 when a distance between the tracked object 2214 and the goal 14 exceeds the second threshold. In the first example, the second context point 2232-2 may occur at any time following the anchor point 2230 and may vary depending on multiple variables. Therefore, the output video data may provide context for how the tracked object 2214 left the goal 14. As a second example, the second context point 2232-2 may correspond to the fixed duration following the anchor point 2230, such as a period of 5 or 10 seconds after the second video frame 2220-2. As the fixed duration is constant, the second context point 2232-2 corresponds to the third video frame 2220-3 regardless of a position of the tracked object 2214. In the second example, the output video data may including a period of time following the anchor point 2230.

As illustrated in FIG. 22, the server(s) 112 may determine a first cropped window 2222-1 including a portion of the first video frame 2220-1, where first dimensions of the first cropped window 2222-1 may be based on the first context point 2232-1 such that the first cropped window 2222-1 includes the person 11 and/or the tracked object 2214. The server(s) 112 may determine a second cropped window 2222-2 including a portion of the second video frame 2220-2, where second dimensions of the second cropped window 2222-2 may be based on the anchor point 2230 such that the second cropped window 2222-2 includes the person 11, the tracked object 2214, the goalie 12 and/or the goal 14. FIG. 22A is not to scale and the second cropped window 2222-2 may include more content in the vertical direction, such as a crowd and a stadium. The server(s) 112 may determine a third cropped window 2222-3 including a portion of the third video frame 2220-3, where third dimensions of the third cropped window 2222-3 may be based on the second context point 2232-2 such that the third cropped window 2222-3 includes the tracked object 2214, the goalie 12 and/or the goal 14. As the server(s) 112 is tracking the tracked object 2214, the third cropped window 2222-3 includes the tracked object 2214 instead of a celebration by the person 11. In some examples, the first dimensions, second dimensions and third dimensions are equal, resulting in the output video data simulating panning from right to left between the first cropped window 2222-1 and the third cropped window 2222-3. As illustrated in FIG. 22A, however, the first dimensions, the second dimensions and the third dimensions are different, resulting in the output video data simulating panning and zooming between the first cropped window 2222-1 and the third cropped window 2222-3.

While FIG. 22A illustrates the cropped windows 2222 including two or more of the person 11, the tracked object 2214, the goalie 12 and the goal 14, the present disclosure is not limited thereto. Instead, each of the cropped windows 2222 may emphasize one of the person 11, the tracked object 2214, the goalie 12 and the goal 14 without departing from the present disclosure. Alternatively, as discussed in greater detail below with regard to FIG. 24, the output video data may include two or more of the person 11, the tracked object 2214, the goalie 12 and the goal 14 using picture in picture. The server(s) 112 may determine which of the person 11, the tracked object 2214, the goalie 12 and/or the goal 14 to emphasize using at least one trained machine learning model and settings associated with a template.

While FIG. 22A illustrates a first context point 2232-1 preceding the anchor point 2230 and a second context point 2232-2 following the anchor point 2230, the present disclosure is not limited thereto. Instead, the output video data may include a plurality of context points 2232 without departing from the present disclosure. For example, the server(s) 112 may determine an additional context point associated with a reaction of the goalie 12 or a reaction of the crowd cheering after the goal is scored and may display the reaction of the goalie 12 and/or the reaction of the crowd in addition to the context points illustrated in FIG. 22A. While not illustrated in FIG. 22A, the server(s) 112 may generate non-linear output video data. For example, the output video data may include a first video clip of the event (e.g., the goal scoring) from a first perspective (e.g., the response of the goalie 12) followed by a second video clip of the event from a second perspective (e.g., the response of the crowd) without departing from the present disclosure.

Figure 22B:
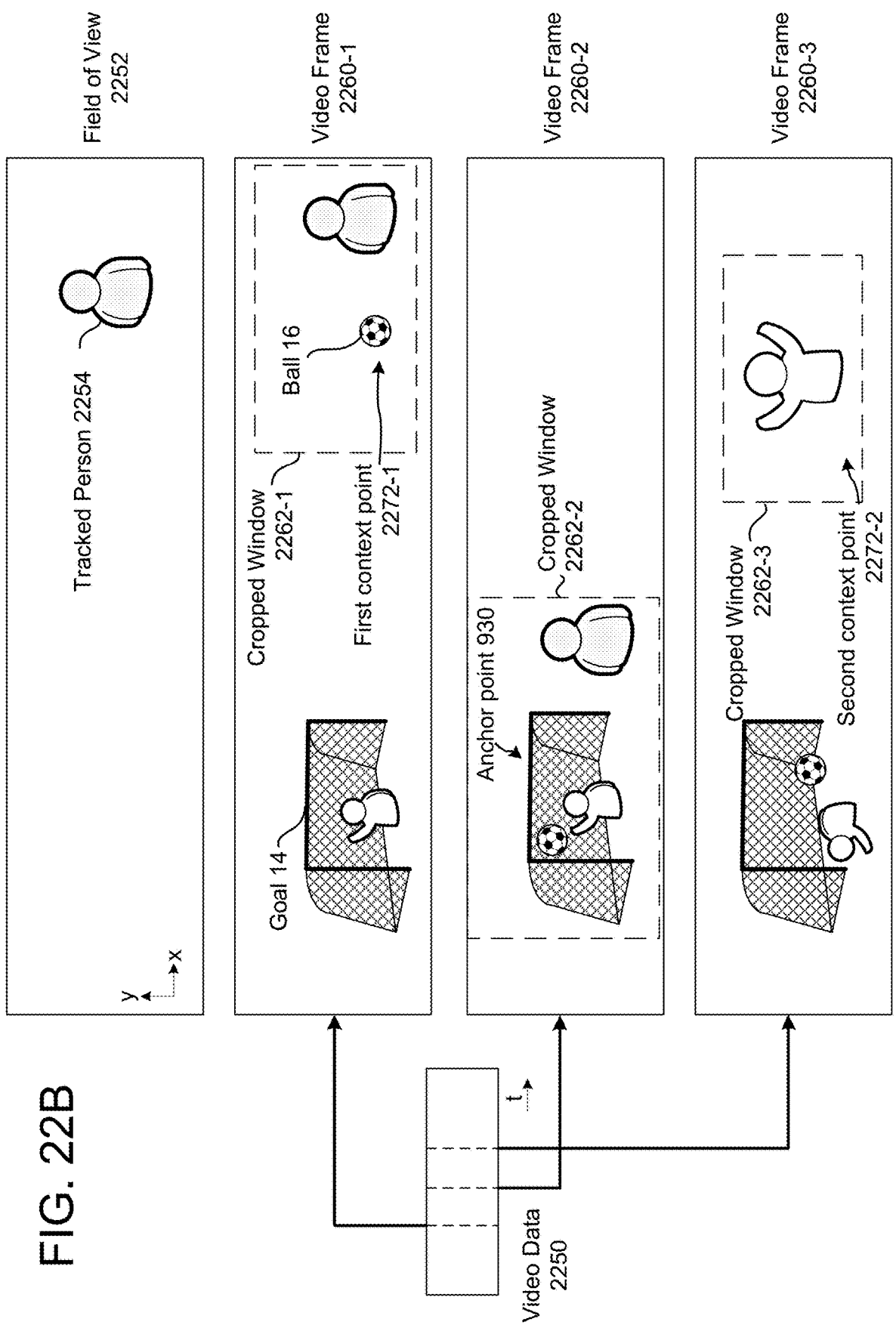

FIG. 22B illustrates an example of tracking a person according to embodiments of the present disclosure. The server(s) 112 may track the person using a sensor (e.g., RFID tag in clothing worn by the person), using computer vision to detect the person within the video data (e.g., facial recognition) or the like. As illustrated in FIG. 22B, the server(s) 112 may track a tracked person 2254 (e.g., a soccer player) within the field of view 2252 associated with video data 2250. A first video frame 2260-1 includes first image data associated with a first time, a second video frame 2260-2 includes second image data associated with a second time and a third video frame 2260-3 includes third image data associated with a third time. As the server(s) 112 is processing the video data 2250 after capturing of the video data 2250 has ended, the server(s) 112 has access to every video frame included in the video data 2250. Thus, the server(s) 112 may determine an anchor point associated with an event of interest and then determine a first context point preceding the anchor point and a second context point following the anchor point. The anchor point, the first context point and the second context point may be associated with a time (e.g., video frame) and a position (e.g., a plurality of pixels having x and y coordinates) within the video data. For example, the first context point may be associated with pixel coordinates in the first video frame 2260-1, the anchor point may be associated with pixel coordinates in the second video frame 2260-2 and the second context point may be associated with pixel coordinates in the third video frame 2260-3.

To determine that the event of interest occurred, the server(s) 112 may track the tracked person 2254 and determine if the tracked person 2254 interacts with any identifiable content (e.g., ball, person, object, goal or the like). For example, the server(s) 112 may determine if the tracked person 2254 passes the ball 16, shoots the ball 16, collides with another player or other actions associated with the game of soccer. The server(s) 112 may determine that an event occurred based on user preferences, such as when the tracked person 2254 shoots the ball 16. As illustrated in FIG. 22B the event is shooting on a goal 14, so the server(s) 112 may determine that the event occurred when the tracked person 2254 kicks the ball 16 towards the goal 14 and a distance between the ball 16 and the goal 14 is below a first threshold. The server(s) 112 may therefore determine an anchor point 2270 associated with pixel coordinates of the tracked person 2254, ball 16 and/or goal 14 (e.g., position) in the second video frame 2260-2 (e.g., time).

After determining the anchor point 2270, the server(s) 112 may determine the first context point 2272-1 preceding the anchor point. To determine the first context point 2272-1, the server(s) 112 may determine when the tracked person 2254 is first in proximity to the goal 14 or may determine a fixed duration prior to the anchor point 2270. As a first example, the first context point 2272-1 may correspond to the tracked person 2254 being in proximity to the goal 14 when a distance between the tracked person 2254 and the goal 14 is below a second threshold. As the first threshold is being used to determine that an event occurred, the second threshold is used to determine when the event began and is therefore larger than the first threshold. In the first example, the first context point 2272-1 may occur at any time prior to the anchor point 2270 and may vary depending on multiple variables. Therefore, the output video data may provide context for how the tracked person 2254 arrived near the goal 14. As a second example, the first context point 2272-1 may correspond to the fixed duration prior to the anchor point 2270, such as a period of 5 or 10 seconds before the second video frame 2260-2. As the fixed duration is constant, the first context point 2272-1 corresponds to the first video frame 2260-1 regardless of a position of the tracked person 2254. In the second example, the output video data may provide a lead-in time prior to the anchor point 2270.

Similarly, the server(s) 112 may determine the second context point 2272-2 following the anchor point. To determine the second context point 2272-2, the server(s) 112 may determine when the tracked person 2254 and/or ball 16 are last in proximity to the goal 14 subsequent to the anchor point 2270 or may determine a fixed duration following the anchor point 2270. As a first example, the second context point 2272-2 may correspond to the tracked person 2254 moving out of proximity to the goal 14 when a distance between the tracked person 2254 and the goal 14 exceeds the second threshold. In the first example, the second context point 2272-2 may occur at any time following the anchor point 2270 and may vary depending on multiple variables. Therefore, the output video data may provide context for how the tracked person 2254 left the goal 14. As a second example, the second context point 2272-2 may correspond to the fixed duration following the anchor point 2270, such as a period of 5 or 10 seconds after the second video frame 2260-2. As the fixed duration is constant, the second context point 2272-2 corresponds to the third video frame 2260-3 regardless of a position of the tracked person 2254. In the second example, the output video data may including a period of time following the anchor point 2270.

As illustrated in FIG. 22B, the server(s) 112 may determine a first cropped window 2262-1 including a portion of the first video frame 2260-1, where first dimensions of the first cropped window 2262-1 may be based on the first context point 2272-1 such that the first cropped window 2262-1 includes the person 11 and/or the tracked person 2254. The server(s) 112 may determine a second cropped window 2262-2 including a portion of the second video frame 2260-2, where second dimensions of the second cropped window 2262-2 may be based on the anchor point 2270 such that the second cropped window 2262-2 includes the person 11, the tracked person 2254, the goalie 12 and/or the goal 14. FIG. 22B is not to scale and the second cropped window 2262-2 may include more content in the vertical direction, such as a crowd and a stadium. The server(s) 112 may determine a third cropped window 2262-3 including a portion of the third video frame 2260-3, where third dimensions of the third cropped window 2262-3 may be based on the second context point 2272-2 such that the third cropped window 2262-3 includes the tracked person 2254. As the server(s) 112 is tracking the tracked person 2254, the third cropped window 2262-3 includes a celebration by the tracked person 2254 instead of a reaction of the goalie 12. In some examples, the first dimensions, second dimensions and third dimensions are equal, resulting in the output video data simulating panning from right to left between the first cropped window 2262-1 and the third cropped window 2262-3. As illustrated in FIG. 22B, however, the first dimensions, the second dimensions and the third dimensions are different, resulting in the output video data simulating panning and zooming between the first cropped window 2262-1 and the third cropped window 2262-3.

While FIG. 22B illustrates the cropped windows 2262 including two or more of the tracked person 2254, the goalie 12, the goal 14 and the ball 16, the present disclosure is not limited thereto. Instead, each of the cropped windows 2262 may emphasize one of the tracked person 2254, the goalie 12, the goal 14 and the ball 16 without departing from the present disclosure. Alternatively, as discussed in greater detail below with regard to FIG. 24, the output video data may include two or more of the tracked person 2254, the goalie 12, the goal 14 and the ball 16 using picture in picture. The server(s) 112 may determine which of the tracked person 2254, the goalie 12, the goal 14 and/or the ball 16 to emphasize using at least one trained machine learning model and settings associated with a template.

While FIG. 22B illustrates a first context point 2272-1 preceding the anchor point 2270 and a second context point 2272-2 following the anchor point 2270, the present disclosure is not limited thereto. Instead, the output video data may include a plurality of context points 2272 without departing from the present disclosure. For example, the server(s) 112 may determine an additional context point associated with a reaction of the goalie 12 or a reaction of the crowd cheering after the goal is scored and may display the reaction of the goalie 12 and/or the reaction of the crowd in addition to the context points illustrated in FIG. 22B. While not illustrated in FIG. 22B, the server(s) 112 may generate non-linear output video data. For example, the output video data may include a first video clip of the event (e.g., the goal scoring) from a first perspective (e.g., the response of the goalie 12) followed by a second video clip of the event from a second perspective (e.g., the response of the crowd) without departing from the present disclosure.

Figure 23A:
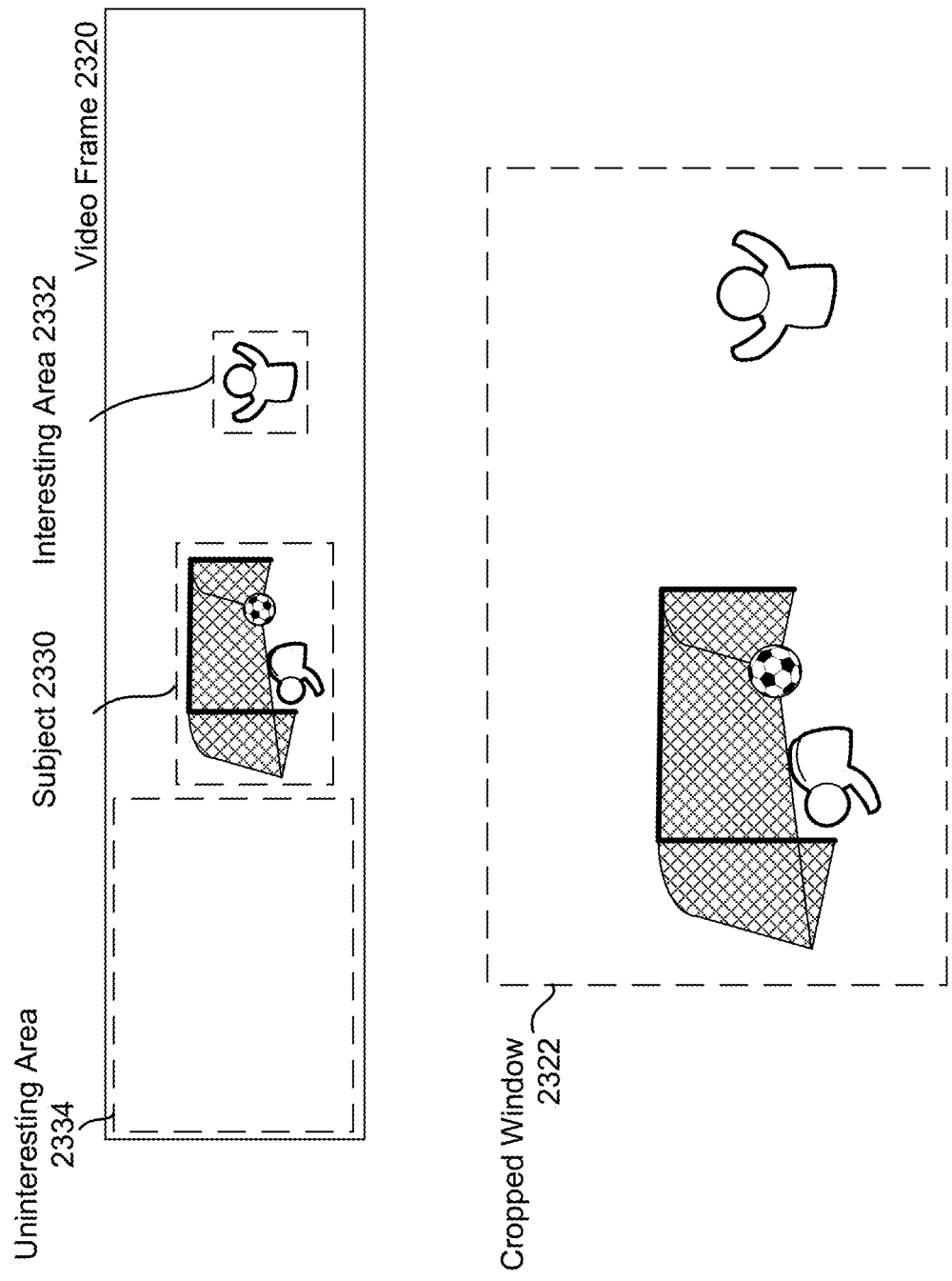

FIGS. 23A-23B illustrate examples of selecting interesting areas according to embodiments of the present disclosure. FIG. 23A illustrates an example of excluding an uninteresting area from a framing window according to embodiments of the present disclosure. As illustrated in FIG. 23A, a video frame 2320 may include a subject 2330 (e.g., a scored goal), an interesting area 2332 (e.g., a celebrating player) and an uninteresting area 2334. For example, the server(s) 112 may determine that the subject 2330 is the goal being scored based on the events discussed above with regard to FIGS. 22A-22B. After determining the subject 2330, the server(s) 112 may identify content neighboring the subject and determine if the neighboring content is interesting or uninteresting. For example, the server(s) 112 may identify that first neighboring content (e.g., area to the right of the subject 2330) is associated with the person 11 who scored the goal and may determine that the first neighboring content is the interesting area 2332. Similarly, the server(s) 112 may identify that second neighboring content (e.g., area to the left of the subject 2330) is associated with static objects that have not moved during the event and may determine that the second neighboring content is the uninteresting area 2334. The server(s) 112 may determine that content is neighboring the subject 2330 based on a number of pixels separating the content and the subject 2330 within the video data, based on a number of pixels separating the content and the subject 2330 within the video data and a size of the subject 2330 within the video data, an estimated distance between the content and the subject 2330 in during the event or the like. The camera angle and/or position capturing the video data may change, so the server(s) 112 may determine if the neighboring content is static after adjusting for the change in camera angle and/or position. For example, the server(s) 112 may identify visually distinct areas in the video data and may use the visually distinct areas as landmarks to determine changes in camera angle and/or position. Additionally or alternatively, the server(s) 112 may track the interesting area 2332 and/or the uninteresting area 2334 as discussed above with regard to tracking an object.

In some examples, the server(s) 112 may determine an interesting area in the video frame by determining content that is similar to content associated with a subject, object, event of interest or the like. Therefore, the server(s) 112 may determine existing content (e.g., the content associated with the subject, object, event or the like) and may identify similar content as the interesting area, For example, if the server(s) 112 is tracking a first player in a red jersey, the server(s) 112 may analyze the video frame, identify a second player in a red jersey and may determine that the second player corresponds to the interesting area due to the similarity between the red jersey of the first player and the red jersey of the second player. Similarly, the server(s) 112 may determine an uninteresting area in the video frame by determining content that is dissimilar to content associated with the subject, object, event of interest or the like. Therefore, the server(s) 112 may determine existing content (e.g., the content associated with the subject, object, event or the like) and may identify dissimilar content as the uninteresting area, For example, if the server(s) 112 is tracking a first player in a red jersey, the server(s) 112 may analyze the video frame, identify a second player in a blue jersey and may determine that the second player corresponds to the uninteresting area due to the dissimilarity between the red jersey of the first player and the blue jersey of the second player. The system may use color histogram information to determine an interesting or uninteresting area (for example using players' jerseys). However, the above examples are intended merely as an illustration and the present disclosure is not limited thereto. Instead, the server(s) 112 may identify attributes associated with the existing content, determine the interesting area due to shared attributes and determine the uninteresting area due to different attributes. For example, at a birthday party the server(s) 112 may identify a first child as the object to track and may therefore determine that a second child corresponds to the interesting area while a first adult corresponds to an uninteresting area.

Additionally or alternatively, the server(s) 112 may determine attributes associated with the interesting area or the uninteresting area from while using a template. For example, a golf template may identify that a person holding a golf club corresponds to the interesting area and that a group of spectators corresponds to the uninteresting area. In another example, a soccer template may identify that a scoreboard corresponds to the interesting area while a referee corresponds to the uninteresting area. Thus, the server(s) 112 may identify static objects as corresponding to the interesting area and objects in motion corresponding to the uninteresting area without departing from the present disclosure.

After determining the interesting area 2332 and the uninteresting area 2334, the server(s) 112 may determine the cropped window 2322. As illustrated in FIG. 23A, the cropped window 2322 includes the subject 2330 and the interesting area 2332 and excludes the uninteresting area 2334. The cropped window 2322 may be evenly weighted between the subject 2330 and the interesting area 2332, although the disclosure is not limited thereto.

FIG. 23B illustrates an example of including interesting areas in a framing window according to embodiments of the present disclosure. As illustrated in FIG. 23B, a video frame 2340 may include a subject 2350 (e.g., a birthday cake being blown out), a first interesting area 2352-1 (e.g., a birthday gift), a second interesting area 2352-2 (e.g., a party participant) and an uninteresting area 2354. For example, the server(s) 112 may determine that the subject 2350 is the birthday cake being blown out. After determining the subject 2350, the server(s) 112 may identify content neighboring the subject and determine if the neighboring content is interesting or uninteresting. For example, the server(s) 112 may identify that first neighboring content (e.g., area to the left of the subject 2350) is associated with the birthday gift and may determine that the first neighboring content is the first interesting area 2352-1. Similarly, the server(s) 112 may identify that second neighboring content (e.g., area to the right of the subject 2350) is associated with the party participant and may determine that the second neighboring content is the second interesting area 2352-2. Finally, the server(s) 112 may identify that third neighboring content (e.g., area to the left of the first interesting area 2352-1) is associated with static objects that have not moved during the event and are unrelated to the birthday cake and may therefore determine that the third neighboring content is the uninteresting area 2354.

After determining the first interesting area 2352-1, the second interesting area 2352-2 and the uninteresting area 2354, the server(s) 112 may determine the cropped window 2342. As illustrated in FIG. 23B, the cropped window 2342 includes the subject 2350, the first interesting area 2352-1 and the second interesting area 2352-2 and excludes the uninteresting area 2354. The cropped window 2342 may be center-weighted on the subject 2350, although the disclosure is not limited thereto.

As discussed above, the server(s) 112 may generate a priority metric associated with individual video frames and/or video clips, the priority metric indicating an interesting score based on annotation data. For example, a video clip having multiple faces interacting with identifiable objects, good lighting, etc. may correspond to a high priority metric, whereas a video clip of a landscape with no faces or identifiable objects may correspond to a low priority metric. In addition to selecting video clips with priority metrics exceeding the threshold, the server(s) 112 may rank the video clips, and in some examples, the server(s) 112 may only select a portion of the video clips with priority metrics exceeding the threshold. For example, the server(s) 112 may select a desired number of video clips based on the rankings (e.g., the top thirty video clips or the like). Thus, the server(s) 112 may select the number of video clips based on the desired number to include in the video summarization, instead of selecting all video clips exceeding a global priority threshold. In some examples, the threshold may be determined based on the desired number of video clips, such that a first threshold for a first video summarization may be different from a second threshold for a second video summarization.

For example, the server(s) 112 may store video data comprising video clips, each video clip including sequential video frames, and the server(s) 112 may determine relevant video frames from the video clips based on the annotation data associated with the video clips. In some examples, the annotation data may include a master clip table, which is a frame by frame list of different points in the video data, and the server(s) 112 may use an algorithm to determine the priority metric for each video frame. For example, the server(s) 112 may determine the priority metric for a video frame based on interesting features (e.g., faces, people, smiles, motion, etc.) and may store the priority metric in the master clip table. Thus, when the server(s) 112 receives a request for a selected face included in the video frame, the server(s) 112 may refer to the master clip table to identify video frames including the selected face with a priority metric exceeding a threshold.

Based on the priority metric, the server(s) 112 may ignore a video clip despite the video clip including the selected face(s) and/or object(s) (e.g., exclude the video clip completely), ignore video frames including the selected face(s) and/or object(s) (e.g., clip the video clip based on the priority metric) within the video clip or the like. In some examples, the server(s) 112 may generate the priority metric based on the selected face(s) and/or object(s). For example, a particular video clip may have a higher priority metric when the video clip includes multiple selected face(s) and/or object(s) relative to a lower priority metric when the video clip includes a single selected face. In other examples, the server(s) 112 may selectively crop a display area of the video clip to focus on the selected face(s) and/or object(s). For example, the video data may include a wide field of view and the server(s) 112 may crop the video data to display a narrow field of view focused on an individual.

Figure 24:
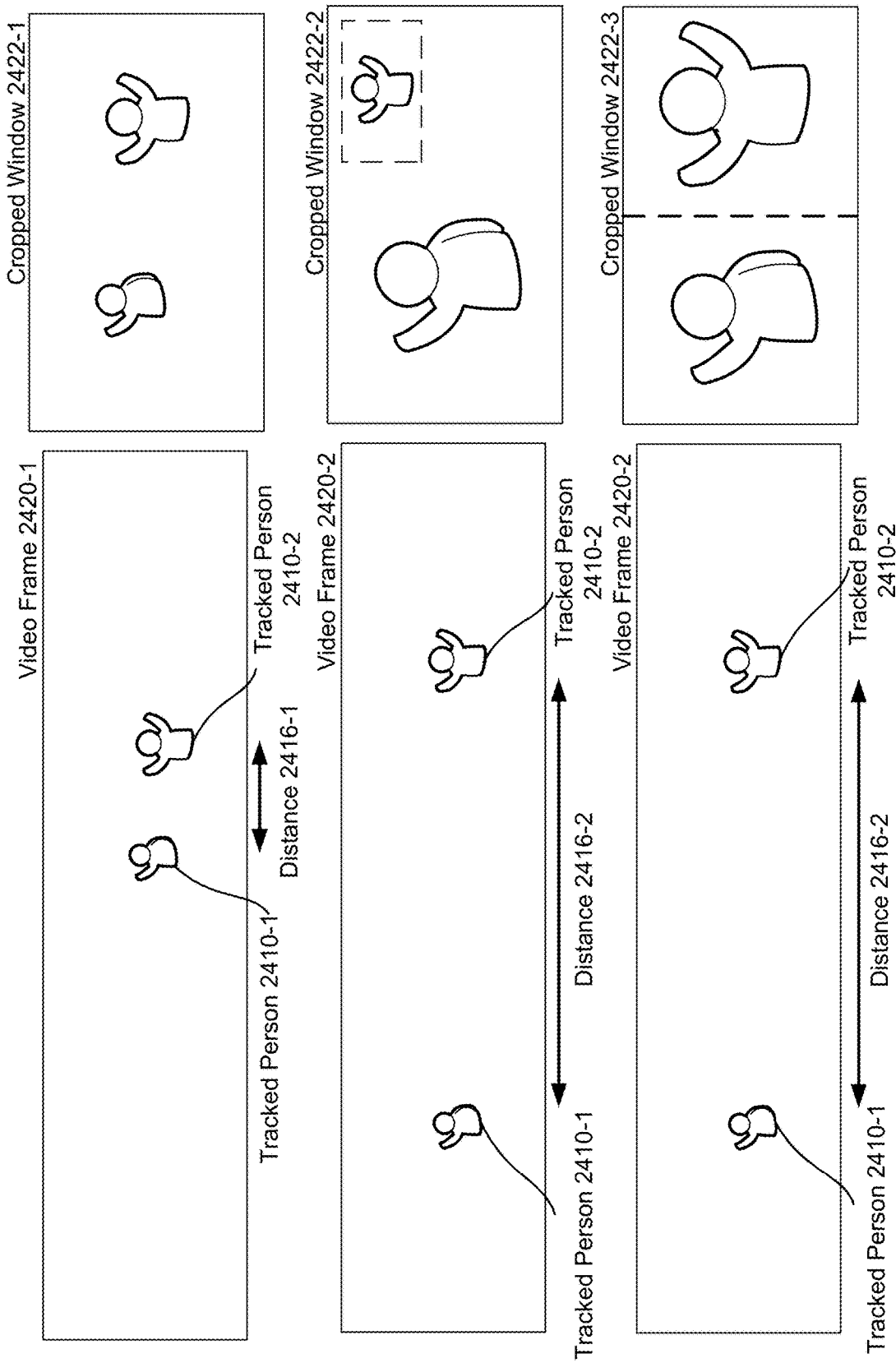
FIG. 24 illustrates an example of generating a split screen according to embodiments of the present disclosure.

In some examples, a first face and a second face may be represented in the video data within proximity to each other and the cropped video data may comprise an area including the first face and the second face. However, in other examples the first face and the second face may be separated and the server 112 cannot crop the video data to include the first face and the second face due to an intervening area. FIG. 24 illustrates an example of generating a split screen according to embodiments of the present disclosure. As illustrated in FIG. 24, a first video frame 2420-1 may include a first tracked person 2410-1 and a second tracked person 2410-2 separated by a first distance 2416-1. As the first tracked person 2410-1 and the second tracked person 2410-2 are within proximity to each other (e.g., the first distance 2416-1 is below a threshold), the server(s) 112 may generate a first cropped window 2422-1 including the first tracked person 2410-1 and the second tracked person 2410-2. In contrast, a second video frame 2420-2 may include the first tracked person 2410-1 and the second tracked person 2410-2 separated by a second distance 2416-2. As the first tracked person 2410-1 and the second tracked person 2410-2 are separated from each other (e.g., the second distance 2416-2 exceeds a threshold), the server(s) 112 may generate a second cropped window 2422-2 including a picture in picture, such as the second tracked person 2410-2 included in a picture within the second cropped window 2422-2. Additionally or alternatively, the server(s) 112 may generate a third cropped window 2422-3 including a split screen, such as the second tracked person 2410-2 included next to the first tracked person 2410-1 with the intervening space omitted.

Figure 25A:
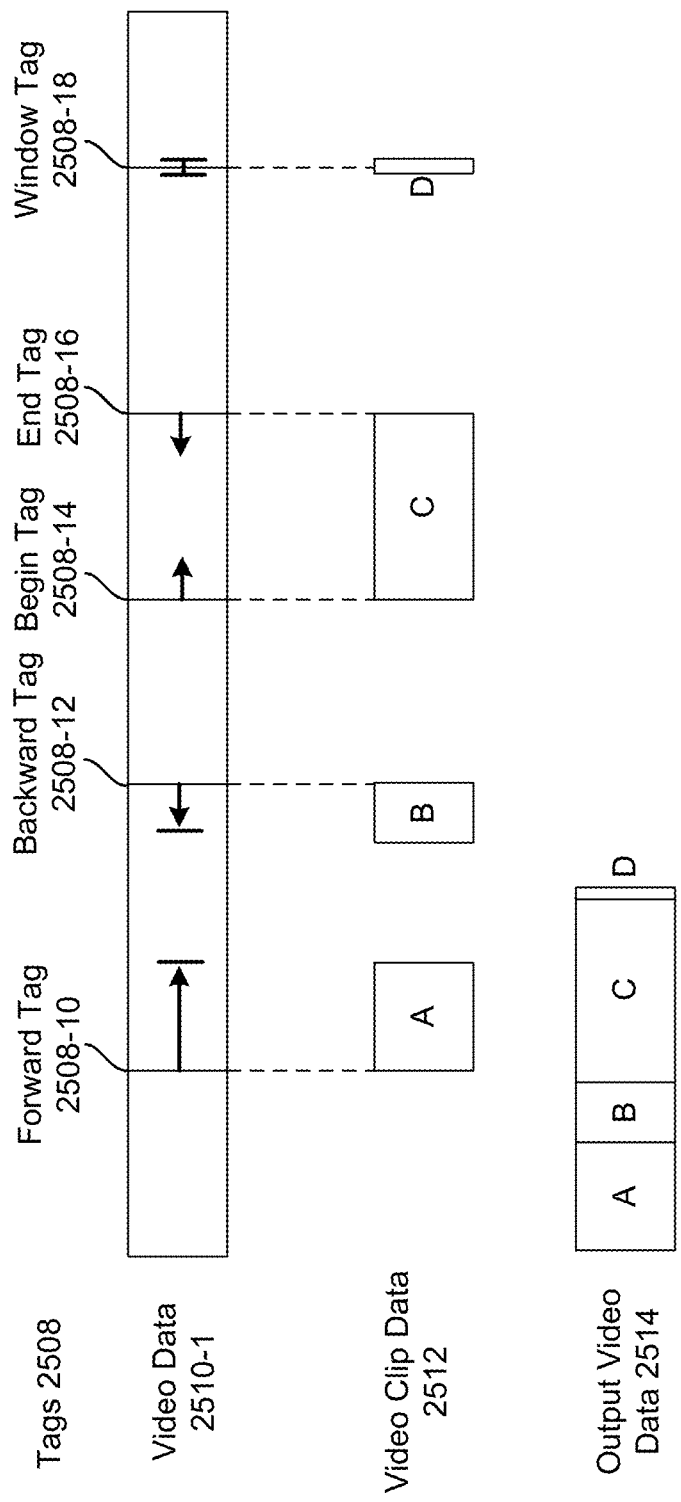
Figure 25B:
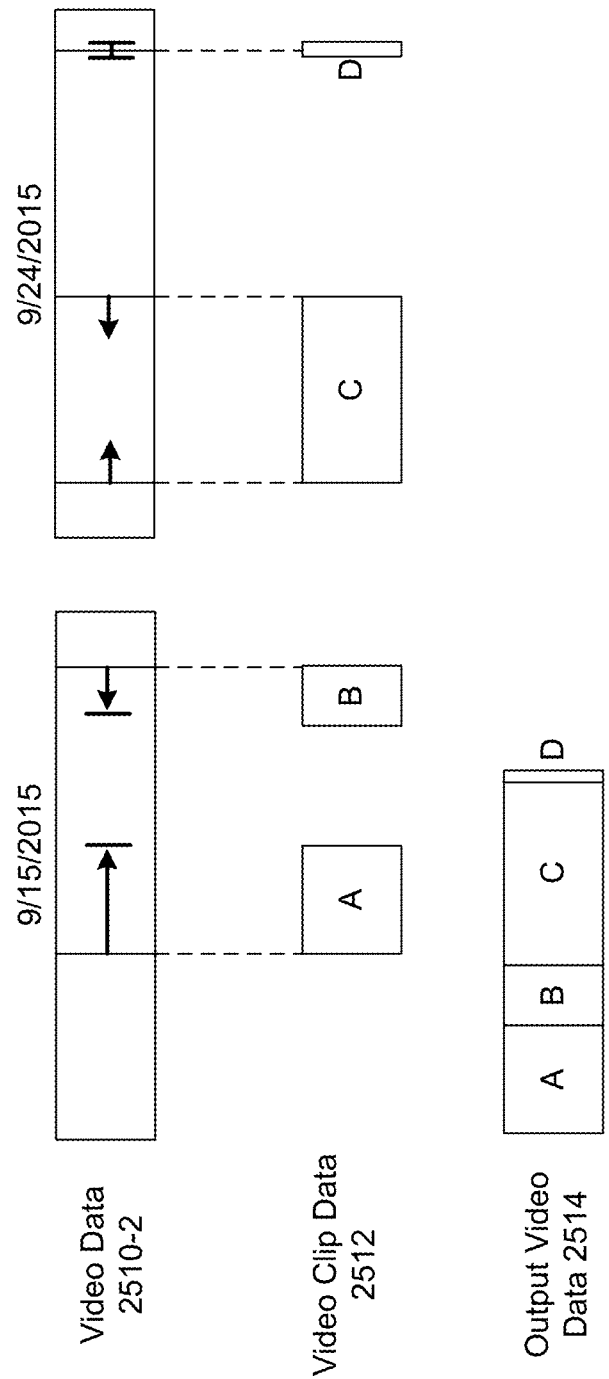

FIGS. 25A-25C illustrate examples of generating video summarizations according to embodiments of the present disclosure. As illustrated in FIG. 25A, tags 2508 may be associated with specific moments within first video data 2510-1, and the server(s) 112 may use the tags 2508 to determine video clip data 2512 associated with each of the tags 2508. The server(s) 112 may then generate output video data 2514 including at least portions of the video clip data 2512.

To illustrate examples of different tags, FIG. 25A illustrates a forward tag 2508-10, a backward tag 2508-12, a begin tag 2508-14, an end tag 2508-16 and a window tag 2508-18. The forward tag 2508-10 is associated with a forward looking command, such as when the server(s) 112 determines that there is a moment of interest in the near future. The video clip data 2512-A associated with the forward tag 2508-10 may extend between a beginpoint, such as a timestamp associated with the forward tag 2508-10, and an endpoint subsequent to the beginpoint. The server(s) 112 may determine the endpoint based on the theme, the annotation data, user preferences and/or user input associated with the forward tag 2508-10. For example, the server(s) 112 may determine the endpoint based on annotation data, a priority metric included in the annotation data falling below a threshold, a fixed duration of time for all forward tags, a variable duration of time specified by the forward tag 2508-10, an audio energy level of audio data associated with the first video data 2510-1 falling below a threshold, when no movement is detected in the first video data 2510-1 for a duration of time or the like. Thus, the forward tag 2508-10 may begin at a first moment in time and may extend until a second moment in time. The period between the first moment in time and the second moment in time may be preconfigured (for example, 30 seconds) and/or may be adjustable.

The backward tag 2508-12 is associated with a backward command, such as when the server(s) 112 identifies that a moment of interest recently occurred. The video clip data 2512-B associated with the backward tag 2508-12 may extend between a beginpoint, prior to a timestamp associated with the backward tag 2508-12, and an endpoint subsequent to the timestamp. The server(s) 112 may determine the beginpoint based on the theme, the annotation data, user preferences and/or user input associated with the backward tag 2508-12. For example, the server(s) 112 may determine the beginpoint based on annotation data, a priority metric included in the annotation data exceeding a threshold, a fixed duration of time for all backward tags, a variable duration of time specified by the backward tag 2508-12, an audio energy level falling below a threshold immediately prior to the timestamp associated with the backward tag 2508-12, when no movement was detected in the first video data 2510-1 for a duration of time immediately prior to the timestamp associated with the backward tag 2508-12 or the like. Similarly, the server(s) 112 may determine the endpoint as discussed above or using the timestamp associated with the backward tag 2508-12. Thus, the backward tag 2508-12 may begin at a first moment in time prior to when the backward tag 2508-12 was received and may extend until a second moment in time, such as when the backward tag 2508-12 was received. The period between the first moment in time and the second moment in time may be preconfigured (for example, 30 seconds) and/or may be adjustable.

The begin tag 2508-14 and the end tag 2508-16 are associated with a start/stop command, respectively, such as when the server(s) 112 identifies a beginning and an end of a moment of interest. The video clip data 2512-C may extend between a beginpoint associated with the begin tag 2508-14 and an endpoint associated with the end tag 2508-16. While the beginpoint is associated with the begin tag 2508-14, the beginpoint is not limited to a timestamp associated with the begin tag 2508-14. Instead, the server(s) 112 may determine the beginpoint as discussed above, with the begin tag 2508-14 being used as a rough estimate of the beginpoint. Similarly, the endpoint is not limited to a timestamp associated with the end tag 2508-16. Instead, the server(s) 112 may determine the endpoint as discussed above, with the end tag 2508-16 being used as a rough estimate of the endpoint.

The window tag 2508-18 is associated with a window command, such as when the server(s) 112 wants to capture an number of images surrounding a particular moment in time. For example, the server(s) 112 may select a number of images before a timestamp of the command and the same number of images after the timestamp of the command to create a window of video clip data 2512-D, centered on the timestamp. Alternatively, the window tag/command may be of a "snapshot" variety, where the window comprises just a single image, where the single image is associated with the timestamp of the command. Thus, the video clip data 2512-D may be a single frame or image shown for a duration of time. The single frame may be captured based on the window tag 2508-18, such as the timestamp associated with the window tag 2508-18, although the present disclosure is not limited thereto. The server(s) 112 may determine the duration of time based on the theme, annotation data, user preferences and/or user input. While FIG. 25A illustrates several examples of tags 2508, the disclosure is not limited thereto and the tags 2508 may vary. In addition, the server(s) 112 may receive multiple tags 2508 of each type and/or tags 2508 from multiple users without departing from the disclosure.

To illustrate that the video summarization may include video clips captured on different dates and/or from different image capture devices 110, FIG. 25B illustrates second video data 2510-2 including a first portion captured on a first date (e.g., Sep. 15, 2015) and a second portion captured on a second date (e.g., Sep. 24, 2015). The server(s) 112 may generate the video clip data 2512 from the second video data 2510-2 and may generate the output video data 2514 using the video clip data 2512.

In some examples, the server(s) 112 may determine candidate video clips and may select a portion of the candidate video clips to include in a video summarization based on similarities between the candidate video clips. Thus, the server(s) 112 may improve a diversity across video clips and avoid having similar video clips included in the video summarization. As illustrated in FIG. 25C, the server(s) 112 may determine candidate video clip data 2522 (e.g., video clips A-G) from video data 2520 based on annotation data, for example using priority metrics associated with individual video clips. The server(s) 112 may then compare the candidate video clip data 2522 using a similarity matrix to identify similar content (e.g., video clips having high affinity with respect to certain attributes/characteristics). For example, the server(s) 112 may determine if two video clips are similar in terms of color characteristics, number of faces, motion data, etc., which may be indicated by the similarity matrix (e.g., a two dimensional array indicating a similarity between the two video clips).

As illustrated in FIG. 25C, the server(s) 112 may group similar video clips as Group 1 (e.g., video clips A-C), Group 2 (e.g., video clips D-E) and Group 3 (e.g., video clips F-G). To improve a diversity across video clips, the server(s) 112 may select a single video clip from each group. In some examples, the server(s) 112 may select the video clip from each group having the highest priority metric for the group. For example, the server(s) 112 may determine selected video clip data 2524 including video clip A from Group 1, video clip E from Group 2 and video clip F from Group 3. Therefore, the output video data 2526 may include video clips A, E and F.

In some examples, multiple video clips from a first group may have priority metrics exceeding video clips from a second group. For example, video clips A, B and C in Group 1 may each have a priority metric higher than priority metrics associated with video clips D and E in Group 2. When the server(s) 112 selects the selected video clip data 2524 using priority metrics alone, the output video data 2526 may include video clips A, B and C. However, when the server(s) 112 selects the selected video clip data 2524 using priority metrics and similarity matrices, the output video data 2526 may exclude video clips B and C due to their similarity to video clip A, despite video clips B and C having higher priority metrics than video clips D and E.

Figure 26:
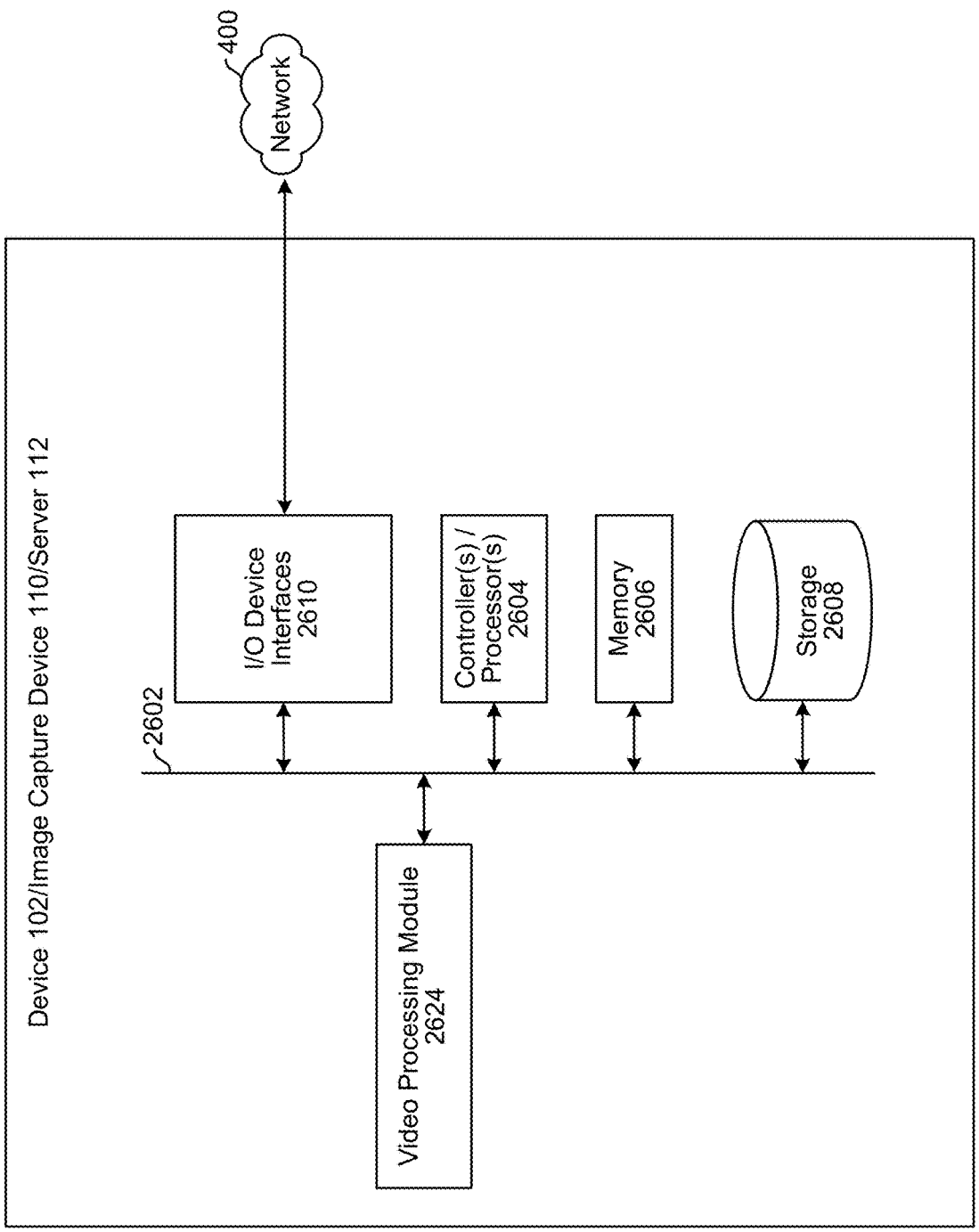
FIG. 26 is a block diagram conceptually illustrating example components of a system according to embodiments of the present disclosure.

FIG. 26 illustrates a block diagram conceptually illustrating example components of a system 100 including one or more of a device 102, an image capture device 110 and/or a server(s) 112. Depending upon how the system is structured, some of the components illustrated in FIG. 26 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 2608 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 26, the device 102/image capture device 110/server(s) 112 may include an address/data bus 2602 for conveying data among components of the device 102/image capture device 110/server(s) 112. Each component within the device 102/image capture device 110/server(s) 112 may also be directly connected to other components in addition to (or instead of) being connected to other components across the bus 2602.

The device 102/image capture device 110/server(s) 112 may include one or more controllers/processors 2604 comprising one-or-more central processing units (CPUs) for processing data and computer-readable instructions and a memory 2606 for storing data and instructions. The memory 2606 may include volatile random access memory (RAM), non-volatile read only memory (ROM), non-volatile magnetoresistive (MRAM) and/or other types of memory. The device 102/image capture device 110/server(s) 112 may also include a data storage component 2608 for storing data and processor-executable instructions. The data storage component 2608 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 2610.

The device 102/image capture device 110/server(s) 112 includes input/output device interfaces 2610. A variety of components may be connected to the device 102/image capture device 110/server(s) 112 through the input/output device interfaces 2610, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure.

The input/output device interfaces 2610 may be configured to operate with a network 400, for example a wireless local area network (WLAN) (such as WiFi), Bluetooth®, ZigBee® and/or wireless networks, such as a Long Term Evolution (LTE) network, WiMAX™ network, 3G network, etc. The network 400 may include a local or private network or may include a wide network such as the internet. Devices may be connected to the network 400 through either wired or wireless connections.

The input/output device interfaces 2610 may also include an interface for an external peripheral device connection such as universal serial bus (USB), FireWire, Thunderbolt, Ethernet port or other connection protocol that may connect to networks 400. The input/output device interfaces 2610 may also include a connection to an antenna (not shown) to connect one or more networks 400 via a wireless local area network (WLAN) (such as WiFi) radio, Bluetooth®, and/or wireless network radio, such as a radio capable of communication with a wireless communication network such as a Long Term Evolution (LTE) network, WiMAX™ network, 3G network, etc.

The device 102/image capture device 110/server(s) 112 further includes a video processing module 2624, which may comprise processor-executable instructions stored in storage 2608 to be executed by controller(s)/processor(s) 2604 (e.g., software, firmware), hardware, or some combination thereof. For example, components of the video processing module 2624 may be part of a software application running in the foreground and/or background on the device 102/image capture device 110/server(s) 112. The video processing module 2624 may control the device 102/image capture device 110/server(s) 112 as discussed above, for example with regard to FIGS. 6A-6B, 8, 16A-16B, 19, 20 and/or 21. Some or all of the controllers/modules of the video processing module 2624 may be executable instructions that may be embedded in hardware or firmware in addition to, or instead of, software. In one embodiment, the device 102/image capture device 110/server(s) 112 may operate using an Android® operating system (such as Android® 4.3 Jelly Bean, Android® 4.4 KitKat or the like), an Amazon® operating system (such as FireOS or the like), or any other suitable operating system.

Executable computer instructions for operating the device 102/image capture device 110/server(s) 112 and its various components may be executed by the controller(s)/processor(s) 2604, using the memory 2606 as temporary "working" storage at runtime. The executable instructions may be stored in a non-transitory manner in non-volatile memory 2606, storage 2608, or an external device. Alternatively, some or all of the executable instructions may be embedded in hardware or firmware in addition to or instead of software.

The components of the device(s) 102/image capture device 110/server(s) 112, as illustrated in FIG. 26, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first video data;
   receiving second video data;
   determining a first theme score associated with a first candidate theme, the first theme score representing a likelihood that the first candidate theme corresponds to both the first video data and the second video data;
   determining a second theme score associated with a second candidate theme, the second theme score representing a likelihood that the second candidate theme corresponds to both the first video data and the second video data;
   based at least in part on the first theme score and the second theme score, selecting the first candidate theme, instead of the second candidate theme, as a theme;
   based on selecting the first candidate theme as the theme, determining a first group of video clips associated with at least a portion of the first video data and at least a portion of the second video data; and
   generating a video summarization using the theme and the first group of video clips.

2. The computer-implemented method of claim 1, wherein determining the first theme score is based at least in part on analyzing contents of the first video data and the second video data.

3. The computer-implemented method of claim 1, further comprising:
   determining that the first theme score is greater than the second theme score.

4. The computer-implemented method of claim 1, further comprising:
   determining a first video clip included in the first video data;
   determining a first priority metric corresponding to the first video clip;
   determining a second video clip included in the second video data;
   determining a second priority metric corresponding to the second video clip;
   determining a second group of video clips associated with at least a portion of the first video data and the second video data, the second group of video clips having a priority metric exceeding a threshold and including the first video clip and the second video clip;
   ranking the second group of video clips, wherein the ranking further comprises determining that the first priority metric exceeds the second priority metric and ordering the first video clip ahead of the second video clip; and
   selecting the first group of video clips from the second group of video clips, the first group of video clips including a highest ranked of the second group of video clips.

5. The computer-implemented method of claim 4, further comprising:
   selecting a first subgroup of the second group of video clips associated with the first video data;
   selecting a second subgroup of the second group of video clips associated with the second video data; and
   defining the first group of video clips as including the first subgroup and the second subgroup.

6. The computer-implemented method of claim 1, further comprising:
   determining a first characteristic associated with the theme;
   determining that the first characteristic is included in a first portion of first annotation data, the first portion of the first annotation data corresponding to a first portion of the first video data;
   determining that the first characteristic is not included in a second portion of the first annotation data, the second portion of the first annotation data corresponding to a second portion of the first video data;
   determining a first score associated with the first portion of the first annotation data;
   determining a second score associated with the second portion of the first annotation data, the second score lower than the first score; and
   selecting the first portion of the first video data to include in the first group of video clips.

7. The computer-implemented method of claim 1, further comprising:
   determining, based at least in part on contents of the first video data, a first time associated with the first video data;
   determining, based at least in part on the contents of the first video data, a first geographic location associated with the first video data;

identifying an event associated with the first time and the first geographic location;
determining a second time associated with the event;
determining a second geographic location associated with the event;
determining that the second time is within a time threshold of the first time; and
determining that the second geographic location is within a distance threshold of the first geographic location, wherein determining the first theme score further corresponds to identifying the event, determining that the second time is within the time threshold of the first time, and determining that the second geographic location is within the distance threshold of the first geographic location.

8. The computer-implemented method of claim 1, further comprising:
determining first data representing the first video data;
determining second data representing a second video summarization;
determining that the first data is substantially similar to the second data;
determining that a second theme is associated with the second video summarization; and
based at least in part on determining that the second theme is associated with the second video summarization, selecting the second theme as the theme.

9. The computer-implemented method of claim 8, wherein:
the first data comprises first histogram data; and
the second data comprises second histogram data.

10. The computer-implemented method of claim 1, further comprising:
determining, based at least in part on the theme and the first group of video clips, a structure of the video summarization, the structure indicating an order of the first group of video clips,
wherein generating the video summarization further uses the structure.

11. A system comprising:
at least one processor; and
at least one memory comprising instructions that, when executed by the at least one processor, cause the system to:
receive first video data;
receive second video data;
determine a first theme score associated with a first candidate theme, the first theme score representing a likelihood that the first candidate theme is corresponds to both the first video data and the second video data;
determine a second theme score associated with a second candidate theme, the second theme score representing a likelihood that the second candidate theme corresponds to both the first video data and the second video data;
based at least in part on the first theme score and the second theme score, select the first candidate theme, instead of the second candidate theme, as a theme;
based on selecting the first candidate theme as the theme, determine a first group of video clips associated with at least a portion of the first video data and at least a portion of the second video data; and
generate a video summarization using the theme and the first group of video clips.

12. The system of claim 11, wherein the instructions that determine the first theme score are based at least in part on analyzing contents of the first video data and the second video data.

13. The system of claim 11, wherein the at least one memory further comprises instructions that, when executed by the at least one processor, further cause the system to:
determining that the first theme score is greater than the second theme score.

14. The system of claim 11, wherein the at least one memory further comprises instructions that, when executed by the at least one processor, further cause the system to:
determine a first video clip included in the first video data;
determine a first priority metric corresponding to the first video clip;
determine a second video clip included in the second video data;
determine a second priority metric corresponding to the second video clip;
determine a second group of video clips associated with at least a portion of the first video data and the second video data, the second group of video clips having a priority metric exceeding a threshold and including the first video clip and the second video clip;
rank the second group of video clips, wherein the ranking further comprises determining that the first priority metric exceeds the second priority metric and ordering the first video clip ahead of the second video clip; and
select the first group of video clips from the second group of video clips, the first group of video clips including a highest ranked of the second group of video clips.

15. The system of claim 14, wherein the at least one memory further comprises instructions that, when executed by the at least one processor, further cause the system to:
select a first subgroup of the second group of video clips associated with the first video data;
select a second subgroup of the second group of video clips associated with the second video data; and
define the first group of video clips as including the first subgroup and the second subgroup.

16. The system of claim 11, wherein the at least one memory further comprises instructions that, when executed by the at least one processor, further cause the system to:
determine a first characteristic associated with the theme;
determine that the first characteristic is included in a first portion of first annotation data, the first portion of the first annotation data corresponding to a first portion of the first video data;
determine that the first characteristic is not included in a second portion of the first annotation data, the second portion of the first annotation data corresponding to a second portion of the first video data;
determine a first score associated with the first portion of the first annotation data;
determine a second score associated with the second portion of the first annotation data, the second score lower than the first score; and
select the first portion of the first video data to include in the first group of video clips.

17. The system of claim 11, wherein the at least one memory further comprises instructions that, when executed by the at least one processor, further cause the system to:
determine, based at least in part on contents of the first video data, a first time associated with the first video data;

determine, based at least in part on the contents of the first video data, a first geographic location associated with the first video data;

identify an event associated with the first time and the first geographic location;

determine a second time associated with the event;

determine a second geographic location associated with the event;

determine that the second time is within a time threshold of the first time; and determine that the second geographic location is within a distance threshold of the first geographic location, wherein determination that the first theme score further corresponds to identification of the event, determination that the second time is within the time threshold of the first time, and determination that the second geographic location is within the distance threshold of the first geographic location.

18. The system of claim 11, wherein the at least one memory further comprises instructions that, when executed by the at least one processor, further cause the system to:

determine first data representing the first video data;

determine second data representing a second video summarization;

determine that the first data is substantially similar to the second data;

determine that a second theme is associated with the second video summarization; and based at least in part on determination that the second theme is associated with the second video summarization, select the second theme as the theme.

19. The system of claim 18, wherein:

the first data comprises first histogram data; and the second data comprises second histogram data.

20. The system of claim 11, wherein the at least one memory further comprises instructions that, when executed by the at least one processor, further cause the system to:

determine, based at least in part on the theme and the first group of video clips, a structure of the video summarization, the structure indicating an order of the first group of video clips, wherein generation of the video summarization further uses the structure.

* * * * *